United States Patent [19]
Kindell et al.

[11] 4,285,035
[45] Aug. 18, 1981

[54] APPARATUS AND METHOD FOR REWRITE DATA INSERTION IN A THREE DESCRIPTOR INSTRUCTION

[75] Inventors: Jerry L. Kindell, Glendale; Richard T. Flynn, Peoria, both of Ariz.

[73] Assignee: Honeywell Information Systems Inc., Phoenix, Ariz.

[21] Appl. No.: 221

[22] Filed: Jan. 2, 1979

[51] Int. Cl.³ .............................................. G06F 9/30
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 2,978,679 | 4/1961 | Dieterich | 364/900 |
| 3,425,036 | 1/1969 | Packard | 364/200 |
| 3,512,134 | 5/1970 | Packard | 364/200 |
| 3,990,051 | 11/1976 | Shelly | 364/200 |
| 4,037,213 | 7/1977 | Atkins et al. | 364/200 |

*Primary Examiner*—Raulfe B. Zache
*Attorney, Agent, or Firm*—William W. Holloway, Jr.; George Grayson; Ronald T. Reiling

[57] ABSTRACT

In a microprogrammed data processing system in which the boundaries of the operands or data strings identified by the descriptors are not constrained to coincide with boundaries of the units of addressable memory space, i.e., words, the time required to retrieve, execute and store operands of a three descriptor instruction, wherein two descriptors define the memory address of the initial operands and the third descriptor defines the memory address of the resulting operand, can be reduced by prefetching the two words which include the boundaries of the operand (data string) identified by the third descriptor. After execution of the instruction, the boundary words of the resulting operand (data string) can have the rewrite data, that is the data of the boundary words which are not part of the resulting operand, and should therefore be retained and inserted in appropriate positions of the appropriate boundary word by a retrieval of the boundary words which do not interrupt the normal data processing sequence.

6 Claims, 9 Drawing Figures

---

INSTRUCTION FORMAT

AD2D — ADD USING 2 DECIMAL OPERANDS

| | 0 1 | | 8 9 10 11 | | 17 18 | | | | 27 28 29 | | 35 |
|---|---|---|---|---|---|---|---|---|---|---|---|
| INSTRUCTION | P | | T RD | MF2 | OP CODE 202-1 | | | | I | MF1 | |
| DESCRIPTOR 1 | | Y1 | | | OE | CN1 | TN1 | S1 | SF1 | | N1 | |
| DESCRIPTOR 2 | | Y2 | | | OE | CN2 | TN2 | S2 | SF2 | | N2 | |
| | | | | | 18 20 | 21 | 22 23 | 24 | 29 30 | | 35 | |

AD3D — ADD USING 3 DECIMAL OPERANDS

| | 0 1 2 | | 8 9 10 11 | | 17 18 | | | | 27 28 29 | | 35 |
|---|---|---|---|---|---|---|---|---|---|---|---|
| INSTRUCTION | P | MF3 | T RD | MF2 | OP CODE 222-1 | | | | I | MF1 | |
| DESCRIPTOR 1 | | Y1 | | | OE | CN1 | TN1 | S1 | SF1 | | N1 | |
| DESCRIPTOR 2 | | Y2 | | | OE | CN2 | TN2 | S2 | SF2 | | N2 | |
| DESCRIPTOR 3 | | Y3 | | | OE | CN3 | TN3 | S3 | SF3 | | N3 | |
| | | | | | 18 20 | 21 | 22 23 | 24 | 29 30 | | 35 | |

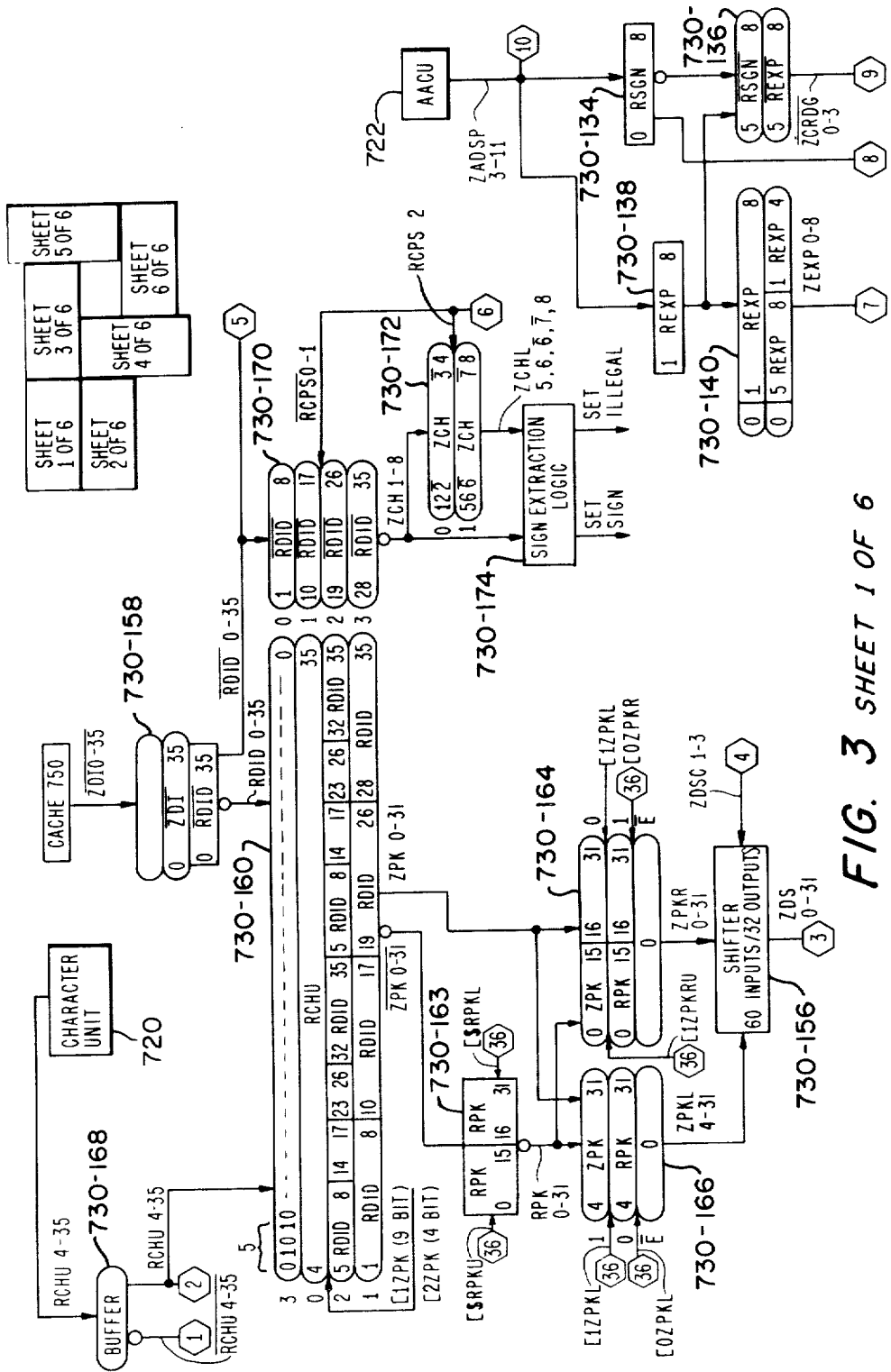
FIG. 3 SHEET 1 OF 6

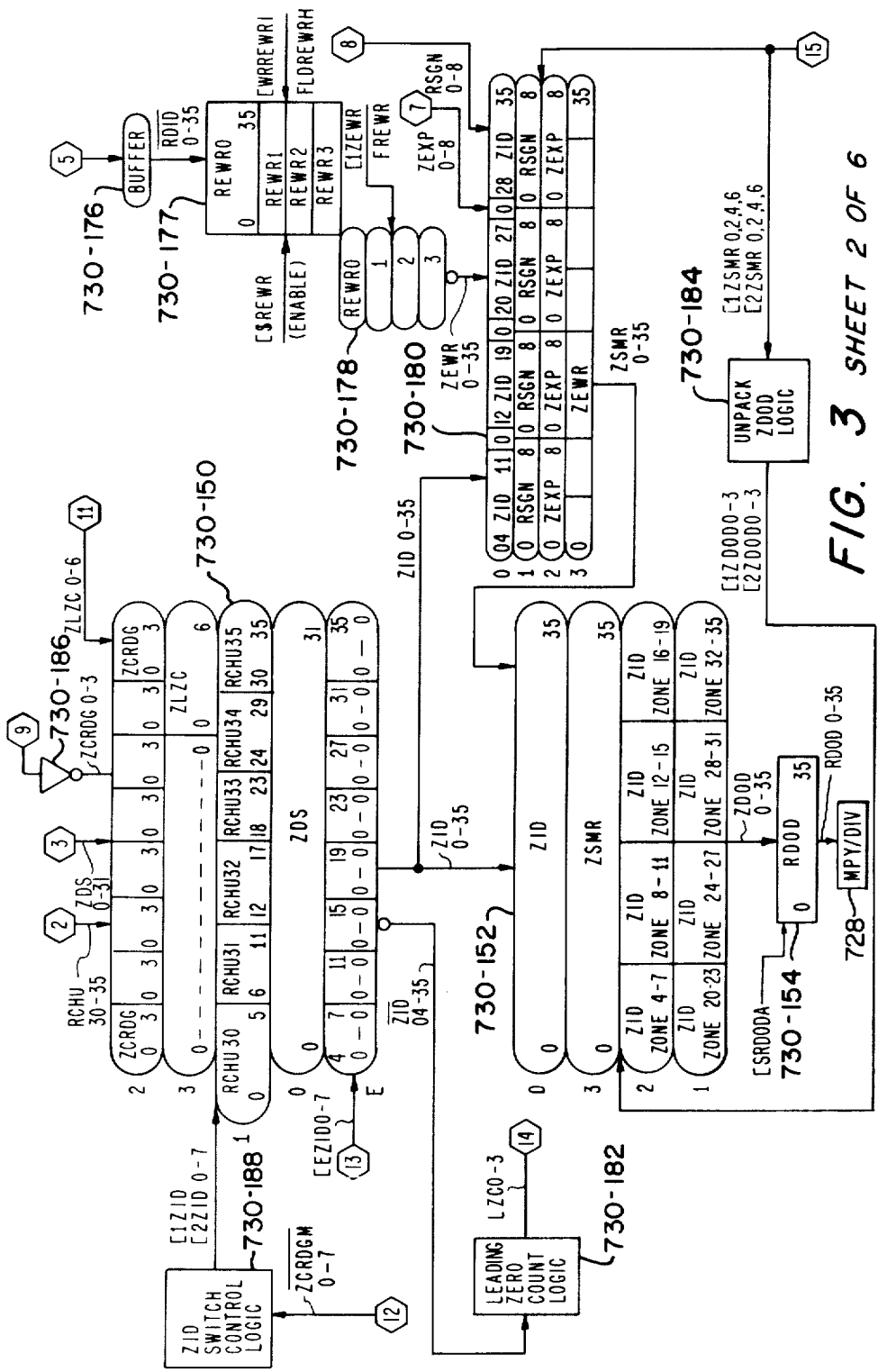
FIG. 3 SHEET 2 OF 6

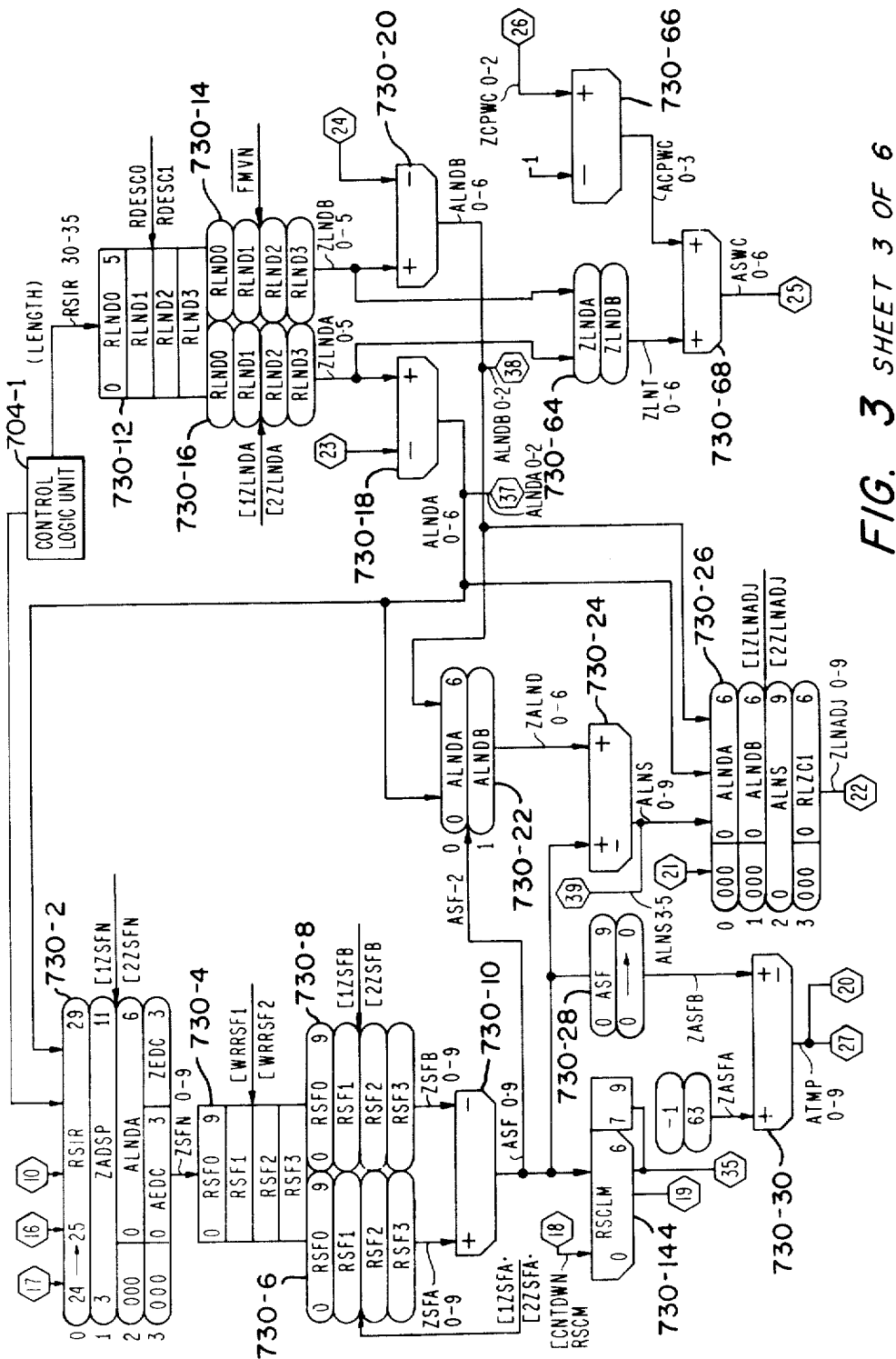
FIG. 3 SHEET 3 OF 6

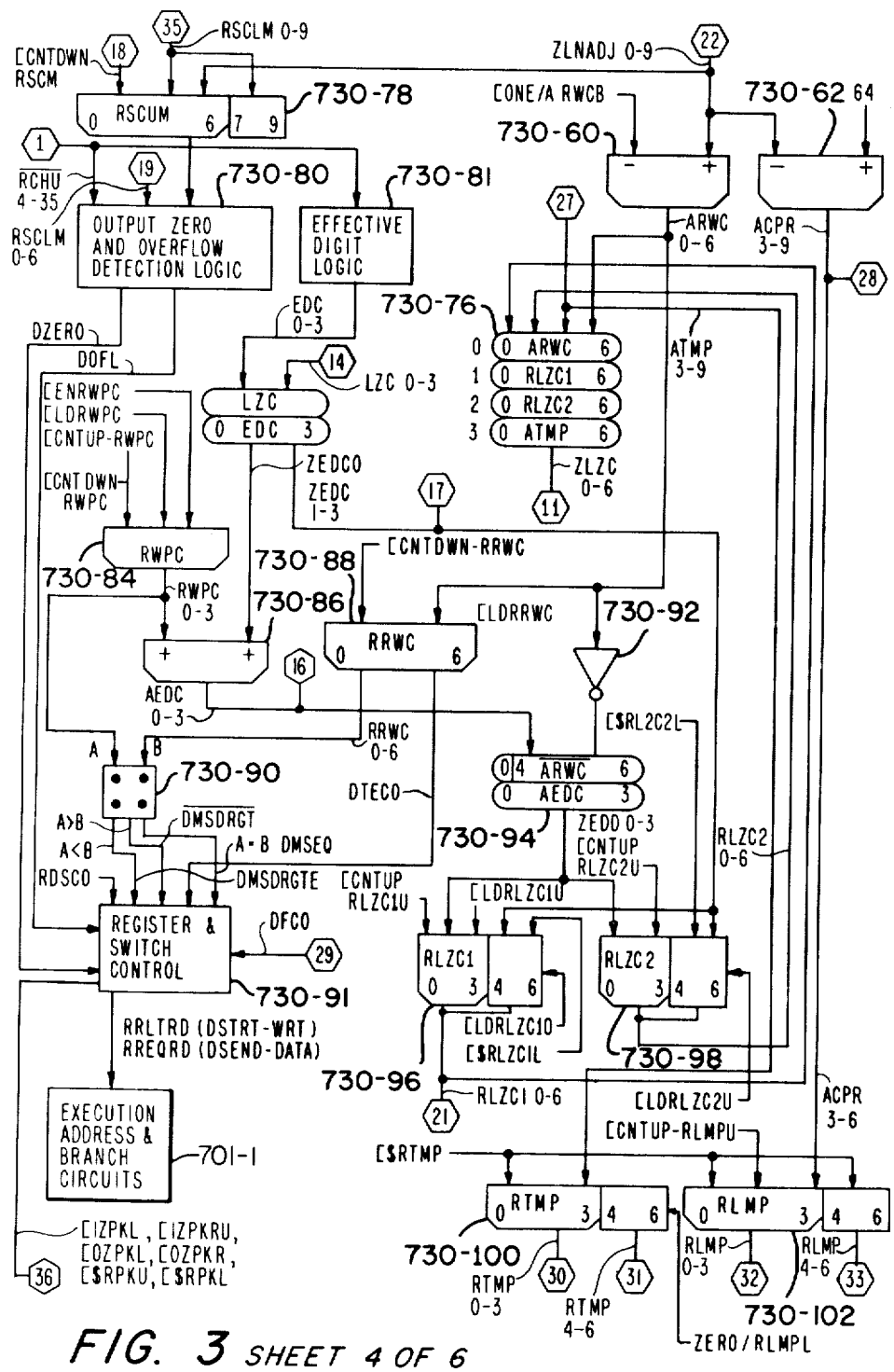
FIG. 3 SHEET 4 OF 6

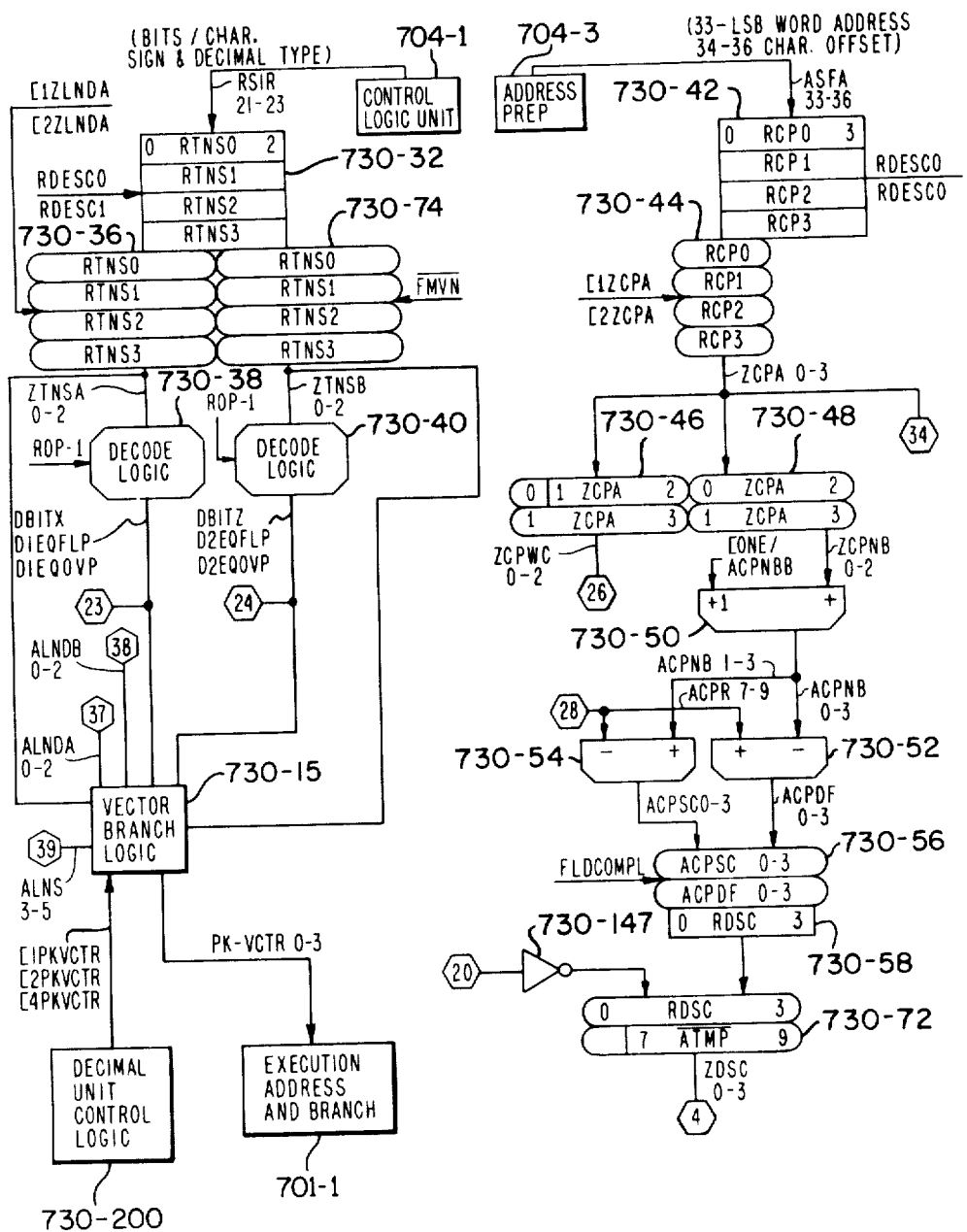
FIG. 3 SHEET 5 OF 6

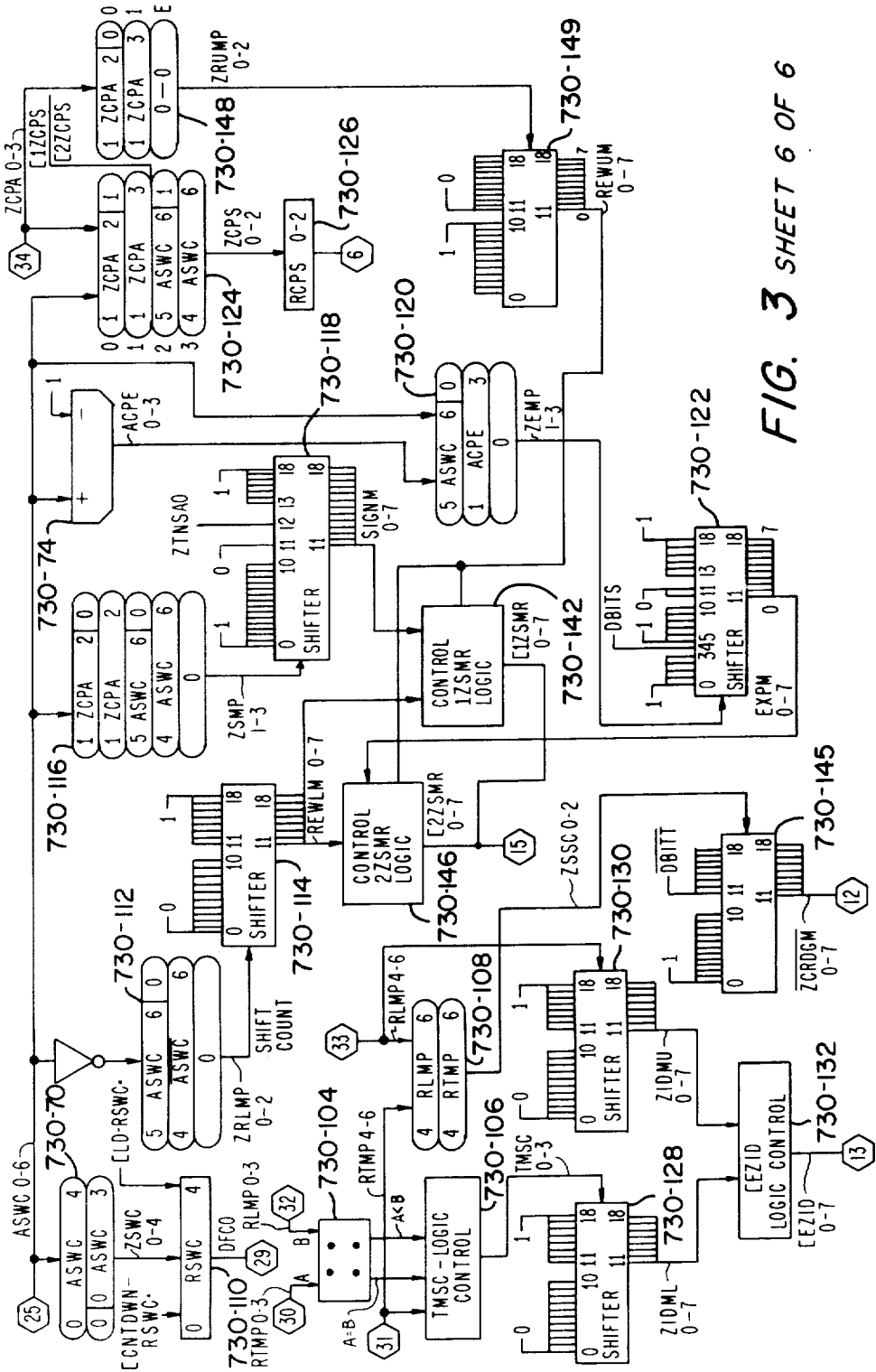
FIG. 3 SHEET 6 OF 6

INSTRUCTION FORMAT

AD2D — ADD USING 2 DECIMAL OPERANDS

| | 0 1 | 8 9 10 11 | 17 18 | 27 28 29 | 35 |
|---|---|---|---|---|---|
| INSTRUCTION | P | T RD MF2 | OP CODE 202-1 | I | MF1 |
| DESCRIPTOR 1 | Y1 | | OE CN1 TN1 S1 | SF1 | N1 |
| DESCRIPTOR 2 | Y2 | | OE CN2 TN2 S2 | SF2 | N2 |

18 20 21 22 23 24 29 30 35

AD3D — ADD USING 3 DECIMAL OPERANDS

| | 0 1 2 | 8 9 10 11 | 17 18 | 27 28 29 | 35 |
|---|---|---|---|---|---|
| INSTRUCTION | P MF3 | T RD MF2 | OP CODE 222-1 | I | MF1 |
| DESCRIPTOR 1 | Y1 | | OE CN1 TN1 S1 | SF1 | N1 |
| DESCRIPTOR 2 | Y2 | | OE CN2 TN2 S2 | SF2 | N2 |
| DESCRIPTOR 3 | Y3 | | OE CN3 TN3 S3 | SF3 | N3 |

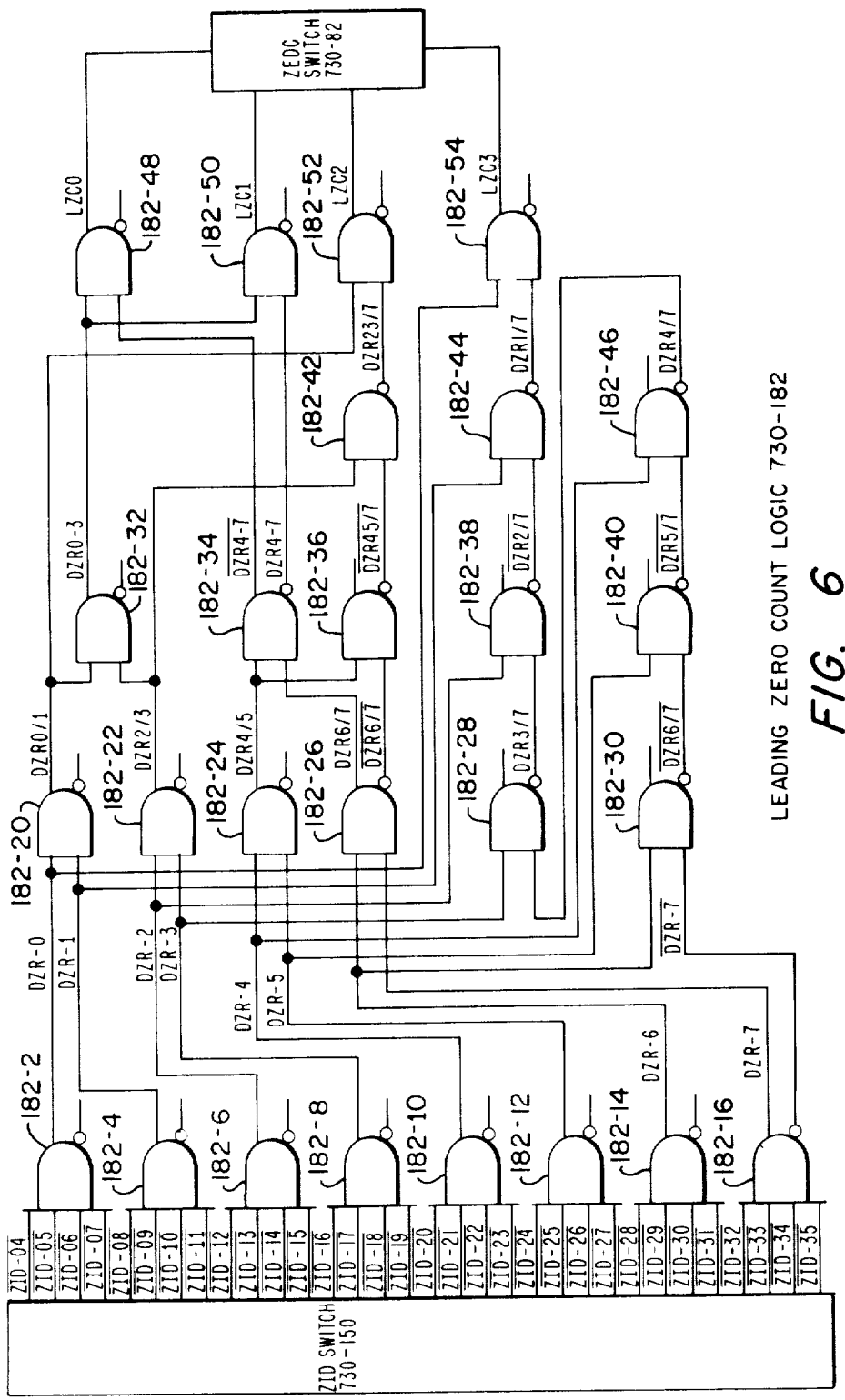
FIG. 6 LEADING ZERO COUNT LOGIC 730-182

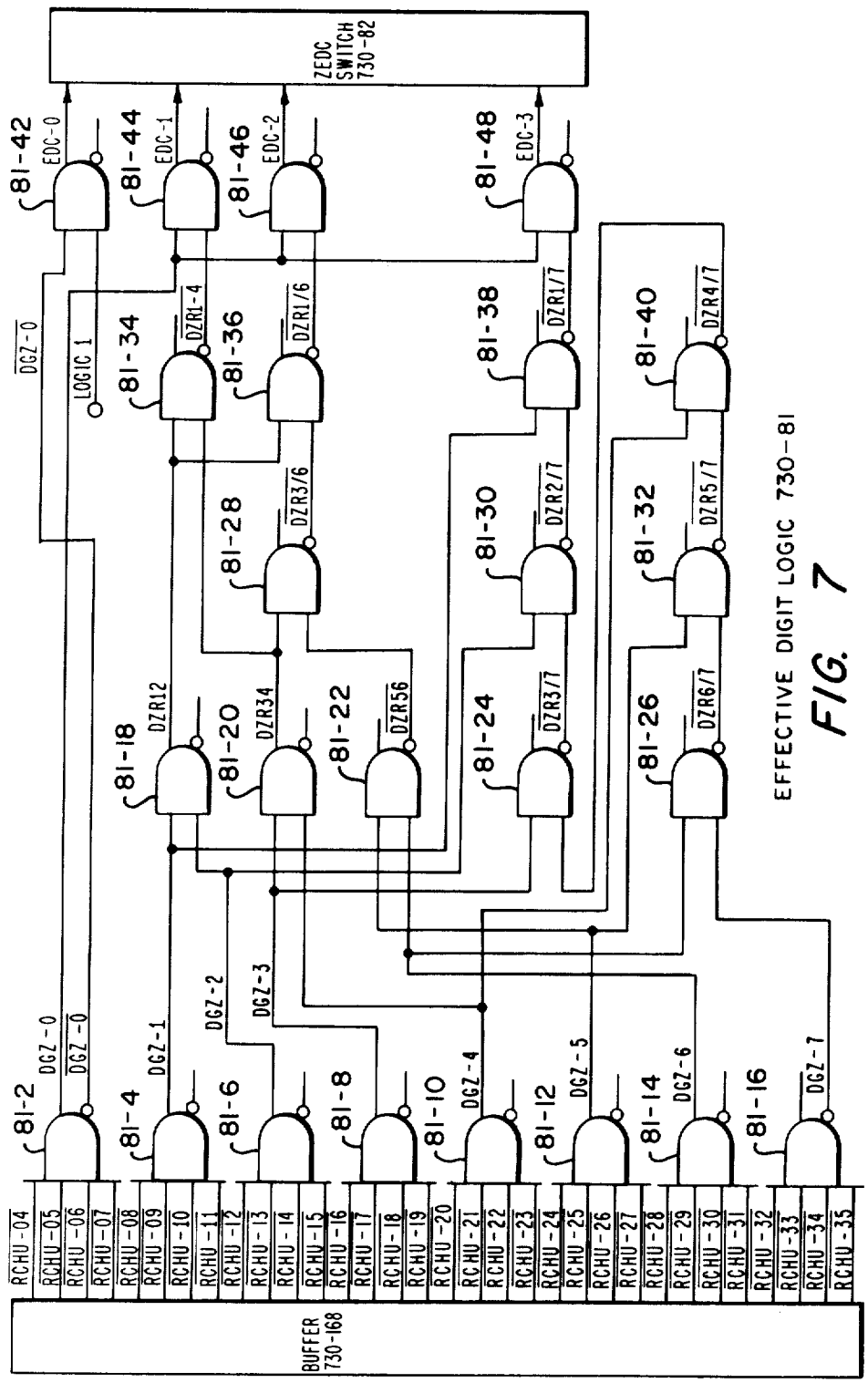

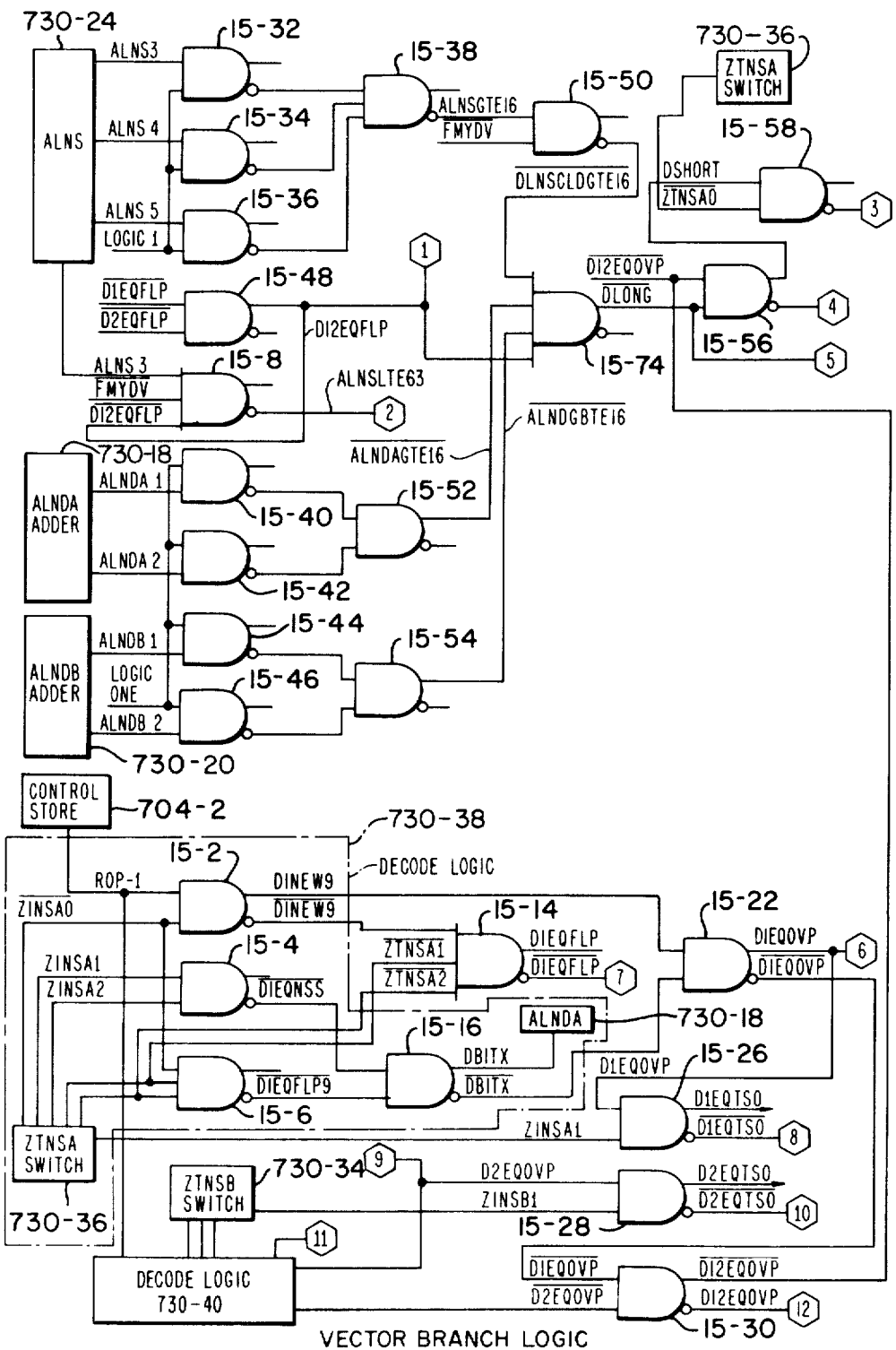
FIG. 8 SHEET 1 OF 2
VECTOR BRANCH LOGIC

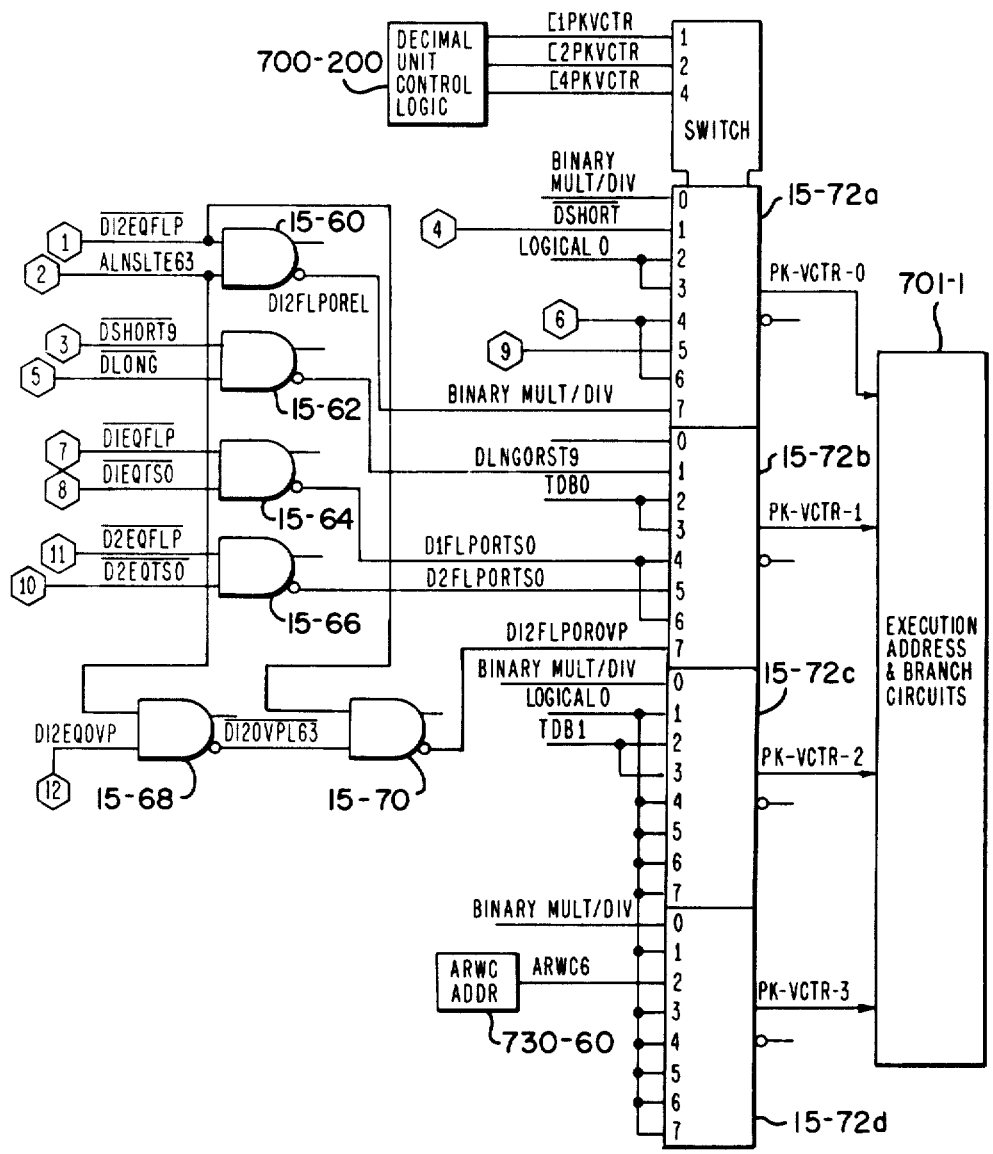
VECTOR BRANCH LOGIC
FIG. 8 SHEET 2 OF 2

{{{#}}} APPARATUS AND METHOD FOR REWRITE DATA INSERTION IN A THREE DESCRIPTOR INSTRUCTION

RELATED APPLICATIONS

1. Prediction of Number of Data Words and Cycle at Which Data is Available, invented by Richard T. Flynn and Jerry L. Kindell, Ser. No. 000,223, filed on Jan. 2, 1979, and assigned to the same assignee as named herein.

2. Pointer for Defining The Data By Controlling Merge Switches, invented by Jerry L. Kindell and Richard T. Flynn, Ser. No. 000,391, filed on Jan. 2, 1979, and assigned to the same assignee as named herein.

3. Short Operand Alignment and Merge Operation, invented by Richard T. Flynn and Jerry L. Kindell, Ser. No. 000,401, filed on Jan. 2, 1979, and assigned to the same assignee as named herein.

4. Long Operand Alignment and Merge Operation, invented by Jerry L. Kindell and Richard T. Flynn, Ser. No. 000,399, filed on Jan. 2, 1979, and assigned to the same assignee as named herein.

5. Improved Apparatus and Method for Rewrite Data Insertion In a Two Descriptor Instruction, invented by Jerry L. Kindell and Richard T. Flynn, Ser. No. 000,393, filed on Jan. 2, 1979, and assigned to the same assignee as named herein.

6. Leading Zero Count Formation, invented by Richard T. Flynn and Jerry L. Kindell, Ser. No. 000,232, filed on Jan. 2, 1979, and assigned to the same assignee as named herein.

7. Effective Digit Count on Result Operand, invented by Jerry L. Kindell and Richard T. Flynn, Ser. No. 000,222, filed on Jan. 2, 1979, and assigned to the same assignee as named herein.

8. Numeric Data Fetch—Alignment of Data Including Scale Factor Difference, invented by Jerry L. Kindell and Richard T. Flynn, Ser. No. 000,220, filed on Jan. 2, 1979, and assigned to the same assignee as named herein.

9. Apparatus for Insertion of Corrected Overpunched Digit Into Incoming Operand Stream, invented by Jerry L. Kindell and Richard T. Flynn, Ser. No. 000,392, filed on Jan. 2, 1979, and assigned to the same assignee as named herein.

10. Apparatus For Merge Control of an Exponent Split Across a Word Boundary, invented by Jerry L. Kindell and Richard T. Flynn, Ser. No. 000,397, filed on Jan. 2, 1979, and assigned to the same assignee as named herein.

11. Apparatus and Method For Insertion of a Character Data Group in a Word Character Group, invented by Richard T. Flynn and Jerry L. Kindell, Ser. No. 000,396, filed on Jan. 2, 1979, and assigned to the same assignee as named herein.

12. Apparatus for Improved Rounding Operation For Short Operand, invented by Richard T. Flynn and Jerry L. Kindell, Ser. No. 000,398, filed on Jan. 2, 1979, and assigned to the same assignee as named herein.

13. Apparatus for Improved Rounding Operation for Long Operand, invented by Richard T. Flynn and Jerry L. Kindell, Ser. No. 000,400, filed on Jan. 2, 1979, and assigned to the same assignee as named herein.

14. Vector Branch Indicators to Control Firmware, invented by Richard T. Flynn and Jerry L. Kindell, Ser. No. 000,229, filed on Jan. 2, 1979, and assigned to the same assignee as named herein.

BACKGROUND OF THE INVENTION

1. Field of the Invention

This invention relates generally to data processing apparatus and more particularly to the execution of a three descriptor instruction in a data processing system in which the boundary of a data string or operand does not coincide with the boundaries of the addressable units of memory space, i.e., words in memory.

2. Description of the Prior Art

It is known in the prior art to augment an instruction in a data processing system by utilizing three descriptors. The first and the second descriptors include information defining the addresses in memory of the first and second operand which are involved in the operation defined by the instruction. The third descriptor includes information defining the address in memory into which the operand resulting from the operation defined by the instruction is to be stored.

It is also known in the prior art to store data strings (operands) in memory in consecutive memory positions without regard to the boundaries of the words, the addressable units of memory space. While increasing the complexity of identifying the boundaries of the data strings, the advantage served by a procedure is the increased utilization of memory space.

It will be clear that when a data string or operand is transferred from the manipulative portion of the data processing system to the memory, those positions in the first and last word of the group of words which include the operand data string but which also include positions which do not include operand data, will destroy the data in the non-operand positions of the first and last words in memory. It is therefore necessary to fetch the first and last words of the memory location defined by descriptor three in order to insert the non-operand data or rewrite data into the first and last words containing the boundaries of the operand.

It is known in the prior art, after execution of the three descriptor instruction, to fetch the first word into which the operand resulting from the instruction execution is to be stored and to insert the data from the non-operand positions in the appropriate locations of the word. This first word is then stored in memory as well as the succeeding words until the last word is reached. Before storing this last word, the corresponding word from memory is fetched and the data in the non-operand positions are inserted in the appropriate positions along with the resulting operand in the last word to be stored in memory and that word is subsequently stored.

It is also known in the prior art to fetch both the first and the last words in the memory location defined by the third descriptor immediately after instruction execution. Thus, the non-operand information is available for insertion in the first and last words to be stored in memory and the normal storage sequence can thereafter be followed without interruption.

In each of the prior art descriptions, the normal sequence of operations must be suspended in order to fetch the first and last words of the memory location described by the third descriptor, thereby breaking the continuity of the data processing machine operation and providing an undesirable delay.

It is therefore an object of the present invention to provide an improved data processing system.

It is a still further object of the present invention to provide for storage of an operand resulting from execution of a three descriptor instruction without interrupting the normal data processing sequence while retaining the data stored in non-operand related positions in words identified by the third descriptor.

It is a further object of the present invention to fetch rewrite data in order to prevent its loss during normal execution of a three descriptor instruction.

It is another object of the present invention to fetch a first and a last word of a location in memory into which an operand is to be written, wherein the first and last words contain data in positions not containing operand data during the normal sequences of operations of a data processing machine.

It is yet another object of the present invention to insert rewrite data into a word containing the least significant and a word containing the most significant data of an operand resulting from a three descriptor instruction and which an operand is to store in a memory location defined by the third descriptor.

SUMMARY OF THE INVENTION

The aforementioned and other objects of the present invention are accomplished when an instruction and three descriptors related to the instruction are stored in a cache memory. The first and second descriptor define a first and second operand respectively. The first and second operand are processed in accordance with the decimal numeric operations defined by the instructions. The first and second operands are stripped of non-decimal digit information and aligned in the decimal unit for transfer to the execution unit for processing. The resultant third operand of the decimal numeric operations performed in the execution unit is defined by the third descriptor. During the store operation, the third operand is applied to the decimal unit for appending the sign characters, exponent characters, zone characters and rewrite characters.

The rewrite characters are those characters that are in the most significant word and the least significant word of the boundary words occuppied in part by the characters of the third operand, but which are not characters of the third operand. For example, the most significant decimal character of the third operand can be in character position 3, then the rewrite characters in positions 0, 1 and 2 are not part of the third operand. In order that they not be lost, the system prefetches the most and least significant words of the third operand address as defined by the third descriptor during the cycles that the execution unit is processing the first and second operands. This enables the decimal unit to append the rewrite information during the third operand store operations. A microprogram command (DUCMD 306) signals the decimal unit to load the most significant word stored in cache in the address location defined by the third descriptor into a register (REWR2 730-177). A second command (DUCMD 306) signals the decimal unit to load the least significant word stored in cache in the address location defined by the third descriptor into a register (REWR3).

During the store operation under control of the microprogram command (DUCMD 303) the decimal unit appends the non-operand decimal characters to the most and least significant words of the third operand in a switch (ZSMR 730-180) and the switch (ZOD 730-152) for transfer to cache.

These and other features of the invention will be understood upon reading of the following description along with the drawings.

BRIEF DESCRIPTION OF THE DRAWINGS

FIG. 3 is a detailed block diagram of the decimal unit.

FIG. 5 shows the instruction and descriptor formats for two decimal numeric instructions.

FIG. 6 is a logic diagram of the leading zero count circuits.

FIG. 7 is a logic diagram of the effective digit circuits.

FIG. 8 is a diagram of the vector branch logic.

GENERAL DESCRIPTION OF PROCESSOR 700—FIG. 1

Figure 1:
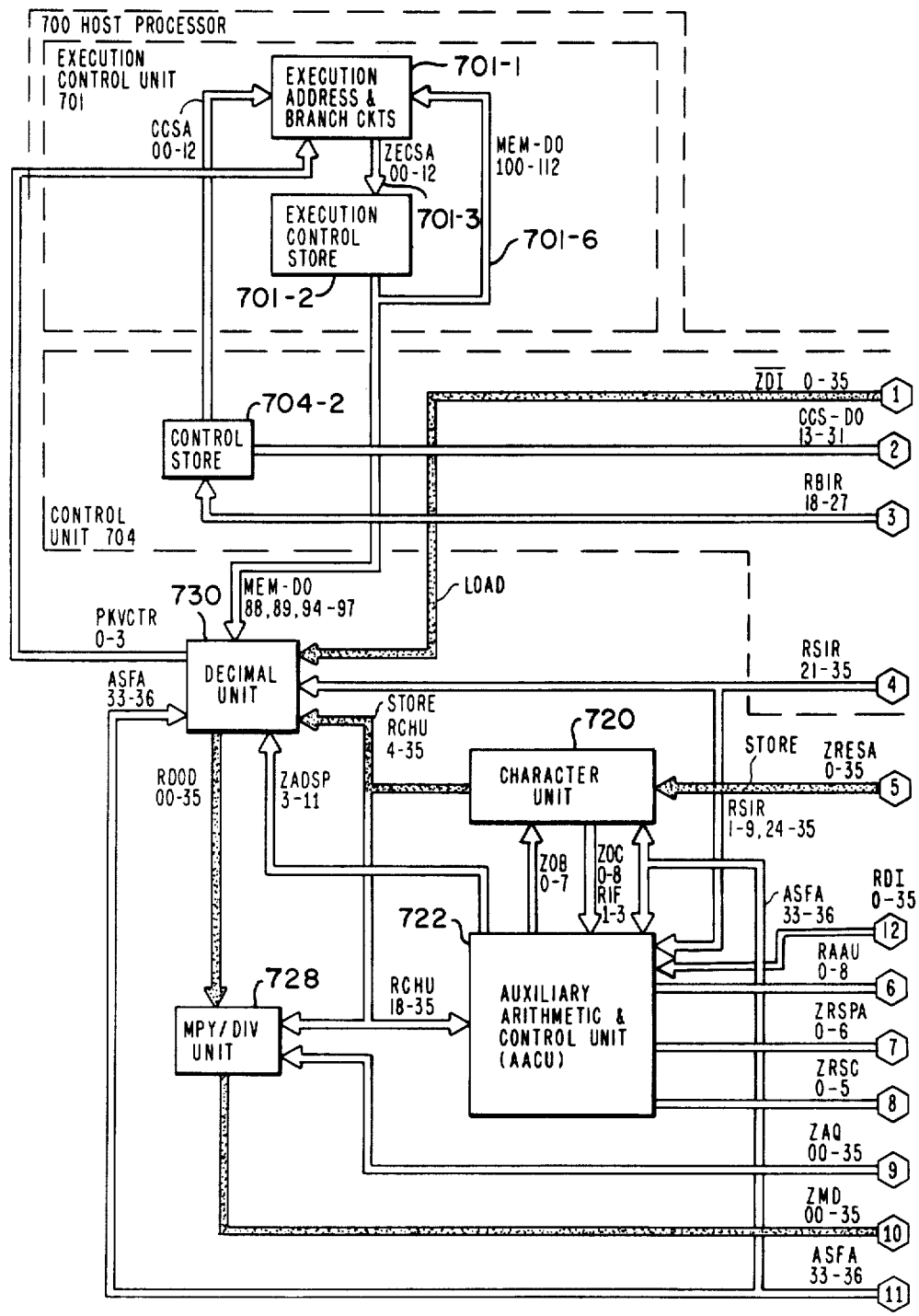
FIG. 1 is an overall block diagram of the host processor. The cache unit and system interface unit are shown connected to the host processor.
Figure 1:
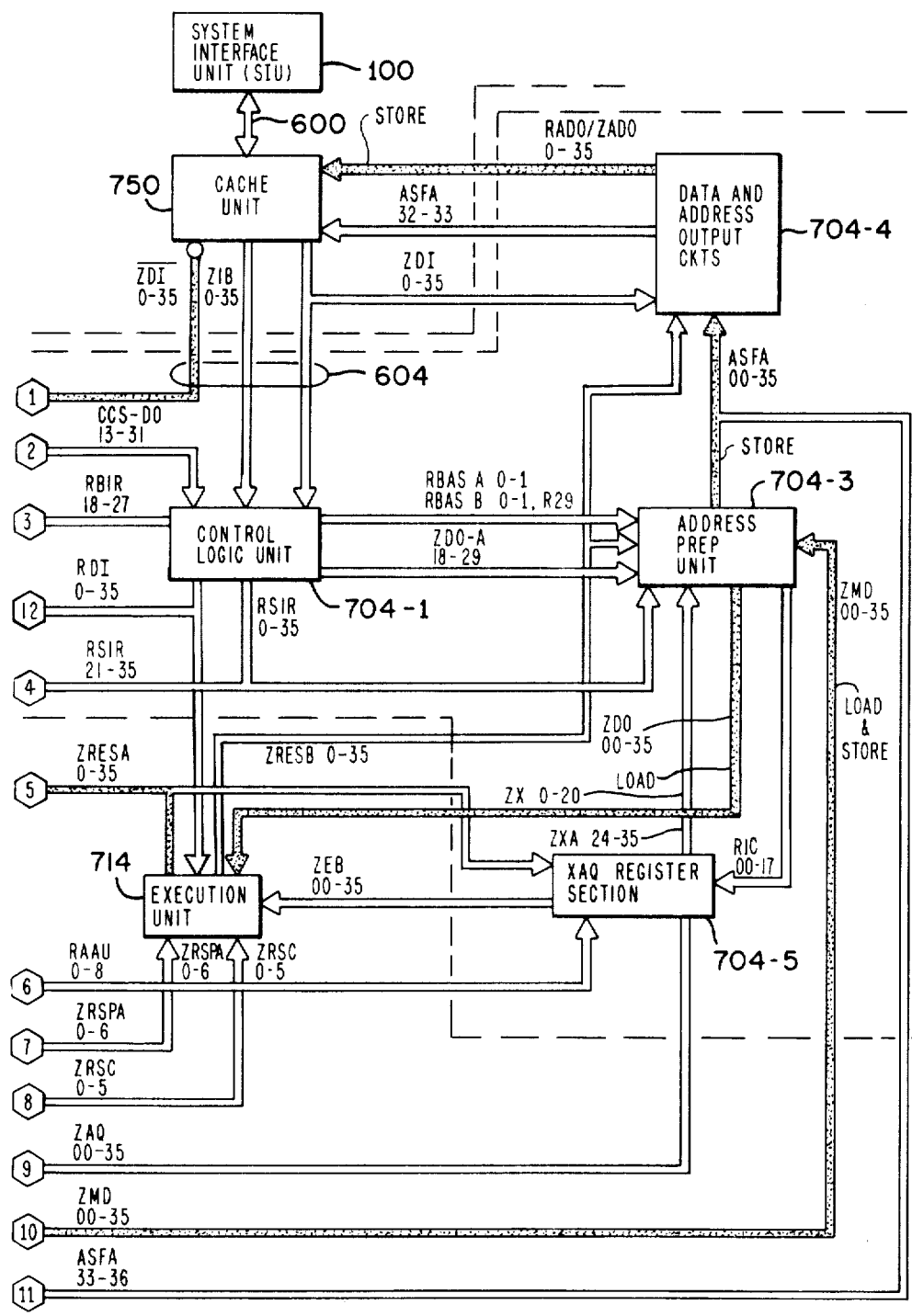

Referring to FIG. 1, it is seen that a host processor 700 includes an execution control unit 701, a control unit 704, an execution unit 714, a character unit 720, an auxiliary arithmetic and control unit (AACU) 722, a multiply-divide unit 728, and a decimal unit 730 which are interconnected as shown. Additionally, the control unit 704 has a number of interconnections to the cache 750 as shown.

The execution control unit 701 includes an execution control store address preparation and branch unit 701-1, and an execution control store 701-2. The store 701-2 and unit 710-1 are interconnected via buses 701-3 and 701-6 as shown.

The control unit 704 includes a control logic unit 701-1, a control store 704-2, an address preparation unit 704-3, data and address output circuit 704-4, an XAQ register section 704-5 which interconnect as shown.

The control unit 704 provides the necessary control for performing address preparation operations, instruction fetching/execution operations and the sequential control for various cycles of operation and/or machine states. The control is generated by logic circuits of block 704-1 and by the execution control unit 701 for the various portions of the control unit 704.

The XAQ register section 704-5 includes a number of program visible registers such as index registers, an accumulator register, and quotient register. Other program visible registers such as the instruction counter and address registers are included within the address preparation unit 704-3.

As seen from FIG. 1, the section 704-5 receives signals from unit 704-3 representative of the contents of the instruction counter via lines RIC 00-17. Also, lines ZRESA 00-35 apply output signals from the execution unit 714 corresponding to the results of operations performed upon various operands. The section 704-5 also receives an output signal from the auxiliary arithmetic and control unit via lines RAAU0-8.

The section 704-5 provides signals representative of the contents of one of the registers included within the section as an input to the address preparation unit 704-3 via the lines ZX0-20 and ZXA 24-35. The address preparation unit 704-3 forwards the information through a switch to the execution unit 714 via the lines ZDO 0-35. Similarly, the contents of certain ones of the registers contained within section 704-5 can be transferred to the execution unit 714 via the lines ZEB 00-35. Lastly, the contents of selected ones of these registers can be transferred from section 704-5 to the multiply/divide unit 728 via the lines ZAQ 00-35.

The address preparation unit 704-3 generates addresses from the contents of various registers contained therein and applies the resultant logical, effective and/or absolute addresses for distribution to other units along the lines ASFA 00-35. The address preparation unit 704-3 receives the results of operations performed on a pair of operands by the execution unit 714 via the lines ZRESB 00-35. The unit 704-3 receives signals representative of the contents of a pair of base pointer registers from the control logic unit 701 via the lines RBASA and RBASA0-1. Outputs from the multiply/divide unit 728 are applied to the address preparation unit 704-3. Lastly, the contents of a secondary instruction register (RSIR) are applied as input to the unit 704-3 via the lines RSIR 00-35.

The data and address output circuits 704-4 generate the cache memory address signals which it applies to the cache unit 750 via the lines RAD0/ZAD0 00-35. These address signals correspond to the signals applied to one of the sets of input lines ZDI 00-35, ASFA 00-35 and ZRESB 00-35 selected by switches included within the circuits of block 704-4. Also, word address signals are applied via the lines ASFA 32-33.

The control logic unit 704-1 provides data paths which have an interface with various units included within the cache unit 705. The lines ZIB 00-35 provide an interface with an instruction buffer included within the cache 750. The lines ZDI 00-35 are used to transfer data signals from the cache 750 to the control logic unit 704-1.

As seen from FIG. 1, the control logic unit 704-1 provides a number of groups of output signals. These output signals include the contents of certain registers, as for example, a basic instruction register (RBIR) whose contents are applied as an input to control store 704-2 via the lines RBIR 18-27. The control logic unit 704-1 receives certain control signals read out from control store 704-2 via the lines CCSD0 13-31.

The control logic unit 704-1 also includes a secondary instruction register (RSIR) which is loaded in parallel with the basic instruction register at the start of processing an instruction. The contents of the secondary instruction register RSIR 00-35, as previously mentioned, are applied as inputs to the address preparation unit 704-3. Additionally, a portion of the contents of the secondary instruction register are applied as inputs to the auxiliary arithmetic control unit 722 via the lines RSIR 1-9 and 24-35, and to the decimal unit 730 via the lines RSIR 21-35.

The control store 704-2 as explained herein provides for an initial decoding of program instruction op-codes and therefore is arranged to include a number of storage locations (1024), one for each possible instruction op-code.

As mentioned, signals applied to lines RBIR 18-27 are applied as inputs to control store 704-2. These signals select one of the possible 1024 storage locations. The contents of the selected storage location are applied to the lines CCSD0 13-31 and to CCSD0 00-12 as shown in FIG. 1. The signals supplied to lines CCSD0 00-12 correspond to address signals which are used to address the execution control unit 701 as explained herein.

The execution unit 714 provides for instruction execution wherein unit 714 performs arithmetic and/or shift operations upon operands selected from the various inputs. The results of such operations are applied to selected outputs. The execution unit 714 receives data from a data input bus which corresponds to lines RDI 00-35 which have as their source the control logic unit 704-1. The contents of the accumulator and quotient registers included within section 704-5 are applied to the execution unit 714 via the lines ZEB 00-35 as mentioned previously. The signals applied to the input bus lines ZDO 00-35 from the address preparation unit 704-3 are applied via switches included within the execution unit 714 as output signals to the lines ZRESA 00-35 and ZRESB 00-35, as shown in FIG. 1. Additionally, execution unit 714 receives a set of scratch pad address signals from the auxiliary arithmetic and control unit 722 applied via the lines ZRESPA 00-06. Additionally, the unit 722 also provides shift information to the unit 714 via the lines ZRSC 00-35.

The character unit 720 is used to execute character type instructions which require such operations as translation and editing of data fields. As explained herein, these types of instructions are referred to as extended instruction set (EIS) instructions. Such instructions which the character unit 720 executes include the move, scan, compare type instructions. Signals representative of operands are applied via lines ZRESA 00-35. Information as to the type of character position within a word and the number of bits is applied to the character unit 720 via the input lines ZDB 00-07.

Information representative of the results of certain data operations is applied to the unit 722 via the lines ZOC 00-08. Such information includes exponent data and data in hexadecimal form. The character unit 720 applies output operand data and control information to the unit 722, the unit 730 and the unit 728 via the lines RCHU 00-35.

The auxiliary arithmetic and control unit 722 performs arithmetic operations upon control information such as exponents used in floating point operations, calculates operand lengths and pointers and generates count information. The results of these operations are applied to execution unit 714 via the lines ZRSPA 00-06 and lines ZRSC 00-06 as mentioned previously. Information signals corresponding to characters such as 9-bit characters, 4-bit characters, decimal data converted from input hexadecimal data, quotient information and sign information are applied to section 704-5 via the lines RAAU 00-08.

As seen from FIG. 1, the unit 722 receives a number of inputs. Character pointer information is applied via the lines ASFA 33-36. EIS numeric scale factor information are applied to the unit 722 via the lines RSIR 24-35. Other signals relating to fetching of specific instructions are applied via the lines RSIR 01-09. Exponent signals for floating point data are applied to the unit 722 via the lines ZOC 00-08 while floating point exponent data signals from unit 704-1 are applied via the lines RDI 00-08. Shift count information signals for certain instructions (e.g. binary shift instructions) are applied to the unit via the lines RDI 11-17. As concerns the input signals applied to the lines RCHU 00-35, lines 24-35 apply signals corresponding to the length of EIS instruction fields while 18-23 apply address modification signals to the unit 722.

The multiply/divide unit 728 provides for high-speed execution of multiply and divide instructions. This unit may be considered conventional in design and may take the form of the multiply unit described in U.S. Pat. No. 4,041,292 which is assigned to the same assignee as named herein. The unit 728 as seen from FIG. 1 receives multipler dividend and divisor input signals via the lines RCHU 00-35. The multiplicand input signal from register section 704-5 are applied via the lines ZAQ 00-35. The results of the calculations performed by the unit 728 are applied as output signals to the lines ZMD 00-35.

The decimal unit 730 is operative under firmware control during the processing of decimal numeric instructions. The instruction format and its related descriptor words are described in greater detail with reference to FIG. 5. The instruction word and the descriptor word information received by the decimal unit 730 via lines RSIR 21-35 and ASFA 33-36. They condition the decimal unit 730 to receive the operand described by the descriptor word from cache 750 via line $\overline{ZDI}$ 0-35. The decimal unit 730 strips the sign character and exponent characters from the operand word, packs the data into up to eight 4-bit characters per word, stores the data into 32-bit words, aligns and transfers the data words to the execution unit 714 via lines RDOD 00-35, ZMD 00-35 and ZDO 00-35. Data words stored in cache include up to four 9-bit characters of eight 4-bit characters in a 36 bit word. The 9-bit character includes five zone bits and four data bits. The zone bits are stripped from the 9-bit character and the remaining data bits are packed into a 32-bit register which may contain up to two cache data words made up of 9-bit characters or more cache data word made up of 4-bit characters. The packed data words of the operands are assembled in the execution unit 714 and processed in accordance with the decimal numeric instruction. The operand representing the desired result of the numeric instruction is transferred to the decimal unit 730 via lines ZRESA 00-35 to the character unit 720 and then to the decimal unit 730 via lines RCHU 4-35. There, the operand is processed in accordance with the coded information in a descriptor word. The operand is unpacked, required signs and exponents added, via lines ZADSP 3-11, EBCIDIC or ASC11 zone characters are added if 9-bit decimal characters are indicated by the descriptor word coded information, and stored back in cache 750 at an address specified by an address field in the descriptor word. The data is stored in cache 750 via lines RDOD 00-35, ZMD 00-35, ASFA 00-35 and RAD0-/ZAD0 00-35. The decimal unit 730 is under firmware control via lines MEM-DO 88, 89, 94-97. PK-VCTR 0-3 signals signals from the decimal unit 730 indicate to the execution address and branch circuit 701-1 status information in response to firmware commands received by the decimal unit 730 via the lines MEM-DO 88, 89, 94-97. The PK-VCTR 0-3 signals received by the execution address and branch 701-1 results in the execution control store 701-2 branching to a particular microprogram subroutine. U.S. Pat. No. 4,156,278 entitled "Multiple Control Store Microprogrammable Control Unit Including Multiple Function Register Control Field" described the branching logic associated with the execution control store 701-2.

Data and control signals are transferred between cache 750 and an SIU 100 via the data interface line 600 and between cache 750 and the processor 700 via the lines of interface 604. Lastly, the cache unit 750 receives address and data signals from the data and address output circuits 704-4 via the lines RAD0/ZAD0 00-35 and the lines ASFA 32-33.

EXECUTION UNIT 714—FIG. 2

The unit 714 includes as major units, addressable temporary register banks 714-10 and 714-12, an arithmetic logic unit (ALU) 714-20, a shifter 714-24 and a scratchpad memory 714-30. Additionally, the unit 714 includes a number of multiposition data selector switches 714-15, 714-17, 714-22, 714-26, 714-28, 714-34, 714-36 and 714-38 to provide flexibility in selecting operands and output results.

In operation, the operands are selected via the ZOPA switch 714-15 and ZOPB switch 714-17 from one of the registers of the banks 714-12 and 714-10 or from other input lines such as ZEBo-35 or RDIo-35 as shown. The ALU 714-20 and shifter 714-24 performs operations upon the selected operands and the results are selected via the switches 714-24, 714-36 and 714-38 to be applied to the output bus lines ZRESA 0-35 and ZRESB0-35. Similarly, the contents of a scratchpad location selected via signals applied to the ZRSPA 0-6 lines by the AACU unit 722 can be read out via the switches 714-34, 714-36 and 714-38.

The selected output results or other data are thereafter loaded into other registers within processor 700 including the temporary register banks 714-12 and 714-10 or the scratchpad memory 714-30 of execution unit 714.

In greater detail, the sources of operands are identical for both the ZOPA and ZOPB switches 714-15 and 714-17. The selection of switch position for the ZOPA switch and ZOPB switch is under the control of the microinstruction word. The ALU 714-20 performs logical, decimal and binary operations upon the selected operand data under the control of the microinstruction word.

The shifter 714-24 is a combinational logic network used to align, shift or rotate binary data under microprogram control. The input data signals from the ZSHFOP and ZEIS switches 714-28 and 714-22 can be viewed as being concatenated to form a single double word input. The shifter 714-24 provides a 36-bit output shifted in accordance with the shift count. The ZSHFOP switch 714-28 is controlled by the microinstruction word while the shift count is established by the sequence control constant field of the microinstruction word which is appropriately selected via the auxiliary arithmetic control unit 722. For the purposes of the present invention, the ALU 714-20 and the shifter 714-24 may be considered conventional in design. The microinstruction fields controlling the operation of the execution unit 714 are described in related U.S. Pat. No. 4,156,278 described supra.

The scratchpad memory 714-30 provides a working space for storing various data required for the execution of certain instructions as well as various constants and descriptor values. For example, octal locations 10-15 are used to store an edit instruction table value required for carrying out edit operations. Writing into the scratchpad memory 714-30 involves first loading the RSPB buffer register 714-32 with input data applied via the ZRESB switch 714-38. During a next cycle, the contents of the register 714-32 are written into the location specified by the signals applied to the ZRSPA 0-6 lines by the AACU unit 722. Writing takes place when bit 22 of the microinstruction word (RSP field) is forced to a binary ONE.

As concerns the other switches, as mentioned, the results produced by the unit 714 are provided via the ZALU switch 714-26, the BSPDI switch 714-34, the ZRESA switch 714-36 and the ZRESB switch under microprogram control. The ZALU and ZSPDI switches provide a first level of selection of the ZRESA and ZRESB switches which provide a last level of selection. Since both the ZRESA and ZRESB switches have identical input sources, they can provide the same output data.

Operands from the decimal unit 730 are received via the ZDO 00-35 lines and stored in selected RTRL 0-3 registers 714-12 and RTRH registers 714-10 as are described supra. Long operands are stored in scratchpad memory 714-30. The resultant operand is read through the ZRESA switch 714-36 into the RCH0 register 720-10 of character unit 720 and to the decimal unit 730 via the RCHU 0-35 line.

DECIMAL UNIT 730—GENERAL DESCRIPTION—SYSTEM

Referring to FIG. 3, the decimal unit 730 is operative under firmware control processing of decimal numeric instructions and receives data words from cache 750 made up of 4-bit characters or 9-bit EBCDIC or ASCII characters. The data word may contain a trailing sign or a leading sign which may be part of an overpunched character and will also contain an exponent if the data word is a part of a floating point operand.

The decimal unit 730 strips the sign and/or exponent from the data word, compresses the data words from 36-bit words to 32-bit words, packs both the 4-bit and 9-bit decimal digits into data words made up of 4-bit decimal digits, and transfers the resulting 32-bit data words of the execution unit 714 for processing as defined by the instruction.

The most significant and least significant words of the operand receives from cache 750 may contain information which is not a part of the operand. This rewrite information is stored in registers and added to the most significant and least significant words of the operand if required during the store operation.

The decimal unit 730 processes operands made up of decimal digits either as short operands or long operands. Short operands are 15 decimal digits long or less. Long operands are from 16 to 64 decimal digits long. Operands having more than 64 decimal digits are not processed in the decimal unit 730 but are processed by the firmware.

Short operands comprising 1 or 2 data words are transferred to temporary registers RTRL 0-3 714-12 and RTRH 4-7 714-10 in the execution unit 714. Long operands comprising from 3 to 8 words are transferred to the scratchpad memory 714-30 in the execution unit 714.

Decimal numeric instructions include an instruction word defining the arithmetic operation to be performed, a descriptor 1 word defining the characteristics of an operand 1, a descriptor 2 word defining the characteristics of an operand 2 and a descriptor 3 word defining the characteristics of a resultant operand 3. Some instructions use descriptor 2 to define the characteristics of both operand 2 and operand 3. The instruction and descriptor formats are shown in FIG. 5.

The decimal unit 730 under firmware control receives operands 1 and 2 from cache 750, aligns them and transfers them to the execution unit 714. Both operands are checked for an illegal sign or illegal digits. The resultant operand 3 is transferred from the execution unit 714 to the decimal unit 730 where it is unpacked to 36-bit data words from 32-bit data words, ASCII or EBCDIC zone characters are added for 9-bit words. Exponent characters and signs are added if required. Operand 2 or operand 3 rewrite information previously stored may be added. The operand is checked for zero-/overflow conditions, is rounded or truncated if required and stored back in cache 750.

Descriptors defining the operands are stored in the RSIR register (not shown in the drawings) of the control logic unit 704-1. The RSIR bit positions 21 through 35 corresponding to the bit positions of the descriptors of FIG. 5, are transferred to and stored in registers in the decimal unit 730. The RSIR bit positions 17-20 are transferred to the decimal unit as signals ASFA 33-36 which are also stored in a register in the decimal unit 730.

As shown in FIG. 5, the descriptor fields are defined as follows:

ASFA 33 is the least significant bit of the address of the most significant word of the operand indicating an odd or even word address.

ASFA 34-36 points to the digit position within the most significant word of the high order character of the operand.

RSIR 21 indicates an operand of 4-bit characters if a ONE or 9-bit characters if a ZERO.

RSIR 22-34 defines the operand type and sign position.
    00 Leading sign floating point or overpunched sign leading.
    01 Leading sign scaled.
    10 Trailing sign scaled
    11 No sign scaled or overpunched sign trailing.

RSIR 24-29 indicates the scale factor, i.e., the position of the decimal point. A negative number moves the decimal point to left of the least significant digit. A positive number moved the decimal point to the right of the least significant digit.

RSIR 30-35 indicates the number of characters in the operand. Characters include decimal digits, sign characters and exponents.

The firmware controls the decimal unit with the signals RCSR 88-89, 94-97. The signals are outputs from the execution control store 701-4. Except for the CLK, ZAM, MPYREG and DUCMD fields, the firmware word is described in detail in the aforementioned application Ser. No. 853,944.

TABLE 1

| RCSR Signals | | | | | | | Logic Name of Firmware |
|---|---|---|---|---|---|---|---|
| 88, 89, TYPE F | 94, CLK, | 95, ZAM, | 96 MPYREG | 97 | Description | | Controlled Signals |
| 1 | 0 | 0 | 0 | 0 | 0 | Set FMYDV if FP0P1D, otherwise NULL | DUCMD-200 |

TABLE 1-continued

| | | | | | | | |
|---|---|---|---|---|---|---|---|
| 1 | 0 | 0 | 0 | 0 | 1 | Select RESULT = ZERO indicator 1 | DUCMD-201 |
| 1 | 0 | 0 | 0 | 1 | 0 | Select OP1 = ZERO, OP2 = ZERO indicators | DUCMD-202 |
| 1 | 0 | 0 | 0 | 1 | 1 | Load STC MASK into RD0D | DUCMD-203 |
| 1 | 0 | 0 | 1 | 0 | 0 | Select DU OVERFLOW and TRUNCATION indicators | DUCMD-204 |
| 1 | 0 | 0 | 1 | 0 | 1 | Reset ZERO/OVERFLOW CHECK logic | DUCMD-205 |
| 1 | 0 | 0 | 1 | 1 | 0 | Set FCMPN if FPOP1D | DUCMD-206 |
| 1 | 0 | 0 | 1 | 1 | 1 | Unused | |

| RSCR | | | | | | | |
|---|---|---|---|---|---|---|---|
| 88, 89 TYPE F | | 94, | 95, 96, 97 DUCMD | | | DESCRIPTION | LOGIC NAME |
| 1 | 1 | 0 | 0 | 0 | 0 | Set FMVN if FPϕP1D, otherwise NULL | DUCMD-300 |
| 1 | 1 | 0 | 0 | 0 | 1 | Read OPERAND through DU | DUCMD-301 |
| 1 | 1 | 0 | 0 | 1 | 0 | Force Load Complete Status | DUCMD-302 |
| 1 | 1 | 0 | 0 | 1 | 1 | Store Operand Thru DU | DUCMD-303 |
| 1 | 1 | 0 | 1 | 0 | 0 | Check ZERO/OVERFLOW | DUCMD-304 |
| 1 | 1 | 0 | 1 | 0 | 1 | Transfer Data from RCHO to RPK | DUCMD-305 |
| 1 | 1 | 0 | 1 | 1 | 0 | Load Rewrite Data | DUCMD-306 |
| 1 | 1 | 0 | 1 | 1 | 1 | Load the DU Sign Register (RSGN) | DUCMD-307 |
| 1 | 1 | 1 | 0 | 0 | 0 | Load the DU Exponent Register (REXP) | DUCMD-308 |
| 1 | 1 | 1 | 0 | 0 | 1 | Put the Rounding Constant into RDϕD | DUCMD-309 |
| 1 | 1 | 1 | 0 | 1 | 0 | Put Operand Leading Zero Count into RDϕD | DUCMD-310 |
| 1 | 1 | 1 | 0 | 1 | 1 | Put Operand Word Count Into RDϕD | DUCMD-311 |
| 1 | 1 | 1 | 1 | 0 | 0 | Unused | |
| 1 | 1 | 1 | 1 | 0 | 1 | Select Descriptor Vector Indicators | DUCMD-313 |
| 1 | 1 | 1 | 1 | 1 | 0 | Select Store Op Vector Indicators | DUCMD-314 |
| 1 | 1 | 1 | 1 | 1 | 1 | Select Long Op Vector Indicators | DUCMD-315 |

Note that the RSCR bit positions 88 and 89, the TYPE F field, define the fields identified by RSCR bit positions 94-97. If the TYPE F field contains a "10" then microword fields CLK, ZAM, and MPYREG are selected. If the TYPE F field contains a "11" then microword field DUCMD is selected.

DUCMD 200 sets the FMYDV flag during a multiply or divide decimal instruction.

DUCMD 201 selects the ADSZ conditional branch.

DUCMD 202 selects the RRLTRD conditional branch indicator if operand 1 equals zero and selects the RREQRD conditional branch indicator if operand 2 equals zero.

DUCMD 203 transfers the RCHU 30-35 output signals storing the STC mask into the RDOD register 730-154.

DUCMD 204 selects the RRLTRD conditional branch indicator for an overflow and the RREQRD conditional branch indicator for a truncation operation.

DUCMD 205 resets the FCRD and FDOFL flags.

DUCMD 206 sets the FCMPN flag if the FPOP1D flag is at logical ONE.

DUCMD 300 sets the FMV flag if the FPOP1D flag is at logical ONE.

DUCMD 301 starts the operand load operation if the decimal unit 730.

DUCMD 302 forces completion of the load operation by setting the FLDCOMPL and the FRDP1 flags.

DUCMD 303 starts the store result through the decimal unit 730 by setting the FOPSTR and FMSDRN flags.

DUCMD 304 sets the FCZO flag for a check zero/overflow of the word stored in the RCHO register 720-10.

DUCMD 305 sets the FCZO and FRPK flags.

DUCMD 306 sets the FLDREWR flag and selects the RREQRD condition branch indicator for a truncation operation.

DUCMD 307 conditions the loading of the sign register RSGN 730-134.

DUCMD 308 conditions the loading of the exponent register REXP 730-138. Also conditions the loading of the RSF3 scale factor register of register bank 730-4 during a floating point FPOP3 cycle.

DUCMD 309 controls the loading of the rounding constant stored in the ZPK switch 730-150 into the proper character position of the RDOD register 730-154 and sets the FRCMD flag.

DUCMD 310 controls the loading of the operand leading zero count into the RDOD register 730-154.

DUCMD 311 controls the loading of the operand word count into the RDOD register 730-154.

DUCMD 312 unused.

DUCMD 313 selects the descriptor 1 vector and descriptor 2 vector indicators and sets the FDVC1 flag.

DUCMD 314 resets the FCRD flag and selects the store vector indicators.

DUCMD 315 selects the long input vector indicators.

The Decimal Unit 730 responds to the firmware requests with the PK VCTR 0-3 signals indicated below.

TABLE 2
VECTOR BRANCH DATA

| PK-VCTR | | | | |
|---|---|---|---|---|
| 0 | 1 | 2 | 3 | |
| | | | | TYPE - LENGTH |
| 0 | 0 | 0 | 0 | Short Operand and 4-bit data |
| 0 | 1 | 0 | 0 | Short Operand and 9-bit data |
| 1 | 0 | 0 | 0 | Short Operand and (4 or 9 bit data) and overpunched sign |
| 1 | 1 | 0 | 0 | Long Operand |
| | | | | DESCRIPTOR 1 VECTOR |
| 0 | 0 | 0 | 0 | Execute Descriptor 2 vector |
| 0 | 1 | 0 | 0 | Descriptor 1 = floating point |
| 1 | 0 | 0 | 0 | Descriptor 1 = overpunched leading sign, scaled |
| 1 | 1 | 0 | 0 | Descriptor 1 = overpunched trailing sign, scaled |
| | | | | DESCRIPTOR 2 VECTOR |
| 0 | 0 | 0 | 0 | Descriptor 2 ≠ floating point or overpunched sign |
| 0 | 1 | 0 | 0 | Descriptor 2 = floating point |
| 1 | 0 | 0 | 0 | Descriptor 2 = overpunched leading sign, scaled |
| 1 | 1 | 0 | 0 | Descriptor 2 = overpunched trailing sign, scaled |
| | | | | STORE VECTOR |
| 0 | 0 | 0 | 0 | Check for RESULT = ZERO, OVERFLOW |
| 0 | 1 | 0 | 0 | Floating point result - Check for RESULT = 0, Overflow |
| 1 | 0 | 0 | 0 | Overpunched leading sign output - check for RESULT = 0, Overflow |
| 1 | 1 | 0 | 0 | Overpunched trailing sign output - Check for RESULT = 0, Overflow |
| | | | | LONG - INPUT |
| 0 | 0 | 0 | 0 | Both operands scaled and adjusted length descriptor 1 ≦63 and adjusted length descriptor 2 ≦63 and overpunched sign |
| 0 | 1 | 0 | 0 | Both operands scaled and adjusted length descriptor 1 ≦ 63 and adjusted length descriptor 2 ≦ 63 and overpunched sign |
| 1 | 0 | 0 | 0 | Both operands scaled and adjusted length descriptor 1 >63 or adjusted length descriptor 2 >63 |
| 1 | 1 | 0 | 0 | Execute descriptor 1 and descriptor 2 vectors |

PREDICTED NUMBER OF CYCLES OF DELAY FOR PROCESSING DESCRIPTOR 1 OR DESCRIPTOR 2 OPERANDS

| PK-VCTR | | | | WORDS OF | CYCLES OF |
|---|---|---|---|---|---|
| 0 | 1 | 2 | 3 | DATA | DELAY |
| 0 | 0 | 0 | 0 | 1 | 0 |
| 0 | 0 | 0 | 1 | 2 | 0 |
| 0 | 0 | 1 | 0 | 1 | 1 |
| 0 | 0 | 1 | 1 | 2 | 1 |
| 0 | 1 | 0 | 0 | 1 | 2 |
| 0 | 1 | 0 | 1 | 2 | 2 |

The following Boolean expressions show the firmware selection of the vector branch data:

[1PKVCTR = FDUACT (DUCMD 315 + DUCMD 313·FDCV1 + FRDP1 (DUCMD 313·DUCMD 314·DUCMD 315))

[2PKVCTR = FDUACT (DUCMD 314 + DUCMD 315 + DUCMD 301 + DUCMD 313·FRDP1)

[4PKVCTR + FDUACT (DUCMD 313 + DUCMD 314 + DUCMD 315)

[PKVCTR = 1 selects the type length vector which indicates to the firmware whether the operand is a short or long operand, 4 bit characters or 9 bit characters and if a short operand whether there is an overpunched sign in the descriptor 1 or descriptor 2 operands.

[PKVCTR = 2 or 3 selects for short operands the number of cycles of delay needed after the first read command is sent to cache 750 to the first data word being sent to the execution unit 714. This prediction simplifies the firmware processing of short operands.

[PKVCTR = 4 selects the descriptor 1 vector which defines descriptor 1 as a floating point operand, an overpunched leading or trailing sign scaled operand or indicates to the firmware to execute the descriptor 2 vector.

[PKVCTR = 5 selects the descriptor 2 vector which defines descriptor 2 as a floating point or scaled operand with overpunched leading or trailing sign.

[PKVCTR = 6 selects the store vector which indicates to the firmware to specific check for resulting operand equal to zero.

[PKVCTR = 7 selects the long-input vector and indicates to the firmware the comparison between the operand lengths and 63 for scaled operands. The vector also indicates to the firmware to execute the descriptor 1 and descriptor 2 vectors.

The decimal unit 730 supplies a number of conditional branch indicators to the execute address and branch circuits logic 701-1.

| CONDITIONAL BRANCH INDICATORS | |
|---|---|
| Name | Source |
| START-WRT | RRLTRD |
| SEND-DATA | RREQRD |
| OP1 = ZERO | RRLTRD |
| OP2 = ZERO | RREQRD |
| OVERFLOW | RRLTRD |
| TRUNCATION | RREQRD |
| RESULT = ZERO | ADSZ |
| DATA-AVA | ADSZ |
| CK-STR-VECT | ZAMO |

The RRLTRD signal is generated:

1. during a DUCMD 202 command when the FOP1Z flag is set indicating that operand 1 is zero.

2. during a DUCMD 204 command when the FDOFL flag is set indicating that there was an operand overflow.

3. during a start write operation to indicate to the firmware to sent write commands to cache 750.

The RREQRD signal is generated:

1. during a DUCMD 204 or DUCMD 306 command with the truncation signal at logical 1 indicating that least significant digits of an operand will be lost.

2. during a DUCMD 202 command when the FOP2Z flag is set indicating operand 2 is zero.

3. during a send data operation to indicate to the firmware to transfer data to the decimal unit 730 from the execution unit 714.

The ADSZ signal is generated:

1. during a DUCMD 201 command when the operand is equal to zero.

2. when data is not available except during a DUCMD 201 command.

The ZAMO signal is generated to indicate a check store vector function such as floating point, overpunched character, overflow, result = 0 operand.

The conditional branch indicators are called for by the firmware and results in an execution control store 701-2 branch.

Description of decimal unit status flags including the boolean expressions for setting and resetting the flags are:

F3DESC      Set for the processing of operand 3 which is defined by either descriptor 2 or descriptor 3. The boolean expression is:

F3DESC SET: (FPOP · RDESC0 · $\overline{\text{RDESC1}}$)
F3DESC RESET: (FPOA)

FALT      Set during the store operation on alternate cycles. The decimal unit prepares a word for the RDOD register 730-154 on one cycle and transfers the word to the Execution Unit 714 on the next cycle. FALT set enables the storing of a word in the RDOD register. The boolean expression is:

FALT SET: ((DUCMD 303 + FOPSTR) · $\overline{\text{FALT}}$ · $\overline{\text{FPOA}}$)
FALT RESET: (FOPSTR · FALT + FPOA)

FCMPN      Set for a DUCMD 206 firmware command for a compare numeric instruction. The boolean expression is:

FCMPN SET: (FPOP1D · DUCMD 206)
FCMPN RESET: (FPOA)

FCPCO      Set when loading or storing 9-bit data words from odd addresses in Cache 750. The boolean expression is:

FCPCO SET: ((ZCPA0 · (FDUACT · $\overline{\text{FRDP1}}$ + SFOP2LD
    + FLDCOMPL · ($\overline{\text{DUCMD 303}}$ + FOPSTR))
    + $\overline{\text{FCPCO}}$ · (FOP1LD · $\overline{\text{SFOP2LD}}$
    + FOP2LD) · (FDID + FDFD) + $\overline{\text{FCPCO}}$
    · (DUCMD 303 + FOPSTR) · [$RDOD)
    · $\overline{\text{FPOA}}$)

FCPCO RESET: ($\overline{\text{ZCPA0}}$ · (FDUACT · $\overline{\text{FRDP1}}$
    + SFOP2LD + FLDCOMPL
    · $\overline{\text{DUCMD 303}}$ + FOPSTR)) + FCPCO
    · (FOP1LD · SFOP2LD + FOP2LD)
    · (FDID + FDFD) + FCPCO
    · (DUCMD 303 + FOPSTR) · [$RDOD
    + FPOA)

FCRP1      Set during an operand load operation when one of the operands is long. This flag lets the second load DU operand command (DUCMD 301) start a load process. A long operand causes the decimal unit to cancel the first load DU operand command (DUCMD 301) to enable the firmware to get set up to process a long operand. The firmware always assumes a short operand operation. The boolean expression is:

FCRP1 SET: ((DUCMD 301 · $\overline{\text{FRDP1}}$ · (D1EQOVP
    + D2EQOVP + LONG)) · $\overline{\text{FPOA}}$)
FCRP1 RESET: (FPOA)

FCRD      Set by a DUCMD 305 firmware command or an FCZO flag on for a check zero/overflow operation and reset by a DUCMD 205 or 314 command. Remains set for the entire operation processing. The boolean expression is:

FCRD SET: ((DUCMD 305 + FCZ0) · $\overline{\text{FPOA}}$)
FCRD RESET: (DUCMD 314 + DUCMD 205 + FPOA)

FCZ0      Set by a DUCMD 304 or 305 firmware command for a check zero/overflow of the word stored in the RCHO register 720-10. The boolean expression is:

FCZ0 SET: ((DUCMD 305 + DUCMD 304)) · $\overline{\text{FPOA}}$)

FCZ0 RESET: ($\overline{\text{SFCZ0}}$ + FPOA)

FDADIS      Set for 9-bit decimal digit operand loads on alternate cycles to allow two 4 digit words to be received from cache 750 and stored in the RDOD register 730-154 as one 8 digit word. The boolean expression is:

FDADIS SET: (($\overline{\text{ZTNSA0}}$ · FRDP2 + $\overline{\text{ZTNSB0}}$
    · FRDP2) · DATA-AV · $\overline{\text{FPOA}}$ · SFOP2LD)

FDADIS RESET: ($\overline{\text{SFDADIS}}$ · ([$RDI-PC + SFDFD
    + FDFD · RFDFD) + SFOP2LD)

FDATA-AV      Is set to load the RDOD register 730-154 by controlling the strobe signal [$RDODA. The boolean expression is:

FDATA-AV SET: (DATA-AV · $\overline{\text{FPOA}}$)

FDATA-AV RESET: ($\overline{\text{SFDATA-AV}}$ + FPOA)

FDFD      Is set during a load operation to indicate that the complete operand has been received from cache 750 by the decimal unit 730. The boolean expression is:

FDFD SET: (DFCO · FDID · ($\overline{\text{RFDFD}}$) · $\overline{\text{FPOA}}$ · (FOP1LD
    · $\overline{\text{SFOP2LD}}$ + FOP2LD))
FDFD RESET: (FPOA + DFCO · FDID · DTECO
    · [$RDODA + DFCO · FDID · FDTED
    + DTECO · [$RDODA · FDFD)

FDID      Set when operand data is loaded into the RDID registers 730-158. The boolean expression is:

FDID SET: ([$RDI-PC · $\overline{\text{FLDREWR}}$ · FRDP1)

FDID RESET: ($\overline{\text{SFDID}}$)

FDOFL      Set when an operand overflow is detected during a check zero/overflow operation and reset by a DUCMD 205. The boolean expression is:

FDOFL SET: ((DUCMD 305 + FCZO) · DOFL · $\overline{\text{FPOA}}$)
FDOFL RESET: (DUCMD 205 + FPOA)

FDTED      Set when all of the decimal digits of the operand were sent to the execution unit 714 but not all of the operand information has been received by the decimal unit; exponent or sign information for example. The boolean expression is:

-continued

|  | FDTED SET: (DTECO · [$RDODA · ($\overline{RFDFD}$) · $\overline{FPOA}$<br>· (FOP1LD · $\overline{SFOP2LD}$ + FOP2LD)) |
|---|---|
|  | FDTED RESET: (FRDFD) |
| FDUACT | Set during an FPOP control logic unit 704-1 cycle to indicate a decimal unit 730 operation. The boolean expression is:<br>FDUACT SET: (FPOP)<br>FDUACT RESET: (FPOA) |
| FDVC1 | Is set when the firmware sends a DUMCD 313 for descriptor 1 information so that descriptor 2 information is sent on the<br>next DUCMD 313. The boolean expression is:<br>FDVC1 SET: (DUCMD 313 · $\overline{FPOA}$)<br>FDVC1 RESET: (FPOA) |
| FDZERO | Is set if the operand check with the check zero/overflow commands DUCMD 304 or 305 equal to zero. The boolean expression is:<br>FDZERO SET: ((DUCMD 305 + FCZO) · $\overline{DZERO}$ · $\overline{FPOA}$)<br>FDZERO RESET: (FPOA + (DUCMD 305 + FCZO)<br>· DZERO · $\overline{FCRD}$) |
| FFDI | Is set when the first word of the operand from cache 750 is loaded into the decimal unit. The boolean expression is:<br>FFDI SET: ((FDID · $\overline{DFCO}$ · (FOP1LD + FOP2LD))<br>· $\overline{FPOA}$)<br>FFDI RESET: (SFOP2LD + FPOA) |
| FFDO | Is set when the first word of the operand is stored in the RDOD register 730-154 prior to being transferred to the execution unit 714. The boolean expression is:<br>FFDO (([$RDODA & (FOP1LD + FOP2LD)<br>· $\overline{DETCO}$) · $\overline{FPOA}$)<br>FFDO RESET: (SFOP2LD + FPOA) |
| FFOSD | Is set when the first data word to be stored in cache 750 is loaded into the RDOD register 730-154. The boolean expression is:<br>FFOSD SET: ((FOPSTR + DUCMD 303) · [$RDODA<br>· $\overline{FPOA}$)<br>FFOSD RESET: (FPOA) |
| FILLDIG | Is set when an illegal digit or illegal length is received by the decimal unit 730. It signals a fault to the system and is reset one cycle later by the FLDGR flag. The boolean expression is:<br>FILLDIG SET: ((([$RDODA · (FOP1LD + FOP2LD)<br>· DZIDEQID + ILLEGALLENGTH<br>· (SFOP1LD + FCZO)) · ($\overline{FLDGR}$<br>+ FPOA))<br>FILLDIG RESET: (FLDGR + FPOA) |
| FLDCOMPL | Is set when both operands have been transferred to the execution unit 714. The boolean expression is:<br>FLDCOMPL SET: ((((FOP1LD · FMVN + FOP2LD<br>· $\overline{FMVN}$) · (DFCO · FDID · DTECO<br>· [$RDODA + DFCO · FDID · FDTED<br>+ DTECO · [$RDODA · FDFD)<br>+ DUCMD 302) · $\overline{FPOA}$)<br>FLDCOMPL RESET: (FPOA) |
| FLDGR | Is set at the same time as the FILLDIG flag, i.e., when an illegal digit or illegal length is received in the decimal unit 730. It resets the FILLDIG after one cycle. The boolean expression is:<br>FLDGR SET: (([$RDODA · (FOP1LD + FOP2LD)<br>· DZIDEQID + ILLEGALLENGTH<br>· (SFOP1LD + FCZO)) · $\overline{FPOA}$)<br>FLDGR RESET: (FPOA) |
| FLDREWR | Is set from the firmware by a DUCMD 306 load rewrite data signal to start the sequence for storing the first or last words defined by descriptor 3 in the REWR 0-3 register bank 730-177. The boolean expression is:<br>FLDREWR SET: (DUCMD 306)<br>FLDREWR RESET: ($\overline{DUCMD\ 306}$) |
| FLDREWRH | Is set one cycle after the FLDREWR flag is set to strobe the first or last word into the REWR2 or REWR3 register respectively of the REWR 0-3 register 730-177 during a descriptor 2 store operation. The boolean expression is:<br>FLDREWRH SET: (FLDREWR)<br>FLDREWRH RESET: ($\overline{FLDREWR}$) |
| FMSDRGTE | Is set during a store operation on a DUCMD 303 firmware command if word count in the RRWC register is greater than or equal to the word count in the RWPC register at the time the DUCMD 303 is used. The boolean expression is:<br>FMSDRGTE SET: (DMSDRGTE · DUCMD 303) · $\overline{FALT}$<br>· ($\overline{DUCMD\ 303 · RRWCO}$ + FMSDRN)<br>· $\overline{FPOA}$)<br>FMSDRGTE RESET: (FPOA) |
| FMSDRN | Sets on the DUCMD 303 firmware command for a long operand store if the word count in the RRWC register is negative initially. The boolean expression is:<br>FMSDRN SET: (DUCMD 303 · RRWCO · $\overline{FPOA}$)<br>FMSDRN RESET: (FPOA) |
| FMSEQ | Sets during a long operand store sequence when the word count in the RRWC register equals the word count in the RWPC register. The boolean expression is: |

-continued

| | |
|---|---|
| | FMSEQ SET: (DMSEQ · $\overline{\text{(FSWRT} \cdot \text{DMSDRGTE}}$ + FSWRT<br>· (ZTNSA0 + $\overline{\text{ZTNSA0}}$ · FCPC0))<br>· $\overline{\text{(DUCMD 303 + FOPSTR)} \cdot \text{FALT}}$<br>· $\overline{\text{(DUCMD 303} \cdot \text{RRWCO + FMSDRN)}}$<br>· $\overline{\text{FPOA)}}$<br>FMSEQ RESET: (FPOA) |
| FMVN | Is set for a move numeric instruction. The boolean expression is:<br>FMVN SET: (DUCMD 300 · FPOP1D)<br>FMVN RESET: (FPOA) |
| FMYDV | Is set for multiply and divide instructions. This flag suppresses the scale factor alignment and right justifies the operands on a load operation. The boolean expression is:<br>FMYDV SET: (DUCMD 200 · FPOP1D)<br>FMYDV RESET: (FPOA) |
| FOP1LD | Is set for the operand one load operation. The boolean expression is:<br><br>FOP1LD SET: (DUCMD 301 · $\overline{\text{FRDP1}}$ · $\overline{\text{FPOA}}$ · $\overline{\text{(D1EQOVP}}$<br>· $\overline{\text{D]EQOVP} \cdot \text{LONG}}$ + FCRP1))<br>FOP1LD RESET: (FPOA + FOP1LD · DFCO · DTECO<br>· FDID · [$RDODA + FOP1LD · DFCO<br>· FDID · FDTED + FOP1LD · DTECO<br>· [$RDODA · FDFD) |
| FOP1Z | Is set if operand 1 equals zero. The boolean expression is:<br><br>FOP1Z SET: ([$RDODA · FOP1LD · $\overline{\text{DZIDEQZ}}$ · $\overline{\text{FPOA)}}$<br>FOP1Z RESET: (FPOA) |
| FOPSTR | Is set by the DUCMD 303 store operand through decimal unit 730 firmware command. The boolean expression is:<br><br>FOPSTR SET: (DUCMD 303 · $\overline{\text{FPOA)}}$<br>FOPSTR RESET: (FPOA) |
| FOP2F | Is set for an operand 2 load and the first data word is received in the RDID register 730-155. The boolean expression is:<br><br>FOP2F SET: (FDID · FOP2LD · $\overline{\text{FPOA}}$ · $\overline{\text{DFCO)}}$<br>FOP2F RESET: (FPOA + DFCO · FDID) |
| FOP2LD | Is set for the operand 2 load operation. The boolean expression is:<br><br>FOP2LD SET: ((FOP1LD · $\overline{\text{FMVN}}$ · (DUCMD 301<br>+ FRDP2) · (DFCO · FDID · DTECO<br>· [$RDODA + DFCO · FDID · FDTED<br>+ DTECO · [$RDODA · FDFD) + $\overline{\text{FOP1LD}}$<br>· $\overline{\text{FMVN}}$ · DUCMD 301 · FRDP1) · $\overline{\text{FPOA)}}$<br>FOP2LD RESET: (FPOA + FOP2LD · (DFCO · FDID<br>· DTECO · [$RDODA + DFCO · FDID<br>· FDTED + DTECO · [$RDODA · FDFD)) |
| FOP2S | Is set on an operand 2 load operation when the second word is stored in the RDID register 730-158. The boolean expression is:<br><br>FOP2S SET: (FOP2F · FDID · $\overline{\text{FPOA)}}$<br>FOP2S RESET: (FPOA) |
| FOP2Z | Is set if operand 2 is equal to zero. The boolean expression is:<br><br>FOP2Z SET: ([$RDODA · FOP2LD · $\overline{\text{DZIDEQZ}}$ · $\overline{\text{FPOA)}}$<br>FOP2Z RESET: (FPOA) |
| FPFL | Is set if operand 1 or operand 2 are specified as floating point. The boolean expression is:<br><br>FPFL SET: ((D1EQFLT + D2EQFLP) FOP1LD · $\overline{\text{FPOA))}}$<br>FPFL RESET: (FPOA) |
| FRCMD | Is set by a DUCMD 309 firmware command to read the rounding constant into the RDOD register 730-154. The boolean expression is:<br><br>FRCMD SET: (DUCMD 309 · $\overline{\text{FPOA)}}$<br>FRCMD RESET: (FPOA) |
| FRDIDH | Is set to indicate that the requested information is not stored in cache 750 and cache must request it of backing store. When the data is received in cache and sent to the decimal unit 730, the FRDIDH flag gates the recovery signal to strobe the data into the RDID register 730-158. The boolean expression is:<br>FRDIDH SET: ([$RDI-PC)<br>FRDIDH RESET: (FRDIDH) |
| FRDP1 | Is set by DUCMD 301 or DUCMD 302 firmware commands to indicate that the command for reading the first operand has been issued to the decimal unit 730. The boolean expression is:<br><br>FRDP1 SET: ((DUCMD 301 · $\overline{\text{(D1EQOVP}}$ · $\overline{\text{D2EQOVP}}$<br>· $\overline{\text{LONG}}$ + FCRP1) + DUCMD 302)<br>· $\overline{\text{FPOA)}}$<br>FRDP1 RESET: (FPOA) |
| FRDP2 | Set by a DUCMD 301 firmware command when the FRDP1 flag is set to indicate that the command for reading the second operand has been issued to the decimal unit 730. The boolean expression is:<br><br>FRDP2 SET: (DUCMD 301 · FRDP1 · $\overline{\text{FPOA)}}$<br>FRDP2 RESET: (FPOA) |
| FREWR | Is set by the FLDREWRH flag in the cycle following the setting of the FLDREWRH flag. The flag is used to force the rewrite data to be read from REWR2 and REWR3 during the operand store process. The boolean expression is:<br><br>FREWR SET: (FLDREWRH · $\overline{\text{FPOA)}}$ |

-continued

| | |
|---|---|
| FREWR2 | FREWR RESET: (FPOA)<br>Is set by the FREWR and FLDREWRH flags both on. It causes the REWR3 register to be used to provide rewrite data for the last word of operand 3. The boolean expression is:<br><br>FREWR2 SET: (FLDREWRH · FREWR · $\overline{\text{FPOA}}$)<br>FREWR2 RESET: (FPOA) |
| F3DESC | Is set for the descriptor 3 operation. The boolean expression is:<br><br>F3DESC SET: (FPOP · RDESC0 · $\overline{\text{RDESC1}}$)<br>F3DESC RESET: (FPOA) |
| FPOP3D | Is set for the cycle following FPOP3 cycle of the control logic unit 704-1. The boolean expression is:<br><br>FPOP3D SET: (FPOP · RDESC0 · $\overline{\text{RDESC1}}$)<br><br>FPOP3D RESET: ($\overline{\text{FPOA}}$ + FPOP3D · $\overline{\text{(DUCMD 305}}$<br>+ FCZ0)) |
| FPTL | Is set for the condition that the adjusted length, length plus scale factor difference is greater than 63 characters. The boolean expression is:<br><br>FPTL SET: ($\overline{\text{ALNSLTE63}}$ · FOP1LD · $\overline{\text{FPOA}}$)<br>FPTL RESET: (FPOA) |
| FRPK | Is set on a DUCMD 305 transfer data from RCHO to RPK firmware command and is used for the short operation store. The boolean expression is:<br><br>FRPK SET: (DUCMD 305 · $\overline{\text{D1EQFLP}}$ · $\overline{\text{FPOA}}$)<br>FRPK RESET: (FPOA + DUCMD 205) |
| FSND | Is set when the SEND DATA bit is forced to a ONE. SEND DATA indicates to the firmware to load a new word into the RCHO register 720-10 during a long operand store. The FSND flag strobes the previous word stored in the RCHO register into the RPK register 730-162. The boolean expression is:<br><br>FSND SET: (FALT · SEND-DATA · $\overline{\text{FPOA}}$)<br><br>FSND RESET: (FALT · $\overline{\text{SEND-DATA}}$ + FPOA) |
| FSSFD | Is set when the scale factor difference is negative. The boolean expression is:<br><br>FSSFD SET: (ASF2 · FDUACT · $\overline{\text{FRDP1}}$)<br><br>FSSFD RESET: ($\overline{\text{(ASF2}}$ · FDUACT · $\overline{\text{FRDP1}}$ + FPOA) |
| FSWRT | Is set when the STRT-WRT signal to the firmware is forced to ONE. STRT-WRT enables the firmware to start issuing write commands to the cache 750 during the long operand store procedure. FSWRT informs the DU hardware control that the firmware is issuing write commands. The boolean expression is:<br><br>FSWRT SET: ($\overline{\text{FALT}}$ · STRT-WRT · (DUCMD 303<br>+ FOPSTR) · $\overline{\text{FPOA}}$)<br>FSWRT RESET: (FPOA) |
| FPOP1D | Is set for the cycle following FPOP1 cycle of the control logic unit 704-1. The boolean expression is:<br><br>FPOP1D SET: (FPOP · $\overline{\text{RDESC0}}$ · $\overline{\text{RDESC1}}$)<br><br>FPOP1D RESET: $\overline{\text{(SFPOP1D)}}$ |
| FTDB0<br>FTDB1 | Are set as a 2-bit counter to count down the number of cycles of delay for strobing the operand word into the RDOD register 730-154 for transfer to the execution unit 714. The boolean expression is:<br><br>FTDB0 SET: (TDB0 · DUCMD 301 · $\overline{\text{FPOA}}$)<br><br>FTDB0 RESET: ($\overline{\text{TDB0}}$ · DUCMD 301 + (FOP1LD<br>+ FOP2LD) · $\overline{\text{DUCMD 301}}$ · [SRD1-PC<br>+ FPOA)<br>FTDB1 SET: ((TDB1 · DUCMD 301 + $\overline{\text{FTDB0}}$<br>· (FOP1LD + FOP2LD) · $\overline{\text{DUCMD 301}}$<br>· [SRDI-PC) · $\overline{\text{FPOA}}$)<br><br>FTDB1 RESET: ($\overline{\text{TDB1}}$ · DUCMD 301 + $\overline{\text{FTDB1}}$<br>· (FOP1LD + FOP2LD) · $\overline{\text{DUCMD 301}}$<br>· [SRDI-PC + FPOA) |
| FZCF | Is set during the load operand procedure when the first non zero character is detected in the input data. It indicates the end of the number of leading zeros in the operand.<br>FZCF SET: ([SRDODA · (FOP1LD + FOP2LD)<br>· LZC0 · $\overline{\text{FPOA}}$))<br>FZCF RESET: (SFOP2LD + FPOA)) |

The following are the boolean expressions for functions not previously described:

SFCZO = (DUCMD 305 + DUCMD 304) · $\overline{\text{FPOA}}$
SFDADIS = ($\overline{\text{ZTNSA0}}$ · FRDP2 + $\overline{\text{ZTNSB0}}$ · FRDP2) · DATA-AV · $\overline{\text{FPOA}}$
· SFOP2LD
SFDFD = DFCO · FDID · $\overline{\text{(RFDFD)}}$ · $\overline{\text{FPOA}}$
SFDATA-AV = DATA-AV · $\overline{\text{FPOA}}$ -continued

```
[SRDI-PC = ENABIZ + FTRF + FMT · (SRADO1 · (RDIN.EQ.(1-11))
         + TYPE · MISREG.EQ.4) + TYPD · (IBUF.EQ.3)) + FMT
         · ((IBPIPE.EQ.1) · FE12 + TYPBD (2) · (MSKD.NEQ.0)
         + TYPBD (3) · STL) + FREQCA · (RMEM.EQ.(8-10))
         + FREQD1 + FDIDBL
SFDID = [SRDI-PC · FLDREWR · FRDP1
DOFL indicates an overflow condition
DZIDEQID = (ZID4 · (ZID5 + ZID6)) + (ZID8 · (ZID9 + ZID10))
         + (ZID12 · (ZID13 + ZID14)) + (ZID16 · (ZID17
         + ZID18)) + (ZID20 · (ZID21 + ZID 22)) + (ZID24
         · (ZID25 + ZID26)) + (ZID28 · (ZID29 + ZID30))
         + (ZID32 · (ZID33 + ZID34))
ILLEGALLENGTH = ALNDA0 + ALNDB0 + ALNDAZ + ALNDBZ
```

DZERO indicates that the operand word contains all zeros.

DECIMAL UNIT—LOGIC

The scale factors for operands 1, 2 and 3 are received in the decimal unit 730 through a 4 position switch ZSFN 730-2 over signal lines RSIR 24–29 from the control logic unit 704-1 and are stored in registers RSF0, RSF1, RSF2 respectively of register bank 730-4. ZADSP 3-11 signal lines apply the scale factor to position 0 of the switch when the scale factor is calculated by the firmware. ALNDA signal lines apply the adjusted length of operands to position 2 of the switch during a floating point operation. The AEDC and ZEDC signals are applied to position 3 of the switch to store the number of effective digits during a floating point operation. This is described in greater detail as part of the store operation description.

Control signals [1ZSFN and [2ZSFN select the switch 730-2 positions. The boolean expressions are $$[1ZSFN = ((F3DESC + FMVN) \cdot FLDCOMPL \cdot \overline{F\text{-}POP} \cdot (D1EQFLP + DUCMD\ 305 + FCZ0))$$

$$[2ZSFN = ((F3DESC + FMVN) \cdot FLDCOMPL \cdot \overline{F\text{-}POP} \cdot D1EQFLP)$$

For non floating point operands the operand 2 scale factor is selected by the RSF1 position of a ZSFB switch 730-8 and is applied to an input of an ASF adder 730-10 where the operand 2 scale factor is subtracted from the operand 1 scale factor selected by the RSF0 position of a ZSFA switch 730-6. If the operand 1 scale factor is larger than the operand 2 scale factor then the signals ASF0-9 represent a positive number and bit position ASF2 is a logical ZERO. If the operand 2 scale factor is larger, then the signals ASF0-9 represent a negative number and bit position ASF2 is a logical ONE.

The length or number of numeric characters for operands 1, 2 and 3 is received over signal lines RSIR 30–35 from the control logic unit 704-1 and are stored in registers RLND0, RLND1 and RLND2 respectively of a register bank 730-12. An ALNDA adder 730-18 and an ALNDB adder 730-20 calculate the number of decimal digits in operands 1 and 2 respectively. This is accomplished by subtracting the number of non digit characters in the operand such as sign and exponent from the length. The output of a decode logic 730-38 and a decode logic 730-40 is applied to adders ALNDA 730-18 and ALNDB 730-20 respectively to adjust the operand 1 and operand 2 lengths.

The sign and decimal type for operands 1, 2 and 3 are received over signal lines RSIR 21–23 from the control logic unit 704-1 and are loaded into registers RTNS0, RTNS1 and RTNS2 respectively of register bank 730-32. A ZTNSA switch 730-36 selects the operand 1 sign and decimal type stored in register RTNS0 and applies it to the decode logic 730-38. A scaled unsigned operand results in a ZERO output, a scaled signed operand results in a ONE output, a floating point operand having 9-bit decimal digits results in a TWO output and a floating point operand having 4-bit decimal digits results in a THREE output from decode logic 730-38 respectively. The output value is subtracted from the operand 1 length in the ALNDA adder 730-18 to give as an output, signals ALNDA 0–6 which indicate the number of decimal digits in operand 1. The number of decimal digits in operand 2 indicated by signals ALNDB 0–6 are calculated in a similar manner.

Signals DBITX and DBITZ at logical ONE indicates that a binary ONE is subtracted from the ALNDA adder 730-18 and the ALNDB adder 730-20 respectively. The boolean expressions are $$DBITX = ((\overline{ZTNSA1} \cdot ZTNSA2) + (ZTNSA0 \cdot ZT\text{-}NSA1 \cdot \overline{ZTNSA2}))$$

$$DBITZ = ((\overline{ZTNSB1} \cdot ZTNSB2) + (ZTNSB\text{-}0 \cdot ZTNSB1 \cdot \overline{ZTNSB2}))$$

Signals D1EQFLP and D2EQFLP at logical ONE indicates that a binary TWO is subtracted from the ALNDA adder 730-18 and the ALNDB adder 730-20 respectively. The boolean expressions are $$D1EQFLP = (ZTNSA1 \cdot ZTNSA2 \cdot (ZTNSA0 + \overline{ROP1}))$$

$$D2EQFLP = (ZTNSB1 \cdot ZTNSB2 \cdot (ZTNSB0 + \overline{ROP1}))$$

ROP1 indicates an overpunched sign instruction.

A SALND switch 730-22 selects the adjusted length of the operand with the larger scale factor and applies the output to an ALNS adder 730-24 which adds to it the absolute value of the scale factor ASF 0–9 output of the ASF 730-10 adder. Bit position ASF2 selects the operand with the larger scale factor. Bit position ASF2 at a logical ONE indicates that the operand 2 scale factor is larger.

The output of a ZLNADJ switch 730-26 applies the adjusted length to an ARWC counter 730-60 and an ACPR counter 730-62. The inputs to the ZLNADJ switch 730-26 are described below.

If the operand 1 scale factor is larger, then the switch selects the ALNS 0–9 input signals for operand 1 and the ALNDB input signals for operand 2. If the operand 2 scale factor is larger, then the switch selects the ALNDA 0–6 input signals for operand 1 and the ALNS input signals for operand 2. A floating point operand or a multiply or divide instruction does not require a scale factor alignment, therefore, the ALNDA 0-6 and ALNDB 0-6 input signals are selected for operand 1 and operand 2 respectively. The RLZC1 input signals are selected during a floating point store operand and provide the number of leading zeros in the operand.

Control signals [1ZLNADJ and [2ZLNADJ select one of four positions of ZLNADJ switch 730-26. The boolean expressions are

[1ZLNADJ = ($\overline{\text{FLDCOMPL}}$ · FRDP1 · ($\overline{\text{FSSFD}}$ + FMYDV + D1EQFLP +
+ D2EQFLP + ALNS2) + FLDCOMPL (F3DESC
+ FMVN) · D1EQFLP · FDOFL)

[2ZLNADJ = (FDOACT · $\overline{\text{FRDP1}}$ · $\overline{\text{ASF2}}$ + FDRP1 · FSSFD)
· $\overline{\text{FMYDV}}$ · $\overline{\text{D1EQFLP}}$ · $\overline{\text{D2EQFLP}}$ + $\overline{\text{ALNS2}}$ · $\overline{\text{FLDCOMPL}}$
+ FLDCOMPL · (F3DESC + FMVN) · $\overline{\text{D1EQFLP}}$
+ D1EQFLP · FDOFL)

If the outputs of the ALNDA adder 730-18, the ALNDB adder 730-20 and the ALNS adder 730-24 are all 15 decimal digits or less, this indicates that the non floating point decimal instructions are executed in the short operand mode. This mode provides for increased system throughput in processing decimal instructions over the prior art, since much of the operand manipulation is done using logic performing many of the operand setup functions in parallel. The prior art performed many of the functions serially. The boolean expression for the short operand is as follows:

Short = ($\overline{\text{ALNDA1}}$·$\overline{\text{ALNDA2}}$)($\overline{\text{ALND-B1}}$·$\overline{\text{ALNDB2}}$)($\overline{\text{ALNS3}}$·$\overline{\text{ALNS4}}$·$\overline{\text{ALNS5}}$+ -
FMYDV)(D1EQFLP+D2EQFLP)

Note that the scale factor adjustment is not implemented for the multiply or divide instructions.

The ARWC adder 730-60 calculates the number of words to be transferred to the execution unit 714 for both short and long operands. The signal [ONE-/ARWCB is applied to the minus input to adder ARWC 730-60 and, when at logical ONE, is subtracted from the adjusted length ZLNADJ 0-9 for a load operation. This assures that if the adjusted length as indicated by the ZLNADJ 0-9 signals was 8-decimal digits, i.e. the ZLNADJ6 signal was a ONE, then subtracting ONE would make bit position ARWC6 a ZERO and 8 decimal digits will be loaded into the first word. Discarding bit positions ARWC 7-9 leaves bit position ARWC6 as indicating the number of words for the short operand. A ONE in bit position ARWC6 indicates a short operand of 2 words and a ZERO indicates a short operand of one word. The boolean expression for control signal [ONE/ARWCB

[ONE/ARWCB = ($\overline{\text{FLDCOMPL}}$ + $\overline{\text{(ZTNSA1}}$
(ROP1 + ZTNSA0 + $\overline{\text{ZTNSA2}}$))+(FRPK·ZL-
NADJ7 ZLNADJ8·ZLNADJ9·FLDCOMPL))

The ARWC 0-6 output signals indicating the number of words in the operand is available to the firmware when the execution control store 701-4 sends a firmware word which is decoded in the decimal unit 730 as a DUCMD 311 "Put Operand Word Count into RDOD" signal and makes the word count available through a ZLZC switch 730-76, position 3 of a ZID switch 730-150, position 0 of a ZDOD switch 730-152 to a RDOD register 730-154 from which it is transferred to the execution unit 174.

The ACPR adder 730-62 subtracts the adjusted length in decimal digits decoded by the ZLNADJ 0-9 signals from decimal 64. The quantity 64 is the maximum number of digits in an operand that is processed by the decimal unit 730. The resulting output signals ACPR 3-9 indicate the number of zero digits to the left of the high order digit position for a 64 decimal digit operand. This value is stored in an RLMP register 730-102. Bit positions RLMP 4-6 store a binary code indicating the number of high order positions in the first word of the operand received by the decimal unit 730 to be forced to ZERO. The RLMP 4-6 signals are applied to a ZIDMU shifter 730-130. The number of high order digits to the left of the most significant digit position to be forced to ZERO is indicated by the number of successive signals starting with the ZIDMU 0 signal which are forced to ZERO. The ZIDMU 0-7 signals are applied to a [EZID logic control 730-132. The output signals [EZID 0-7 output signals suppress the ZID switch 730-150 in zero to the left positions and enables the digit positions of a ZID switch 730-150 starting with the most significant digit position. The portion of the RLMP register 730-102 storing the RLMP 0-3 bit positions has the capability of being incremented for every operand word received by the decimal unit 730 by the [CNTUP·RLMPU signal. The boolean equation is

[CNTUPRLMPU = ((FOP1LD + FOP2LD)·[$-
RDODA·SFOP2LD)

The boolean expression for the signal [ONE-/ACPNBB is:

[ONE/ACPNBB = ($\overline{\text{ZTNSA1}}$
ROP1 + ZTNSA0 + ZTNSA2)
((FDUACT.FRDP1) + FLDCOMPL·FRPK·$\overline{\text{ZL-NADJ7·ZLNADJ8·ZLANDJ9}}$)) + (ZTNSB1
(ROP1 + ZTNSB0 + ZTNSB2))·(FRDP1·FL-
DCOMPL))

An ATMP adder 730-30 calculates the number of zeros to the right of the least significant digit of the operand with the larger scale factor. The ZASFB switch 730-28 selects the adjusted scale factor binary signals ASF 0-9 which are added to the quantity 63 if the operand 2 scale factor is larger or subtracted from the quantity 63 if the operand 1 scale factor is larger. The output signals ATMP 3-9 are loaded into an RTMP register 730-100. Bit positions RTMP 0-3 store a binary count of the number of words of the operand to the left of the word containing the least significant digit position. Bit positions RTMP 4-6 store a binary number indicating the least significant bit position. Signals RTMP 4-6 indicate the number of zeros to the right of the least significant digit.

A comparator 730-104 compares signals RTMP 0-3 and RLMP 0-3. The difference equals the number of words of the operand to be received by the decimal unit 730 from cache 750. The binary word count RLMP 0-3 is incremented each time a word of the operand is loaded into the RDOD register 730-154. The difference between binary signals RTMP 0-3 and RLMP 0-3 is zero when the last word of the operand is received in the decimal unit 730 thereby enabling the A=B output signal of the comparator 730-104. This enables the TMSC 0-3 output of TMSC logic control 730-106 which is a binary count of the number of zeros to the right of the least significant digit. This count is applied to the TMSC logic control 730-106 by signals $\overline{\text{RTMP}}$ 4-6. The TMSC 0-3 count is applied to a ZIDML shifter 730-120. The number of low order digit positions to the right of the least significant digit to be forced to ZERO is indicated by the number of successive signals starting with the ZIDML 7 signal which are forced to ZERO. The ZIDML 0-7 signals are applied to the [EZID 0-7 logic control 730-132. The output signals [EZID 0-7 reflect the ZMIDL 0-7 signal states and enable the high order positions of the ZID switch 730-150, forcing the low order positions to the right of the least significant digit to ZERO.

The ASFA 33-36 signals are received from the address preparation unit 704-3 for operands 1, 2 and 3 and are stored in registers RCP0, RCP1 and RCP2 respectively of a register bank 730-42.

The ASFA 33 signal indicates the least significant bit of the cache 750 address of the high order word of the operand indicating whether this word is from an odd or even memory address location. This is used in the compacting of operands having 9-bit characters which are received in the decimal unit 730 as 4 decimal characters per word to 8-decimal digits per word, which is sent to the execution unit 714.

For 9-bit character operands, signals ASFA 34 and 35 indicate the position of the leading character in the high order word of the operand. For 4-bit character operand words, signals ASFA 34-36 indicate the position of the leading character in the high order word of the operand.

The operand pointer stored in register RCP0 is selected through the RCP0 position of a ZCPA switch 730-44 and applied to a ZCPNB switch 730-48. The ZCPA 0-2 position of the ZCPNB switch 730-48 is selected if operand 1 comprises 9-bit characters and the ZCPA 1-3 position is selected if operand 1 comprises 4-bit characters. Signal [ONE/ACPNBB is applied to an input of the ACPNB adder 730-50 and is added to the ZCPNB 0-2 withals if operand 1 has a leading sign. This is indicated by the 1-bit of the RTNS0 register being a ZERO. The ACPNB 1-3 output of the adder points to the most significant decimal digit position of the high order word of operand 1 as it is received in the decimal unit 730 from cache 750.

An ACPDF adder 730-52 subtracts the high order digit position from the ACPR 7-9 signal output of the ACPR adder 730-62. The ACPR 7-9 binary signal indicates the number of ZEROs to the left of the most significant digit in the operand high order word to be transferred to the execution unit 714. Subtracting binary signals ACPNB 1-3 from ACPR 7-9 in the ACPDF adder 730-52 gives an output binary value signal ACPDF 0-3 which is the amount the operand being received from cache 750 is shifted to be properly aligned for transfer to the execution unit 714. This shift value is stored in an RDSC register 730-58 through a switch 730-56. The output of the RDSC register 730-58 is applied to a shifter 730-156 through a ZDSC switch 730-72. The ACPDF adder 730-52 calculation is made separately for operand 1 and operand 2 and aligns the operands relative to each other for numeric processing in the execution unit 714.

A ZCPWC switch 730-46 selects the operand character pointer for 4-bit and 9-bit character operands and applies it to an ACPWC adder 730-66 where a quantity ONE is subtracted to give an output signal ACPWC 0-3. A ZLNT switch 730-64 selects the operand 1 length for the operand 1 load and the operand 2 length for the operand 2 load for input to an ASWC adder 730-68 where it is added to the ACPWC 0-3 binary signal. A ZSWC switch 730-70 selects an ASWC 0-4 switch position for a 9-bit character operand and an ASWC 0-3 switch position for a 4-bit character operand and applies the ZSWC 0-4 binary output for storage in an RSWC register 730-110.

The RSWC register 730-110 stores a binary count of the number of words in the operand to be transferred from cache 750 to the decimal unit 730. The count in the RSWC register 730-110 is decremented by a [CNTDWN-RSWC signal each time a word is received in the RDID register 730-158. The boolean expression for the signal is

[CNTDWN-RSWC = ([LDRRWC(FDID·(-
FOP1LD+FOP2LD)
·$\overline{\text{DFCO}}$ + [SRDODA·(DUCMD
303+FOPSTR)))

[LDRRWC=(FDUACT·FRDP1+SFOP2LD
+FLDCOMPL·(FOPSTR+DUCMD 303))

DFCO=$\overline{\text{RSWC0}}$·$\overline{\text{RSWC1}}$·$\overline{\text{RSWC2}}$·$\overline{\text{RSW-}}$
$\overline{\text{C3}}$·$\overline{\text{RSWC4}}$

[SRDODA=(FCDATA-AV+DUCMD
203+DUCMD 310 +DUCMD
309+FRPK·$\overline{\text{DUCMD 303}}$+FRPK·FALT
·FSWRT)·DUCMD 311

The RSWC register 730-110 at zero indicates that all the words of the operand have been received by the decimal unit and the DFCO signal output sets the FDFD flag in status flag control logic 730-202.

The ARWC adder 730-60 output signals ARWC 0-6 are stored in an RRWC register 730-88 when the [LDRRWC signal is at logical ONE. The RRWC register 730-110 stores the number of words in the operand to be transferred to the execution unit 714 during the load operation. Each time a word of an operand is loaded into the RDOD register 730-154, the RRWC register 730-110 is decremented by one when the [CUTDWN-RRWC signal is at logical ONE. The boolean expression is

[CNTDWN-RRWC = ($\overline{\text{DTECO}}$ · (FOP1LD + FOP2LD) · [SRDODA
+ ((FOPSTR + DUCMD 303 · ($\overline{\text{DMSDRGTE}}$
+ ($\overline{\text{DMSEQ}}$ · RDSC0))) · $\overline{\text{FALT}}$ · ($\overline{\text{FSWRT}}$
· DMSDRGTE + ($\overline{\text{ZTNSA0}}$ · FCPC0 + ZTNSA0)
· FSWRT)) · $\overline{\text{FRPK}}$ + FRPK · DUCMD 303
· ($\overline{\text{ZTNSA0}}$ · FCPC0 + ZTNSA0))

-continued $$DTECO = \overline{RRWC0} \cdot \overline{RRWC1} \cdot \overline{RRWC2} \cdot \overline{RRWC3} \cdot \overline{RRWC4} \cdot \overline{RRWC5} \cdot \overline{RRWC6}$$

The RRWC register 739-110 at ZERO indicates that all the decimal digits of the operand have been sent to the execution unit 714 by the DTECO output signal setting the FDTED flag in status flag control logic 730-202.

The FOP1LD flag is set by the firmware initiating a DUCMD 301 signal indicating a "Read Operand through Decimal Unit" operation. The FOP1LD flag is reset when the DFCO and DTECO output signals indicate that both the RSWC register 730-110 and the RRWC register 730-88 respectively have decremented to ZERO during the operand 1 load operation. The FRDP1 flag set indicates that the DUCMD 301 has been issued to read operand 1 through the decimal unit 730.

The FOP2LD flag is set by the firmware to read operand 2 when the DUCMD 301 has been issued with the FRDP1 flag set. The FOP2LD flag is reset and the FLDCOMP flag is set indicating that the load operation is complete when both the RRWC and RSWC registers have decremented to ZERO during the operand 2 operation, i.e., both operands 1 and 2 have been processed in the decimal unit 730 and transferred to the execution unit 714.

An RLZC1 register 730-96 and an RLZC2 register 730-98 are used to indicate to the firmware the number of zeros to the left of the most significant non-zero digit in operand 1 and operand 2 respectively. Register positions RLZC1 1-3 and RLZC2 1-3 are loaded with the ARWC 4-6 output signals of the ARWC counter 730-60. This essentially prebiases the word count portion of the RLZC1 and RLZC2 registers, bit positions RLZC1 and RLZC2 0-3 with the value of 7 words minus the number of words to be sent to the execution unit (binary value of the ARWC counter 730-60 bit positions ARWC 4-6) and equals the number of words not being sent to the execution unit 714. The number of leading zeros to the left of each operand is sensed at the output of the ZID 730-150. The ZID 04-35 signals are applied to the load zero count logic 730-182 and the output LZC 0-3 indicates the number of leading zeros in the word. Signal LZCO being a ONE indicates that all the decimal digits of the word are zero, a ONE is added to the RLZC1 or RLZC2 registers at the bit 3 position and the next word is received from cache 750. Again, if the word contains all zeros then signal LCZO is a ONE, a ONE is again added to the bit 3 position and the next word is received from cache 750. Assume that the next word received from cache 750 does not contain all zeros, then the signals LZC 1-3 indicate the number of zeros to the left of the first non-zero decimal digit. This sets an FZCF flag indicating to the logic that the ZERO to the left count is completed for this operand. This count is transferred through a ZEDC switch 730-82 to the RLZC1 and RLZC2 registers and stored in bit positions RLZC1 4-6 and RLZC2 4-6 for their respective operands.

The binary values stored in the RLZC1 register 730-96 and RLZC2 register 730-98 are the count of the number of decimal digit positions to the left of operands 1 and 2 respectively to fill the 64 decimal digit positions set aside in the execution unit 714 for each operand.

The output of the RLZC1 and RLZC2 registers are transferred under firmware control through a ZLZC switch 730-76 position 3 of the ZID switch 730-150, through the ZDOD switch 730-152 to the RDOD register 730-154. The ARWC signal input to the ZLZC switch 730-76 provides the number of words transferred for a long operand. The ATMP signal input provides the word location to which the rounding constant is added. The boolean expressions controlling the RCZC1 register 730-96 and the RCZC2 register 730-98 for loading the low order positions of the registers are $$[SRLZC1L = ([SRDODA \cdot FOP1LD \cdot \overline{FZCF} + \\ (DUCMD\ 305 + FCZO) \cdot \overline{DEDCZ})$$

$$[SRLZC2L = ([SRDODA \cdot FOP2LD \cdot \overline{FZCF} + \\ (\overline{DUCMD}\ 305 \\ + FCZO) \cdot DEDCZ)$$

The boolean expressions for loading the high order positions of the registers are:

$$[LDRLZC1U = SFOP1LD + (DUCMD \\ 305 + FCZO) \cdot \overline{DEDCZ}$$

$$[LDRLZC2U = SFOP2LD + (DUCMD \\ 305 + FCZO) \cdot \overline{DEDCZ}$$

$$\overline{DEDCZ} = \overline{EDC0} \cdot \overline{EDC1} \cdot \overline{EDC2} \cdot \overline{EDC3}$$

The registers are incremented by

```
[CNTUPRLZC1U = [SRDODA · FOP1LD · FZCF · LZCO
[CNTUPRLZC2U = [SRDODA · FOP2LD · FZCF · LZCO
SFOP1LD = (DUCMD 301 · FRDP1 · FPOA · ( D1EQOVP · D2EQOVP
           · LONG + FCRP1))

SFOP2LD = (FOP1LD · FMVN · (DUCMD 301 + FRDP2) (DFCO
           · FDID · DTECO · [SRDODA + DFCO · FDID · FDTED
           + DTECO · [SRDODA · FDFD) + FOP1LD · FMVN
           · DUCMD 301 · FRDP1) FPOA

D1EQOVP = (DBITX · ROP1 · ZTNSAO)
D2EQOVP = (DBITZ · ROP1 · ZTNSBO)
LONG = ALNDAGTE16 + ALNDBGTE16 + ALNSGTE16
       · FMYDV + D1EQFLP + D2EQFLP
ALNDAGTE16 = ALNDA1 + ALNDA2
ALNDBGTE16 = ALNDB1 + ALNDB2
ALNSGTE16 = ALNS3 + ALNS4 + ALNS5
```

DECIMAL UNIT—LOAD OPERATION

Operands are transferred from cache 750 to the decimal unit 730 over signal bus $\overline{ZDI}$ 0-35 and are loaded into an $\overline{RDID}$ register 730-158 under firmware control.

The firmware initiates a DUCMD 301 "Read Operand Through Decimal Unit" command. This sets the FRDP1 and the FOP1LD flags to condition the decimal unit 730 logic to receive operand 1 from cache 750.

The RSWC register 730-110 is loaded with the number of words to be received from cache 750. The RRWC register 730-88 is loaded with the number of words to be sent to the execution unit 714. The RSWC register 730-110 is decremented by ONE for each word received from cache 750. The RRWC register 730-88 is decremented by ONE for each word sent to the execution unit 714. The boolean expressions for the loading and decrementing the RSWC and RRWC registers 730-110 and 730-88 respectively are:

$$[LDRSWC = ((\overline{FDUACT} \cdot \overline{FRDP1}) + (FLDCOMPL \cdot \overline{DUCMD\ 303} \cdot \overline{FOPSTR}) + SFOP2LD)$$
$$[CNTDWN\text{-}RSWC = ((\overline{LDRRWC}\ (FDID\ (FOP1LD + FOP2LD) \cdot \overline{DFCO} + [SRDODA \cdot (DUCMD\ 303 + FOPSTR)))$$
$$[LDRRWC = (\overline{FDUACT} \cdot \overline{FRDP1} + SFOP2LD + FLDCOMPL\ (FOPSTR + DUCMD\ 303))$$

$$[CNTDWN\text{-}RRWC = (\overline{DTECO} \cdot (FOP1LD + FOP2LD) \cdot [SRDODA + ((FOPSTR + (DUCMD\ 303\ (\overline{DMSDRGTE} + (\overline{DMSEQ} \cdot RDSCO)))) \cdot FALT \cdot (FSWRT \cdot DMSDRGTE + (\overline{ZTNSAO} \cdot FCPCO + ZTNSA \cdot FSWRT)) \cdot \overline{FRPK} + FRPK \cdot DUCMD\ 303 \cdot (\overline{ZTNSAO} \cdot FCPCO + ZNTSAO))$$

The FOP1LD flag is reset on the cycle following the RSWC and RRWC registers counting down to zero by the DFCO and DTECO outputs at logical ONE. The boolean equations are listed supra. This indicates that all of the operand 1 words have been received by the decimal unit 730 and sent to the execution unit 714. The firmware initiates another DUCMD 301 command which sets the FOP2LD flag since the FRDP1 flag is still set conditioning the decimal unit 730 to receive operand 2 words. Again the RSWC register 730-110 and the RRWC register 730-88 are loaded with number of words received from cache 750 and sent to the execution unit 714 respectively and counted down to zero indicating to the decimal unit 730 that operand 2 was received, processed, and transferred to the execution unit 714. The FOP2LD flop is then reset.

The operand may contain 4-bit or 9-bit decimal digits. Operands containing 4-bit decimal digits are processed through the decimal unit 730 differently from operands containing 9-bit decimal digits. Assuming that the operands contain words with 4-bit decimal digits and the first word is stored in the $\overline{RDID}$ register 730-158. Control signal [1ZPK is forced to a ONE selecting the 1 position of a ZPK switch 730-160. The RDID 0–35 output signal is compacted from a 36 bit word to a 32 word in the selected position 1 of the ZPK 730-160 switch and outputs as signal bus ZPK 0–31 which may indicate up to eight 4-bit decimal digits. The negated output signal bus $\overline{ZPK}$ 0–31 is stored in an RPK register 730-162. The decimal digits of this data word are the high order digits of the operand. If the decimal digits of the first word of the operand outputting the ZPK switch 730-160 have a sufficient number of decimal digits to be sent to the execution unit 714 as specified by the decimal unit 730 logic then the necessary switches are conditioned by their respective control signals to load the RDOD register 730-154. In this case the ZPK 0–31 output signals are selected through a ZPKR switch 730-164. The output signals ZPKR 0–31 are applied to the shifter 730-156 where they are shifted to the right an amount specified by the ZDSC 1-3 binary shift count output of the RDSC register 730-58. The ZDS 0–31 output signals are applied to a ZID switch 730-150 where non decimal digit characters such as signs and exponenets and also non-operand replacement characters are replaced by zero under control of the [EZID 0–3 ZID switch enable signal output of the [EZID control logic 730-132. The output signals ZID 4–35 are selected by position 0 of the ZDOD switch 730-152. ZDOD 4–35 output signals are stored in the RDOD register 730-154.

If the data word made up of 4-bit digits will not fill a sufficient portion of the RDOD register 730-154 for transfer to the execution unit 714, then the first word remains stored in the RPK register 730-162 and the next data word of 4-bit digits is transferred from cache 750 to the RDID register 730-158 under firmware control. The second data word is applied to the shifter 730-156 through the ZPK switch 730-160 and the ZPKR switch 730-164. The first data word stored in the RPK register 730-162 is applied to the shifter 730-156 through a ZPKL switch 730-166. The shift count signal ZDSC 1–3 selects 32 of the 60 inputs to the shifter 730-156. The ZDS 0–31 output signals are stored in the RDOD register 730-154 through the ZID switch 730-150 and the ZDOD switch 730-152. Necessary zeros to the left and right are added to the ZDS 0-31 shifter output under control of the [EZID 0–7 enable signals while the operand word is switched through the ZID switch 730-150.

If the operand from cache 750 to the decimal unit 730 consists of a 9-bit decimal digit the first data word containing a maximum of 4 decimal digits is stored in the $\overline{RDID}$ register 730-158. The 9-bit decimal digits are stripped of the 5 high order bits of each decimal digit and compacted as the word is switched through the selected 2 position of the ZPK switch 730-160 and are stored in either the left 16-bits of the RPK 0–15 register 730-162 if from an even address in cache 750 or are stored in the right 16-bits of the RPK 16–31 register 730-162 if from an odd address in cache 750.

If a data word may be made up to send to the execution unit 714 then it inputs the shifter 730-156 through the ZPK switch 730-160 and the ZPKR switch 730-164. Note that the decimal digits are repeated in ZPK 0–15 and ZPK 16–31 switch position 2 as the digits pass through the ZPK 0–31 switch. The extraneous digits, the sign, exponent and rewrite digits are stripped from the data word in the ZID 730-150 switch. The ZDS 0–31 output of the shifter 730-156 is stored in the RDOD register 730-154 through positions 0 of the ZID switch 730-150 and the ZDOD switch 730-150 and the ZDOD switch 730-152.

Assuming that the first data word comprising 9-bit characters was received from an even cache 750 address and stored in RPK 0–15 register 730-162, the second data word would be received from an odd cache 750 address and would be stored in the RPK 16-31 register 730-162.

The second data word is applied to the shifter 730-156 through the ZPK switch 730-160 and the ZPKR switch 730-164 after being stripped of the high order 5-bits of each 9-bit decimal digit and packed into both halves of the ZPK 0-31 data word. The first data word stored in either the odd address or even address half of the RPK register 730-162 is applied to the shifter 730-156 through the ZPKL switch 730-166.

Control signals [1ZPK and [2ZPK select one of four positions of the ZPK switch 730-160. Position 0 is selected for the store operation, position 1 for the 4-bit digit operand, position 2 for the 9-bit digit operand and position 3 for the rounding operations. The boolean equations are

[1ZPK = ZTNSAO·FOP1LD + ZTNSBO·
  ·FOP2LD + DUCMD 309

[2ZPK = $\overline{\text{ZTNSAO}}$·FOP1LD + $\overline{\text{ZTNSBO}}$·
  ·FOP2LD + DUCMD 309

Control signal [$RPKU enables the loading of the RPK register 730-162, positions RPK 0-15 for 9-bit operands from an even cache 750 address, and 4-bit operands. Control signal [$RPKL enables the loading of RPK register 730-162, positions RPK 16-31 for 9-bit operands from an odd cache 750 address, and 4-bit operands.

The boolean equations are

[$RPKU = DUCMD 305 + FDID · (ZTNSA0 · FOP1LD
  + ZTNSB0 · FOP2LD + $\overline{\text{ZTNSA0}}$ · FOP1LD
  · FCPC0 + $\overline{\text{ZTNSB0}}$ · FOP2LD · $\overline{\text{FCPC0}}$)
  + $\overline{\text{FRPK}}$ · FOPSTR · ($\overline{\text{FALT}}$ · $\overline{\text{FSWRT}}$ + FALT
  · FSWRT · FSND))

[$RPKL = DUCMD 305 + FDID · (ZTNSA0 · FOP1LD
  + ZTNSB0 · FOP2LD + $\overline{\text{ZTNSA0}}$ · FOP1LD
  · FCPC0 + $\overline{\text{ZTNSB0}}$ · FOP2LD · $\overline{\text{FCPC0}}$)
  + $\overline{\text{FRPK}}$ · FOPSTR · ($\overline{\text{FALT}}$ · $\overline{\text{FSWRT}}$
  + FALT · FSWRT · FSND))

Control signals [OZPKL and [OZPKR enable respectively the ZPKL switch 730-166 and the ZPKR switch 730-164. Control signal [1ZPKL, at logical ONE selects the ZPK 4-31 bit positions from ZPKL switch 730-166 and the RPK 16-31 bit position from ZPKR switch 730-164. Control signal [1ZPKRU, at logical ONE, selects the RPK 0-15 bit positions of the ZPKR switch 730-164.

[OZPKA = FOP1LD + FOP2LD + (FOPSTR + DUCMD 303)
  · ($\overline{\text{FRPK}}$ · (DMSDREQ10 · RDSCO + DMSDREQOM1
  · $\overline{\text{RDSCO}}$) + $\overline{\text{FRPK FMSDRN}}$ · (DMSDRLTM1
  + $\overline{\text{FMSDRGTE}}$ · DMSDRLTM2) · FMSEQ))

[OZPKR = FOP1LD + FOP2LD + (FOPSTR + DUCMD 303)
  · ($\overline{\text{FRPK}}$ · (DMSDREQ21 · RDSCO + DMSDREQ10
  · $\overline{\text{RDSCO}}$) + $\overline{\text{FRPK}}$ · FMSDRN · ($\overline{\text{FMSDRGTE}}$
  · DMSDRLTM1 + $\overline{\text{RRWCO}}$) · DMSEQ) + DUCMD 309
  · $\overline{\text{FRPK}}$ + DIEQFLP + (ATMP 0-6) · $\overline{\text{FRCMD}}$
  + (ATMP 0 · 1 · 2 · 3 · 4 · 5 · 6) · FRCMD))

[1ZPKL = (DMSDRQEQ1 · RDCSO + DTECO · $\overline{\text{RDSCO}}$)
  · $\overline{\text{FRPK}}$ · (FOPSTR + DUCMD 303)

[1ZPKRU = (FOP1LD · $\overline{\text{ZTNSAO}}$ + FOP2LD · $\overline{\text{ZTNSBO}}$)
  · $\overline{\text{RDSC1}}$ + (FOPSTR + DUMCD 303) · $\overline{\text{FRPK}}$
  · (DMSDRWEQ1 · RDSCO + DTEC0 · $\overline{\text{RDSCO}}$)

DMSDREQ10 = DTECO + DMSDRWEQ1

DMSDRWEQM1 = RRWC0·FFWC1·RRW-
  C2·RRWC3·RRWC4·RRWC5·RRWC6

DMSDREQOM1 = DTECO + DMSDRWEQM2

DMSDRLTM1 = RRWCO·$\overline{\text{DMSDRWEQM1}}$

DMSDRLTM2 = RRWCO·($\overline{\text{RRWC1}}$·RRW-
  C2·RRWC3·RRWC4·RRWC5)

DMSDREQ21 = DMSDRWEQ2 + DMSDRWEQ1

DTECO = $\overline{\text{RRWCO}}$·$\overline{\text{RRWC1}}$·$\overline{\text{RRWC2}}$·$\overline{\text{RRW-}}$
  $\overline{\text{C3·RRWC4·RRWC5·RRWC6}}$ DMSDRWEQ1 = $\overline{\text{RRWCO}}$·$\overline{\text{RRWC1}}$·RRW-
  $\overline{\text{C2·RRWC3·RRWC4·RRWC5·RRWC6}}$ DMSDRWEQ2 = $\overline{\text{RRWC0}}$·$\overline{\text{RRWC1}}$·RRW-
  $\overline{\text{C2·RRWC3·RRWC4·RRWC5·RRWC6}}$ The boolean expressions for the control signals that condition the operand words during both the load and store operation are as follows

[1Z1D = DUCMD 203 + DUCMD 310 + DUCMD
  311 + $\overline{\text{FRPK}}$ · FRCMD·DUCMD 309

[2Z1D 0-7 = DUCMD 310 + DUCMD
  311 + ($\overline{\text{FRPK·FRCMD}}$·DUCMD
  309) + ZCRDG·MASK

[1ZDOD0 = ([STRPKD + [UNPKDLWR-
  + [UNPKDUPR ([1ZSMR0 + [2ZSMR0)

[1ZDOD1 = ([STRPKD + [UNPKDLWR-
  + [UNPKDUPR ([1ZSMR2 + [2ZSMR2)

[1ZDOD2 = ([STRPKD + [UNPKDLWR-
  + [UNPKDUPR ([1ZSMR4 + [2ZSMR4)

[1ZDOD3 = ([STRPKD + [UNPKDLWR-
  + [UNPKDUPR ('1ZSMR6 + [2ZSMR6)

[2ZDOD0 = (4STRPKD + [UNPKDUPR-
  + [UNPKDLWR ([1ZSMR0 + [2ZSMR0))

[2ZDOD1 = (4STRPKD + [UNPKDUPR-
  + [UNPKDLWR ([1ZSMR2 + [2ZSMR2))

[2ZDOD2 = (4STRPKD + [UNPKDUPR-
  + [UNPKDLWR ([1ZSMR4 + [2ZSMR4))

[2ZDOD3 = (4STRPKD + [UNPKDUPR-
  + [UNPKDLWR ([1ZSMR6 + [2ZSMR6)

[1ZSMR 0-7 = SIGNMASK + REWUM 0-7 + REWLM 0-7

[2ZSMR 0–7 = EXPMASK + REWUM
0–7 + REWLM 0–7

[STRPKD = (ZTNSA0 (DUCMD 303 + FOPSTR))

[UNPKDLWR = $\overline{\text{(ZTNSA0}}$ (DUCMD
303 + FOPSTR)·FCPC0)

[UNPKDUPR = $\overline{\text{(ZTNSA0}}$ (DUCMD
303 + FOPSTR)·$\overline{\text{FCPC0}}$)

An ACPR adder 730-62 calculates the number of zeros digits to the left of the operand necessary to fill a 64 digit block of storage. The adjusted length ZLNADJ 0–9 output of switch 730-26 is subtracted from 64, the maximum number of digits that will be transferred between the decimal unit 730 and the execution unit 714. The output of the ACPR adder 730-62 is stored in the RLMP register 730-102. The RLMP 4–6 output signals, the low order 3-bits, store the number of 4-bit decimal digit positions to the left in the high order word to be forced to zero and is applied to the shift count input of a ZIDMU shifter 730-130. Those output signals ZIDMU 0–7, which indicate zero digits to the left, are forced to ZERO. This forces the indicated outputs of [EZID logic control 730-132, signals [EZID 0–7 to ZERO thereby forcing the selected digit positions of the ZID switch 730-150 to ZERO of the first word of the operand received by the decimal unit 730. If the operand had a leading sign, it would have been replaced by ZERO in the ZID 730-150 switch since the sign character position count was subtracted from each operand length in adders ALNDA 730-18 and ALNDB 730-20 respectively. Also, rewrite characters in the operand word would be replaced by ZERO's.

An ATMP adder 730-30 calculates the number of zeros to the right of the least significant digit position of the operand having the larger scale factor. Switch ZASFB 730-28 selects the number of zeros to the right for operand 1 or operand 2 during that cycle in which the operand transfers from cache 750 to the decimal unit 730.

If the operand 1 scale factor is larger than the operand 2 scale factor then the ASF 0–9 input to switch ZASFB 730-28 is a positive number which is subtracted from 63 in the ATMP adder 730-30 and the difference, output signals ATMP 3–9, are stored in an RTMP register 730-100. The low order positions $\overline{\text{RTMP}}$ 4–6 input a TMSC logic control 730-106 and output as signals TMSC 0–3 which are applied to the shift count input of a ZIDML shifter 730-128. This forces the ZIDML 0–7 output signals to indicate the number of digit zeros to the right of the operands. The ZIDML 0–7 output signals are applied to the [EZID logic control 730-132. The [EZID 0–7 output signals condition the indicated low order digit positions of the ZID switch 730-150 to ZERO thereby stripping trailing sign, exponent, and rewrite characters from the operand word.

Signals RTMP 0–3 the output of register 730-100 and signals RLMP 0–3 the output of register 730-102 indicate the cycle on which the operand word which requires the ZEROs to the right is transferred from the decimal unit 730 to the execution unit 714. The 64 decimal digit maximum transfer is made up of eight words of 8-decimal digits per word. Signals RLMP 0–3 are a binary representation of the number of words to the left of the word containing the most significant digit that contains all zeros. Signals RTMP 0–3 are a binary representation of the number of words in the maximum transfer minus the word in which ZEROs to the right are forced. Plus 1 is added to binary signals RLMP 0–3 each time register RDOD 730-154 is loaded. Signals RTMP 0–3 and RLMP 0–3 are compared in a comparator 730-104. Signals TMSC 1–3 are forced to ZERO on the cycles where binary signals RTMP 0–3 is greater than binary signals RLMP 0–3 ZEROs to the right are forced in the ZID switch 730-150 on the transfer cycle where comparator 730-104 indicates that the binary values of RLMP 0–3 and RTMP 0–3 are equal.

Control signal [$RTMP enables the input loading of RTMP register 730-100, and the RLMP 4–6 bit positions of the RLMP register 730-102. Control signal [$RTMP enables the output of the RLMP 0–3 bit positions of the RLMP register 730-102.

Control signal [ZERO/RLMPL enables the output of the RLMP 4–6 bit positions. Control signal [CNTUP-RLMPU increments the RLMP 0–3 bit positions. The boolean equations are

[$RTMP = (FDUACT·$\overline{\text{FRDPT}}$ + SFOP2LD)

[ZERO/RLMPL = (FFDO + $\overline{\text{(FOP1LD + FOP2L-}}$
D)·[2ZIDA))

[CNTUP-RLMPU = ((FOP1LD + FOP2LD)·[$RD-
0DA·SFOP2LD)

DECIMAL UNIT—FIG. 3—STORE OPERATION

The FPOP3 cycle loads descriptor 3 information into register RSIR 704-154 for a 3 descriptor instruction. In decimal arithmetic instructions, descriptor 3 defines the field into which the results of the calculation of the descriptor 1 and descriptor 2 operands are stored. Some instructions store the result of the descriptor 1 and descriptor 2 operand calculations in the field defined by descriptor 2. In either case the RSIR register 704-154 stores the descriptor information and transfers it to the decimal unit 730 for the store operand 3 operation. The decimal unit 730 receives operand 3 from the character unit 720 over the RCHU 0–35 signal bus. The decimal unit unpacks it, adds the sign and exponent if required, positions the operand 3 digits within the word, places the proper number of zeros to the left and right of the operand, adds required ASCII or EBCDIC zone bits and reinstates the portion of the first and last words of the operand that are not defined as part of the operand. The decimal unit 730 sets up the necessary controls in the logic to receive operand 3, manipulate it and store it in cache 750 in conformance with its descriptor information.

The operand 3 scale factor signals RSIR 24–29 inputs switch ZSFN 730-2 and are stored in register RSF2 of register bank 730-4. For the case where the input operands were such that the decimal unit 730 did the scale factor alignments, the ZSFA switch 730-6 selects the contents of the RSF2 register, and the ZSFB switch selects the contents of either the RSF0 or RSF1 register of register bank 730-4. The register selected is the one storing the smaller scale factor of operand 1 or 2. The FSSFD flag which is set by the scale factor comparison during the load operation makes the selection.

Control signals 4WRRSF1 and 4WRRSF2 select 1 of the RSF 0–4 registers 730-4 in which the scale factor is stored. The boolean expressions are

[WRRSF1 = ((F3DESC + FMVN) FLDCOMPL · $\overline{FPOP}$ · D1EQFLP)
(DUCMD 305 · FCZ0) + RDESC1 · FPOP + (FMYDV
+ FPTL + FPFL) DUCMD 308 · $\overline{D1EQFLP}$
(FMVN + F3DESC) · $\overline{FPOP}$ · FLDCOMPL

[WRRSF2 = ((FMYDV + FPTL + FPFL) DUCMD 308 · $\overline{FPOP}$ · FLDCOMPL
· $\overline{D1EQFLP}$ (FMVN + F3DESC) + RDESC0 · FPOP +
(F3DESC + FMVN) FLDCOMPL · FPOP · D1EQFLP)

The ZSFB switch 730-8 output is subtracted from the ZSFA switch 730-6 output in the ASF adder 730-10. The ASFO-9 output signal inputs the ALNS adder 730-24 and is also stored in the RSCLM register 730-144 where it serves as a pointer to the least significant end of the data to be actually stored.

For a floating point store operation, the RSF3 register of register bank 730-4 stores the adjusted length output of the ALNDA adder 730-18 and the RSF2 register holds the effective digit counts of the internal results the first time the count is taken, i.e., the output of the AEDC adder 730-86 and the ZEDC1-3 output of the ZEDC switch 730-82 inputting the ZSFN switch 730-2. In this case the contents of the RSF3 register is selected through the ZSFA switch 730-6 and the contents of the RSF2 register is selected through the ZSFB switch 730-8 and are subtracted from each other in the ASF adder 730-10. Again the ASFO-9 output is applied to the input of the ALNS adder 730-24 and the RSCLM register 730-144. However, for the purposes of obtaining the zero or effective digit count, the first time the operand is examined, the contents of the RSCLM register 730-144 are over written in forming up the inputs to the output zero and overflow detection logic 730-80. After the first count, if the number of effective digits is greater than the adjusted length of operand 3, the decimal overflow flag FDOFL will be set and the calculation of the effective digit count from RSF2 register contents minus the adjusted length from the contents of the RSF3 register will be enabled at the output of the RSCLM register 730-144 for a subsequent zero and overflow examination.

The length field signals RSIR 30-35 are stored in register RLND2 of register bank 730-12 and are switched through the RLND2 position of the ZLNDA switch 730-16 to input the ALNDA adder 730-18.

Control signals [1ZSFA and [2ZSFA select the outputs of the RSF 0-3 registers 730-4 for application to the plus input of ASF adder 730-10. Control signals [1ZSFB and [2ZSFB select the RSF 0-3 outputs for application to the minus input of ASF adder 730-10.

The boolean expressions are

[1ZSFA = $\overline{F3DESC}$ · FLDCOMPL · $\overline{(FMVN \cdot D1EQFLP)}$
[2ZSFA = F3DESC · FLDCOMPL + FMVN · FLDCOMPL
· $\overline{F1EQFLP}$

[1ZSFB = $\overline{FMVN \cdot FLDCOMPL}$ + FMVN · FSSFD
· FLDCOMPL · (F3DESC + FMVN)
· $\overline{D1EQFLP}$ · $\overline{(FMYDV + FPTL + FPFL)}$
+ FLDCOMPL · (F3DESC + FMVN) · D1EQFLP
+ FLDCOMPL · (F3DESC + FMVN) · $\overline{D1EQFLP}$
· $\overline{(FMYDV + FPTL + FPFL)}$ + FLDCOMPL · $\overline{(F3DESC + FMVN)}$
[2ZSFB = FLDCOMPL · (F3DESC + FMVN) · D1EQFLP
+ FLDCOMPL · (F3DESC + FMVN) · $\overline{D1EQFLP}$
· (FMYDV + FPTL + FPFL)

The sign and decimal type signals RSIR 21-23 are stored in register RTNS2 of register bank 730-32 and are transferred through the RTNS2 switch position of the ZTNSA switch 730-36 to the decode logic 730-38 where the correction factors to the length are determined. If operand 3 is a nine-bit floating point number then 2 digits are subtracted from the length. If operand 3 is scaled with a leading or trailing sign then 1 digit is subtracted from the length. A four-bit floating point number will have 3 digits subtracted from the length. The boolean expressions for signals DBITX and D1EQFLP which are applied to the ALNDA adder 730-18 and the ALNDB adder 730-20 were described supra.

The output of decode logic 730-38 is applied to the other inputs of the ALNDA adder 730-18 and subtracts from signals ZLNDA 0-5. The output of the ALNDA adder, signals ALNDA 0-6, adjusts the length to indicate the number of decimal digits in operand 3. The ALNDA 0-6 output signals are applied through the ZALND switch 730-22 to the input of the ALNS adder 730-24. The scale factor signals ASF 0-9 are added to the ALNDA length and the output signals ALNS 0-9 is the adjusted length of operand 3. The output ALNS 0-9 is applied through the zero position of the ZLNADJ switch 730-24 to input adders ARWC 730-60 and ACPR 730-62 and is stored in an RSCUM register 730-78. Adder ACPR subtracts the adjusted length ZLNADJ 3-9 from 64 and its output signals ACPR 3-9 indicates the position of the most significant digit to be stored within the internal result field. Signals ACPR 7-9 indicate the position of the most significant digit within the word of the operand containing the most significant decimal digit. The signals ACPR 7-9 are applied to the input of the ACPSC adder 730-54.

The output of the ARWC adder 730-76, signals ARWC 0-6 are applied to the RRWC register 730-88 and indicates the location of the operand word containing the most significant digit to be transferred from the decimal unit 730 to cache 750. A ONE is added to the ARWC adder in the case of operand 3 having a leading sign which would result in another word being transferred to cache 750.

For the floating point operation during the first examination for zero or overflow, i.e., the DUCMD 304 check zero overflow command and for any subsequent examinations for which the overflow flag FDOFL has not been set then the ALNDA adder 730-18 output is selected through the ZINADJ switch 730-26. If on a floating point output result the decimal overflow flag FDOFL had been set then the ALNS adder 730-24 output is selected through the ZLNADJ switch 730-26. The ALNS adder 731-24 forms the difference between the adjusted length output of the ALNDA adder 730-18 and the effective digit count minus the adjusted length from the ASF adder 730-10 output.

The starting character pointer signals ASFA 33–36 are stored in register RCP2 of register bank 730-42 and are selected by the RCP2 switch position of the ZCPA switch 730-44. Signal ZCPA 0–3 inputs the ZCPNB switch 730-48. If operand 3 is made up of 4-bit characters then signals ZCPA 1–3 are selected and if operand 3 is made up of 9-bit characters then signals ZCPA 0–2 are selected as the output signals ZCPNB 0–2 to input the ACPNB adder 730-50. A ONE is added to the ACPNB adder if the operand has a leading sign. The output signals ACPNB 0–3 are applied to the input of an ACPSC adder 730-54. Switch 730-56 by means of the FLDCOMPL status flag selects signals ACPSC 0–3 for storage in register RDSC 730-58. The ACPSC adder 730-54 subtracts the most significant digit position within the internal operand word as indicated by the ACPR 7–9 signals from the digit position within the in storage word of the most significant digit as indicated by the ACPNB signal to give the value of the number of digit positions the operand to be stored is shifted. This value represented by signals ACPSC 0–3 stored in register RDSC 730-58 is the shift count for the ZDS shifter 730-156.

The ASWC adder 730-68 output signals ASWC 0–6 provides input signals to ZSWC switch 730-70, ZRLMP switch 730-112, ZSMP switch 730-116 and the ZEMP switch 730-120. The outputs of the switches are applied to shifters 730-114, 730-118 and 730-122. The shifter outputs are applied to control [1ZSMR logic 730-142 and control [2ZSMR logic 730-146 for generating the [1ZSMR 0–7 and [2ZSMR 0–7 signals. These signals are applied to the ZSMR switch 730-180 for loading the sign, exponent and rewrite characters into the operand 3 words. The starting character pointer signals ZCPA 0–3 are applied to the input of switch 730-46 whose output, signals ZCPWC 0–2 are derived from signals ZCPA 1–2 for a 9-bit character operand and signals ZCPA 1–3 for a 4-bit character operand. Signals ZCPWC 0–3 are applied to the input of adder ACPWC 730-66. The decimal digit ONE is subtracted and the output, signals ACPWC 0–3 are applied to the input the ASWC adder 730-68. The length field of operand 3, signals ZLNDA 0–5, are added to the starting character pointer minus ONE to indicate the character pointer for the last decimal character in the operand.

The first word of operand 3 is received from the character unit 720 over signal lines RCHU 4–35, through buffer 730-168 which generates the assertion signals RCHU 4–35 and the negation signals $\overline{\text{RCHU}}$ 4–35.

Control signals [1ZPK and [2ZPK select the zero position of the ZPK switch 730-160 and RCHU 4–35 appear at the output of the switch as signals ZPK 0–31 and $\overline{\text{ZPK}}$ 0–31.

For the long operand, that is operands greater than 15 decimal digits the operand is transferred from the RCHU register 720-10 a word at a time with the word containing the most significant decimal digits being transferred to the decimal unit 730 first.

If a sign is required for the operand, the firmware loads the RSGN register 720-134 over the ZADSP 3–11 signal lines from the auxilliary arithmetic and control unit 722 in response to a DUCMD 307 command "Load the DU Sign Register". The output of the RSGN register 730-14 is applied to selected position 1 of the ZSMR switch 730-180. The character location in ZSMR switch position 1 is selected as follows. The output of the ASWC adder 730-68 points to the low order character position of a trailing sign. The output of the ZCPA switch 730-44 points to the leading sign character position. A ZSMP switch 730-116 selects a trailing or leading sign for 4-bit or 9-bit operands. The ZSMP 1–3 shift count is applied to an SIGNM shifter 730-118. The logical ZERO input to the SIGNM shifter 730-118 selects the one of the SIGNM 0–7 output signals for 4-bit operands. The logical ZERO and the ZTNSA0 signals select two adjacent signals of the SIGNM 0–7 output signals for 9-bit operands. The signal SIGNM 0–7 output of the shifter selects the [1ZSMR 0–7 output signal of control [1ZSMR 730-142 which selects 1 of 8 of the switch 1 positions of the ZSMR switch 730-180 for the 4-bit decimal digit operand sign or 2 adjacent positions for the 9-bit character operand sign.

The exponent is added to the operand in response to the DUCMD 308 "Load the DU Exponent Register" command. An REXP register 730-138 is loaded from the ZADSP 3–11 signal bus. A ZEXP switch 730-140 selects the exponent bit configuration for an operand having 4-bit decimal characters and storing the least significant 4-bit character in an even digit location in cache 750 through the ONE position of the ZEXP switch. All other exponents are selected through the 0 position of the switch. The signal ZEXP 0–8 output is applied to the 2 position of the ZSMR switch ZSMR 730-180. The exponent character positions are selected by the [2ZSMR 0–7 signal outputs from a control logic [2ZSMR 730-146. The signal is generated as follows. The boolean expressions for control signals [1ZSMR 0–7 and [2ZSMR 0–7 are shown supra.

The ASWC 5–6 output signals of the ASWC adder 730-68 indicate the location in the low order word of the operand of the low order character for 9-bit characters. Binary ONE is subtracted from this value in an ACPE adder 730-74 to give the location of the high order digit of the exponent for an operand made up of 4-bit characters. A ZEMP switch 730-120 selects the character position and the output signals ZEMP 1–3 are applied to an EXPM shifter 730-122. The EXPM 0–7 output signals are applied to the control logic [2ZSMR 730-146. The output signals [2ZSMR 0–7 select the two adjacent character positions in the ZSMR switch 730-180 to enable the exponent to be written into the low order word.

For a 4-bit operand it is possible for the most significant digit position for the exponent character to be in digit position 7 and the least significant position to be in digit position 0 of the next word. In this case the EXPM mask 730-122 generates a ONE output on the EXPM 7 signal line when the ZEMP switch 730-120 pointer is at decimal 7 during the next to the last word received. When the last word is received the ZEMP switch pointer remains at 7, the DBITS input signal is forced to a ONE resulting in the EXPM0 line being forced to ONE thereby activating the 0 character position of the least significant word.

The boolean expression for the DBITS signal is

DBITS=DFCO(DUCMD
 303+FOPSTR)(ACPE1·ACPE2·ACPE3)-
 D1EQFLP

Signals RDESC0 and RDESC1 are applied to the write select inputs of RLND0-3 register 730-12, RTNS0-3 register 730-32 and RCP0-3 registers 730-42. Signals RDESC0 and RDESC1 are binary coded 00, 01 and 10 to identify operands 1, 2 and 3 respectively.

Control signals [1ZLNDA and [2ZLNDA are applied to the ZLNDA switch 730-16 and the ZTNSA switch 730-36. Status flag $\overline{\text{FMVN}}$ is applied to the ZLNDB switch 730-20 and the ZTNSB switch 730-34.

Control signals [1ZCPA and [2ZCPA are applied to the ZCPA switch 730-44. The boolean expressions describing the signals are

[1ZLNDA=F3DESC·FLDCOMPL

[2ZLNDA=F3DESC·FLDCOMPL

[1ZCPA=FRDP1·$\overline{\text{FLDCOMPL}}$+$\overline{\text{F3DESC}}$·FLDCOMPL

[2ZCPA=F3DESC·FLDCOMPL

The ZSMR 0-35 output including decimal digits, exponents and sign are applied to the ZDOD switch 730-152 and are loaded into the RDOD register 730-154 for transfer to the cache 750.

In the short operand store the words are received from the execution unit 714 with the least significant word first and the most significant word last. A DUCMD 305 "Transfer Data from RCHO to RPK" command is initiated by the firmware. The least significant word is received from the character unit 720 over the RCHU 4-35 signal bus and is stored in the RPK register 730-162 through a buffer 730-168 and position 0 of the ZPK 730-160 switch. If the short operand comprises 2 words then the most significant word is placed in the RCHU register on the same cycle and appears over the RCHU 4-35 signal bus on the following cycle through the buffer 730-168 position 0 of the ZPK 730-160 switch and is applied to the input of a ZPKR switch 730-164 and a ZPKL switch 730-166 as signals ZPK 0-31. If the short operand was only one word long, zeros are placed on the RCHU bus to serve as the most significant word.

The negated output of the buffer 730-168, signals $\overline{\text{RCHU}}$ 4-35 is applied to the input of an output zero and overflow detection logic 730-80 and the effective digit logic 730-81. During the cycle in which the DUCMD 305 is present the least significant word is tested for zero or overflow and the most significant word is tested for zero or overflow on the following cycle which is marked by the FCZO flag being at logical ONE.

An RSCUM register 730-78 stores the operand 3 length plus scale factor output of the ZLNADJ switch 730-26. An RSCLM register 730-144 stores the operand 3 scale factor output of the ASF adder 730-10. The outputs of the RSCUM and RSCLM registers input the logic unit 730-80.

The zero and overflow detection logic 730-80 masks out the non operand 3 field and indicates to the firmware if the operand 3 field is zero since the DZERO output signal of detection logic 730-80 is at logical ONE in that case and also masks out the operand 3 field and the scale factor field and indicates to the firmware if there was a non zero decimal digit in the character positions to the left of the most significant character of operand 3 in the most significant word that is the DOFL output signal of detection logic 730-80 is at logical ONE. The RSCLM and RSCUM register outputs are used to mask out the non operand 3 character positions and, in addition the RSCUM register output masks out the operand 3 and scale factor character positions thereby enabling the overflow check.

The boolean expression for loading the RSCUM register 730-78 and the RSCLM register 730-144 is

[LDRSCM=(FLDCOMPL($\overline{\text{FCRD}}$+DUCMD314-
 +DUCMD205) (DUCMD 305+FCZ0))

The boolean expression for decrementing bit position RSCUM 0-6 and RSCLM 0-6 is

[CNTDWNRSCM=(DUCMD305+FCZ0)

A DUCMD 303 "Store Operand through Decimal Unit" command is initiated by the firmware. Since this is a short operand operation, 2 words are sent from the execution unit 714 to the decimal unit 730 over the RCHU 4-35 bus. The least significant word remains stored in the RPK register 730-162 and the most significant word remains on the RCHU 4-35 bus for the processing of the instruction.

The RRWC register 730-88 stores the internal location of the most significant data word to be transferred from the decimal unit 730 to cache 750. The register is decremented each time a word make up of 4-bit characters is sent to cache 750. The register is also decremented each time a word made up of 9-bit characters is sent to an odd address in cache 750. The boolean expression for the decrementing signal [CNTDWN-RRWC are described supra.

The RDSC register 730-58 stores the shift count which is applied to the ZDS shifter 730-156 through the ZDSC switch 730-72.

Assuming the shift count is positive, i.e. the RDSCO bit is a zero and the RRWC register indicates a word count of greater than 1, then the zero outputs of the ZPKL switch 730-166 and ZPKR 730-164 are applied to the shifter 730-156. The ZDS 0-31 output signals are zero and are applied to the ZID switch 730-150. The ZID 0-35 output signals are applied to the ZSMR switch 730-180 where the rewrite characters and leading sign may be added to the most significant word. The ZSMR 0-35 output is applied to the ZDOD switch where for 9-bit character words, EBCDIC or ASC11 zone characters are added and the ZDOD 0-35 output signals loaded into the RDOD register 730-154 for transfer to cache 750. Control signal [$RDODA at logical ONE loads the RDOD register 730-154. The boolean expression is

[$RDODA=((FDATA-AV+DUCMD203-
 +DUCMD
 310+DUCMD309+FRPK·DUCMD303+$\overline{\text{FR}}$-
 PK·FALT·FSWRT)·DUCMD 311)

When the count in the RRWC register 730-88 equals ONE then the most significant word stored in the RCHO register 720-10 and appearing on the RCHU 4-35 signal bus is applied through the buffer 730-168 through position 0 of the ZPK switch 730-160, through position 0 of the ZPKR switch 730-164, through the ZDS shifter 730-156 where it is shifted to the right the number of digit positions equal to the ZDSC 1-3 binary shift count. Zeros equal in number to the shift count are inserted to the left of the most significant digit position.

The ZDS 0-31 output signals are switched through position 0 of the ZID switch 730-150. The output signals ZID 4-35 are applied to the ZSMR switch for 4-bit characters where the word is expanded from 32 to 36 bit positions. The ZSMR 0-35 output signals are switched through position 3 of the ZDOD switch 730-152 to the RDOD register 730-154 from which the word is transferred to cache 750.

If the word comprises 9-bit characters, then the ZID 0-35 output signals are applied to position 2 of the ZDOD switch 730-152 if the word is written in an even address in cache 750 or applied to position 1 of the ZDOD switch 730-152 if the word is written in an odd address in cache 750 through the RDOD register 730-154. Assuming a word to an even address in cache 750. Then the ZID 4-35 is switched through position 2 of the ZDOD switch 730-152 where the 4 characters indicated by ZID 4-19 are expanded to 36 bits by adding the EBCDIC or ASCII zone characters. On the next cycle the ZID 4-35 signals are switched through position 1 of the ZDOD switch where the ZID 20-35 signals are expanded to 36 bits by adding the EBCDIC or ASCII zone characters.

The RRWC register 730-88 is decremented each time a 4-bit character word is transferred to cache 750 or each time a 9-bit character word is transferred to an odd address in cache 750. The RRWC counter 730-88 is decremented to zero with the shift count ZDSC 1-3 a positive binary number. In this case the ZPK 4-31 output signals are applied through the ZPKL switch 730-166 and the RK 0-3 output signals are applied through the ZPKR switch 730-164 and the second word is processed as before.

The RRWC register 730-88 is decremented to binary −1 with the shift count ZDSC 1-3 a positive number. The RPK register 730-162 storing the least significant word has its RPK 0-31 output signals applied through the ZPKL switch 730-166 to the ZDS shifter 730-156. Zeros were applied to the ZDS shifter 730-156 through the ZPKR switch. The ZDS 0-31 output signals are applied through the switches to load the RDOD register 730-154 for transfer to cache 750.

If required the RRWC register 730-88 is decremented to binary −2. Zeros are applied to the ZDS shifter 730-156 inputs. This cycle of operation enables the exponent of trailing sign and also replacement characters to be stored in the RDOD register 730-154 after being switched through the ZEWR switch 730-180 and the ZDOD switch 730-152.

Each of the above store operations is enabled by the DUCMD 303 signal set by a firmware command to load the word in the RDOD register 730-154 on a first firmware cycle and to write the word in cache 750 on a second firmware cycle. The first and second firmware cycles are repeated until all of the words containing operand 3 information are transferred to cache 750.

The sequence of steps for loading cache 750 for a negative shift count, i.e., the RDSCO output signal is equal to ONE, is the same as for the positive shift count with the exception that the binary value in the RRWC register 730-88 at each step is one more than its corresponding value for the positive shift count.

Figure 2:
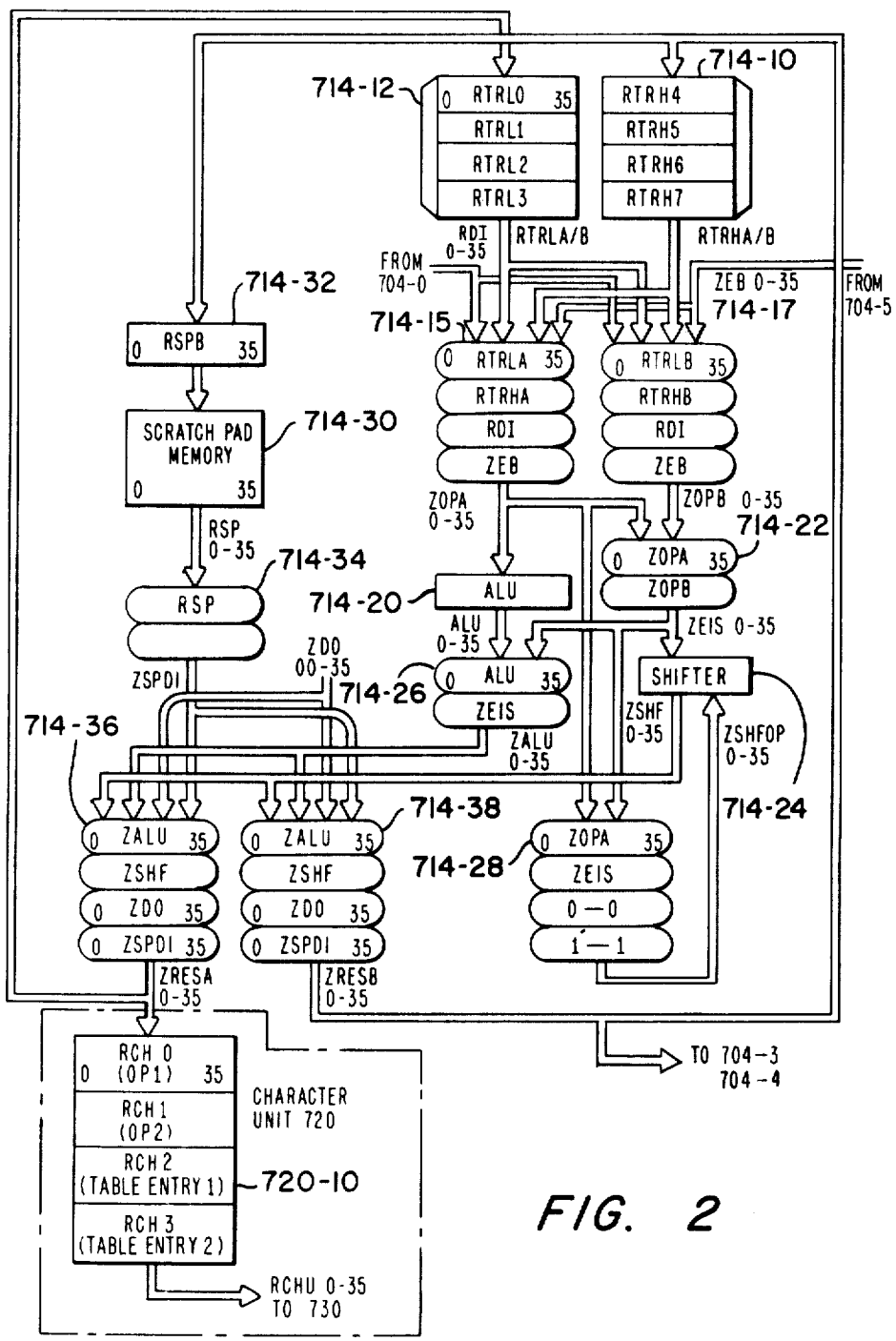
FIG. 2 is a block diagram of the execution unit and a portion of the character unit of the host processor.

As a part of the long operand store operation the firmware initiates a DUCMD 304 "Check Zero/Overflow" operation. Operand 3 information is sent from the execution unit 714 to the decimal unit 730 under firmware control a word at a time starting with the least significant word. A DUCMD 304 command is issued for each significant word to be checked and the word is put into the RCHO register 720-10, FIG. 2, at the same time. The last DUCMD 304 command is issued by the firmware for the most significant word of the long operand. The decimal unit 730 scans each word received on the cycle following the DUCMD 304 command which is marked by the FCZ0 flag being set from the least significant word to most significant word, counting the number of digits to the right of, and including the most significant digit. This count is stored in the RWPC register 730-84, RLZC1 register 730-96, and RLZC2 730-98. The output of these registers is available to the firmware in response to a DUCMD 311 "Put Operand Word Count into RDOD" command.

Effective digit logic 730-81, FIG. 7, examines the resultant operand word RCHU 4-35, received from the character unit 730. The resultant operand word was generated in the execution unit 714 and is the result of the decimal numeric operation performed on operand 1 and operand 2.

The negated signals $\overline{RCHU\ 4\text{-}35}$ are applied to the inputs of NAND gates 81-2 through 81-16. Decimal digit 0 signals $\overline{RCHU\ 4\text{-}7}$ are applied to the input of NAND gate 81-2. Decimal digit 1 signals $\overline{RCHU\ 8\text{-}11}$ are applied to the input of NAND gate 81-4. In a similar manner the decimal digit 2-7 signals are applied to the inputs of NAND gates 81-6 through 81-16.

If the inputs to NAND gate 81-2 indicate that digit position 0 signals $\overline{RCHU\ 4\text{-}7}$ indicates a digit which is not zero, then the DGZ-0 output signal of NAND gate 81-2, at logical ONE, is applied to the input of a NAND gate 81-42. The output signal EDC-0 at logical ONE indicates that the word contains eight significant digits. The output signal DGZ0, at logical ZERO, is applied to the inputs of NAND gates 81-44, 81-46 and 81-48 thereby forcing the output signals EDC1-3 to logical ZERO.

If the digit 0 signal $\overline{RCHU\ 4\text{-}7}$ indicates a decimal zero, then the output of NAND gate 81-42 is disabled and the output of NAND gates 81-44, 81-46 and 81-48, which indicates the position of the most significant digit of the operand word, is enabled. Assume that the most significant digit is in position 5 of the 8 position operand word positions 0 through 7. Therefore the DGZ5 output of NAND gate 81-12 is at logical ZERO and the DGZ 0-4 outputs of NAND gates 81-2, 81-4, 81-6, 81-8 and 81-10 are at logical ONE.

The DGZ-5 signal, at logical ZERO, is applied to the input of NAND gates 81-22 and 82-32. The output signals $\overline{DZR56}$ and $\overline{DZR5/7}$ at logical ONE are applied to the inputs of NAND gates 81-28, and 81-40 respectively. The other inputs, signals DZR 34 and DGZ4 at logical ONE are applied to the other inputs of NAND gates 81-28 and 81-40 respectively. The output signal $\overline{DZR3/6}$ at logical ZERO is applied to the input of a NAND gate 81-36. The other input, signal DZR12 at logical ONE forces the output signal DZR1-4 of NAND gate 8-34 to logical ZERO, thereby forcing the output of NAND gate 81-44, signal EDC-1 to logical ZERO. The output of NAND gate 81-36, signal $\overline{DZR1/6}$ is at logical ONE since the input signal DZR34 of NAND gate 81-28 is at logical ONE. This forces the output signal $\overline{DZR1/6}$ to logical ONE forcing the output of NAND gate 81-46, signal EDC-2 to logical ONE.

The output of NAND gate 81-40 signal $\overline{DZR4/7}$ at logical ZERO is applied to the input of NAND gate 81-24. The output signal DZR3/7 at logical ONE is applied to the inputs of a NAND gate 81-30. The other input signal DGZ-2 at logical ONE forces the output signal $\overline{DZR2/7}$ to logical ZERO thereby forcing the output of a NAND gate 81-38, signal DZR1/7 to logical ONE. This forces the output of NAND gate 81-48, signal EDC-3 to logical ONE.

Signals EDC-1, at logical ZERO, EDC-2 and EDC-3 at logical ONE, indicate that there are 3 significant digits in the operand word.

The least significant word is received by the decimal unit 730 over the RCHU 4-35 signal bus into the buffer 730-168. The negated output signals $\overline{RCHU\ 4-35}$ are applied to the effective digit logic 730-81. The effective digit logic 730-81 output signals EDC 0-3 are applied to the input of the ZEDC switch 730-82. The ZEDC 1-3 output signals represent a binary count of the significant digits in the word starting from the most significant digits and counting to and including the low order digits position 7. The ZEDC 0 output signal at a logical ONE, indicating that the most significant position of the word, position zero, contains a decimal digit which is not a zero, is loaded into the AEDC adder 730-86 after the first word is received and the RWPC register 730-84 is incremented by ONE each time a subsequent word is received from the execution unit 714 by control signals [ENRWPC, [CNTUP-RWPC and [LDRWPC being applied to the input terminals of the RWPC register 730-84.

Boolean expressions for control signals [LDRWPC which loads the RWPC register 730-84, [CNTUP-RWPC which increments the register, and [ENRWPC which enables the output of the register are as follows:

[ENRWPC ((DUCMD
305 · FCZO) + FCRD·$\overline{DUCMD}$ 314·$\overline{DUCMD}$
205)

[LDRWPC ((DUCMD 305 + FCZO)
(FCRD + DUCMD 314 + DUCMD 205))

[CNTUP-RWPC (FCZO·FCRD·$\overline{DUCMD3}$-
14·$\overline{DUCMD}$ 205)

The RWPC 0-3 output signals are applied to one terminal of an AEDC adder 730-86. The ZEDCO signal is applied to another terminal of the AEDC adder 0-3 whose output is switched through the ZEDD switch 730-94 and stored in positions 0-3 of RLZC1 register 730-96 and RLZC2 register 730-98 whenever the received word has a non zero decimal digit stored. The ZEDC 1-3 binary output signals of the ZEDC switch 730-82 which indicates the number of significant digits in the word are stored in positions 4-6 of the RLZC1 register 730-96 and the RLZC2 register 730-98. The register outputs signals RLZC1 0-6 and RLZC2 0-6 are applied to the ZLZC switch 730-76, whose output is available to the firmware through position 3 of the ZID switch 730-150. The RLZC1 and RLZC2 registers both store the number of significant digits in operand 3. When the first word is received from the execution unit 714, assuming position 0 contains a decimal digit, not zero, the binary quantity 8 is stored in the RLZC1 and RLZC2 registers. The ZEDCO signal input to the AEDC adder 730-86 is a logical ONE. When the second word is received again assuming position 0 contains a decimal digit, then the ZECDO signal input to the ZEDC adder is at a ONE and the RWPC3 signal input is at a one. This forces the ZEDC 0-3 output to a binary 2 and the quantity binary 16 is stored in the RLZC1 and RLZC2 registers. Assuming the third word contains only 3 decimal digits with the most significant digit in position 5 then the ZEDC 0-3 will store a binary 011 in the RLZC1 and RLZC2 registers 730-96 and 730-98 respectively which will now have the quantity 19 stored in the registers.

The RLZC1-2 and RLZC2-2 bits (binary 16 bit) are again set since the AEDC 0-3 output is at binary 2. The RWPC 730-84 register was incremented from binary ONE to binary TWO. The RRWC register 730-88 stores the adjusted length of the operand which is calculated from length and scale factor values, as designated by the descriptor. The RWPC register 730-84 stores the number of words examined by the firmware as the result of the DUCMD 304 on a long operand In the long operand store operation it is necessary to compare operand 3 which is the result of the operand 1 and operand 2 calculations, as it exists internally in the execution unit 714 with the operand 3 as it is to be stored in cache 750, and to do so with a simplified firmware procedure.

Initially, the firmware issues the DUCMD 303 "Store Operand Thru DU" command. This command initiates the actual store sequence in the decimal unit 730. Unlike the short operand store procedure, the firmware will not prepare a write address and send a write command to cache 750 until it is permitted to do so by the decimal unit 730. The decimal unit 730 makes this decision based on the information stored in the RRWC register 730-88, the RWPC register 730-84 and the position of the most significant digit within the word when the operand is received by the decimal unit 730 from the execution unit 714 as indicated by the output of the ACPNB adder 730-50. As in the short operand case the output of the ACPR adder 730-62 is subtracted from the output of the ACPNB adder 730-50 in the ACPSC adder 730-54 to generate the shift count which is stored in the RDSC register 730-58.

It should be noted that every word stored in cache 750 requires 2 firmware cycles minimum for the store operation. The address in cache 750 in which the operand word is written is sent to cache 750 on the first cycle and the data to cache 750 is sent on the second cycle. The firmware therefore is organized in 2 step loops, the first step generates the address and the write command and the next step passes the data through from the decimal unit 730 to cache 750. The process starts on the cycle the firmware sends the DUCMD 303 command to the decimal unit 730. The firmware examines the start write signal RRLTRD to the execution address and branch circuits 701-1, FIG. 4, for logical ONE which indicates that a write command should be generated and issued to the cache 750.

The FSWRT flag is set to indicate to the decimal unit 730 that the firmware is sending write commands to cache 750. If the start write line RRLTRD is at logical ZERO then the firmware controls the loading of the RCHO register 720-10 of the character unit 720 with words from the execution unit 714 until the most significant word is stored. This is the case where the count in the RWPC register 730-84 would be greater than the count in the RRWC register 730-88. The RWPC register 730-84 is decremented each time a word is placed in the RCHO register 720-10 until the count in the RWPC register equals the count in the RRWC register if the RDSC register 730-58 indicates a positive shift or until the count in the RWPC register is less than the count in the RRWC register if the RDSC register indicates a negative shift. For a positive shift the most significant word is stored in the RCHO register 720-10. For a negative shift the most significant word is stored in the RPK register 730-162 and the second word is stored in the RCHO register 720-10.

For the positive shift operation, the start write line RRLTRD is forced to logical ONE and the firmware initiates a write into cache 750 loop when the RRWC register 730-88 count equals the RWPC register 730-86 count. This sets the FSND flag which strobes the previous word stored in the RCHO register 720-10 into the RPK register 730-162 and indicates to the firmware to load the next word into the RCHO register 720-10 from the execution unit 714 by forcing the send data signal RREQRD to logical ONE.

The boolean expressions for the start write signal RRLTRD and the send data signal RREQRD for long operand store operations are as follows:

flag is not set. This results in the RDOD register 73-154 outputting words containing all zeros to cache 750 and decrementing the RRWC register 730. When the comparator 730-90 indicates an equal condition, the FSND flag is set and under firmware control the most significant word is sent from the execution unit 714 to the decimal nitu 730 over the RCHU 4-35 signal bus thereby inputting the buffer 730-168. The buffer 730-168 output is applied to the 0 position of the ZPK switch 730-160. The most significant word is stored in the RPK register 730-162 from the $\overline{ZPK}$ switch 730-164. Control logic, not shown, enables the ZPKR switch if a data word can be assembled and sent to cache 750. In that case, the ZPKR 0-31 output signals are applied to the ZDS shifter 730-156 and the word shifted by a number of digit positions equal to the binary value of the ZDSC 1-3 signals. Zeros are applied on the ZPKL 4-31 signal bus. The ZDS 0-31 output signal is switched through

| | | |
|---|---|---|
| DSEND DATA | = | (FCPCO · $\overline{ZTNSAO}$ + ZTNSAO) · DMSEQ |
| | | · FSWRT · $\overline{FMSDRN}$ |
| DSTRTWRT | = | $\overline{FMSEQ}$ · $\overline{DMSDRGTE}$ · RDSCO + DMSDRGTE |
| | | · $\overline{RDSCO}$ + DUCMD 303 · RRWC0 |
| RREQRD | = | FDUACT · DSEND DATA · $\overline{DUCMD\ 202}$ |
| | | · $\overline{DUCMD\ 204}$ · $\overline{DUCMD\ 306}$ |
| RRLTRD | = | FDUACT · DSTRT-WRT · $\overline{DUCMD\ 202}$ |
| | | · $\overline{DUCMD\ 204}$ |
| $\overline{DMSDRGTE}$ | = | (RWPC 0-3 · MINUS · 1) > |
| | | ($\overline{RRWC0}$ · (RRWC1 + RRWC2) · RRWC3 · RRWC4 · RRWC5 · RRWC6 |
| DMSEQ | = | (RWPC 0-3 · MINUS · 1) = |
| | | ($\overline{RRWC0}$ · (RRWC1 + RRWC2) · RRWC3 · RRWC4 · RRWC5 · RRWC6 |
| DMSDRGT | = | (RWPC 0-3 · MINUS · 1) > |
| | | ($\overline{RRWC0}$ · (RRWC1 + RRWC2) · RRWC3 · RRWC4 · RRWC5 · RRWC6) |

The boolean expressions for the count down of the RWPC register 730-84 are as follows:

position 0 of the ZID switch 730-150 to position 0 of the ZSMR switch 730-180 if the operand comprises 4-bit

| | |
|---|---|
| [CNTDWN-RWPC = | FRPK · DUCMD 303 · ($\overline{ZTNSA0}$ · FCPCO + ZTNSA0) + $\overline{FRPK}$ · (FOPSTR + DUCMD 303 · DMSDRGTE) · $\overline{FALT}$ · ($\overline{FSWRT}$ · DMSDRGT + ($\overline{ZTNSAO}$ · FCPCO + ZTNSAO) · FSWRT · $\overline{DMSDRGT}$)) |
| [SRDOD = | FDATA-AV + DUCMD 203 + DUCMD 310 + DUCMD 311 + DUCMD 309 + FRPK · DUCMD 303 + $\overline{FRPK}$ · $\overline{FALT}$ · FSWRT |

The decimal unit 730 compares the RRWC 0-6 output signals with the RWPC 0-3 output signals in a comparator 730-90. The comparator output signals DMSEQ, DMSDRGT and DMSDRGTE condition the register and switch control 730-91 for generating the RRLTRD and RREQRD signals and the various signals controlling the ZPK switch 730-160, the RPK register 730-162, the ZPKL switch 730-166 and the ZPKR switch 730-164. The signals also condition the status flag control logic 730-202 for setting the FSND, FSWRT, FMSDRGTE and FMSEQ flags as well as decrementing the RRWC register 730-88 and the RWPC register 730-84. When the number of words stored in the RRWC register 730-88 is greater than the number of words stored in the RWPC register 730-84 then the cache write flag FSWRT is set but the FSND characters. If the operand comprises 9-bit characters then the ZDS 0-31 output signal is switched through position 0 of the ZID switch 730-150 to position 1 of the ZDOD switch 730-152 if the word is to be written in an odd address in cache 750 or to position 2 of the ZDOD switch if the word is to be written in an even address in cache 750.

Position 0 of the ZSMR switches expands the word containing 4-bit digits from 32 bits to 36 bits after which the word is switched through position 3 of the ZDOD switch 730-152 to the ZDOD register 730-154 where it is stored and sent to cache 750 on the next cycle.

Position 2 of the ZDOD switch 730-152 expands words of operands to be made up of 9-bit digits by expanding the ZID 4-19 output signals to generate the 36-bit word by adding the ACSII or EBCDIC zone characteristics. Position 1 of the ZDOD switch 730-152 expands the ZID 20-35 output signals to the 36-bit ZDOD 0-35 signal bus. The ZDOD 0-35 output signals from position 2 of the ZDOD switch are stored in the RDOD register 730-154 and transferred to an even cache 750 address. The position 1 outputs of the ZDOD switch are transferred to odd cache 750 addresses.

In the event that the comparator 730-90 output indicates that the RRWC 0-6 binary count of the RRWC register 730-88 is less than the RWPC 0-3 binary count of the RWPC register 730-84 then data words are neither received from the execution unit 714 nor sent to cache 750 by the decimal unit, and the RWPC register 730-88 counts down until the output of the comparator 730-90 indicates that the RWPC 0-3 binary count equals the RRWC 0-6 binary count. This sets the FMSEQ, and FSWRT flags and the data words are clocked into the RDOD register 730-154 and transferred to cache 750.

Operands having 9-bit characters transfer 2 words to cache 750 for every word received from the execution unit 714 during normal operation. The word received from the execution unit 714 has up to eight decimal digits of 4-bits each and is expanded to 2 words, each containing up to 4 decimal digits of 9-bits each. The FCPCO flag cycling on and off controls the transferring of words to odd addresses and to even addresses in cache 750.

CYCLE DELAY

Figure 4:
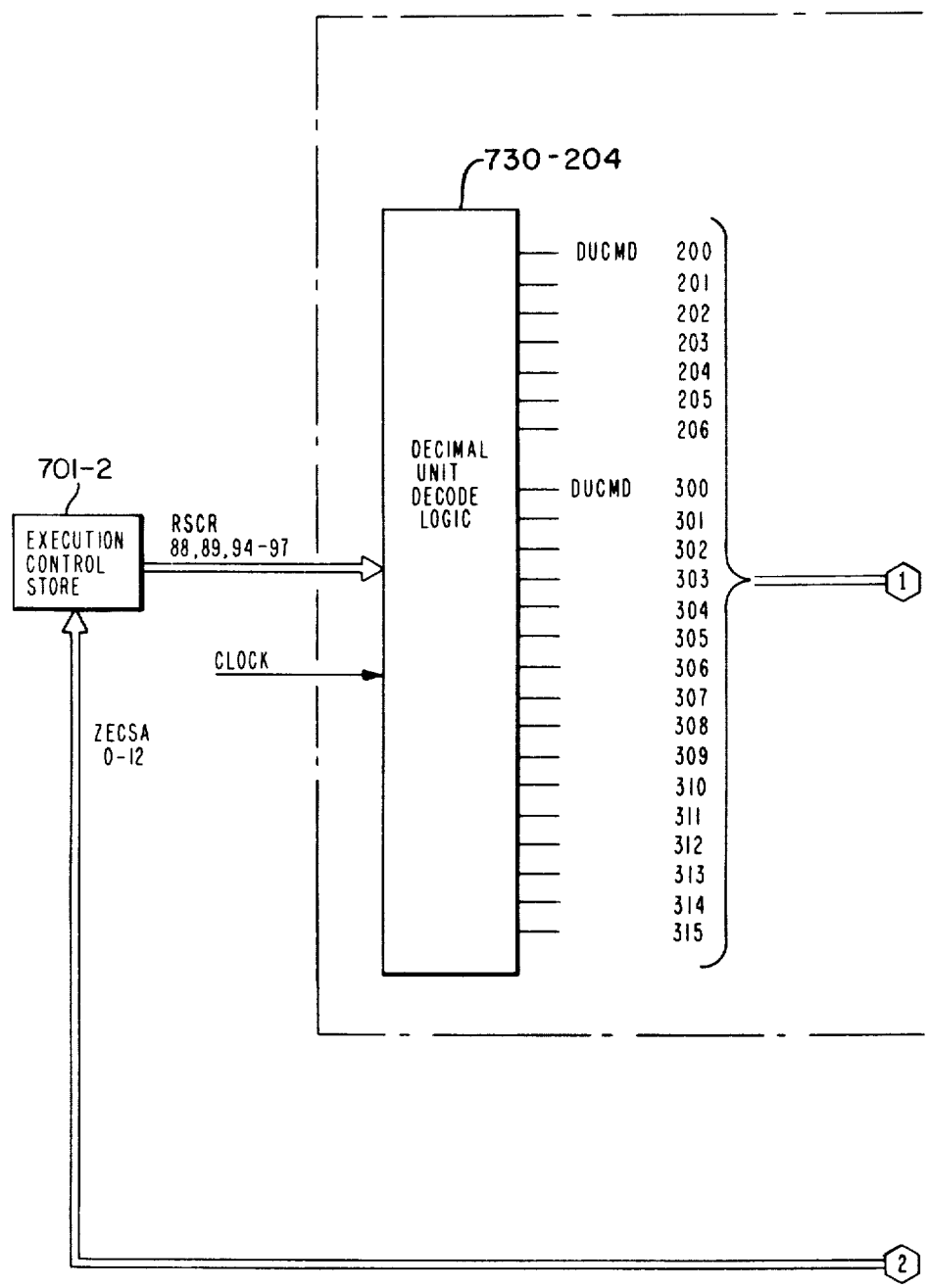
FIG. 4 is an overall block diagram of the decimal unit.
Figure 4:
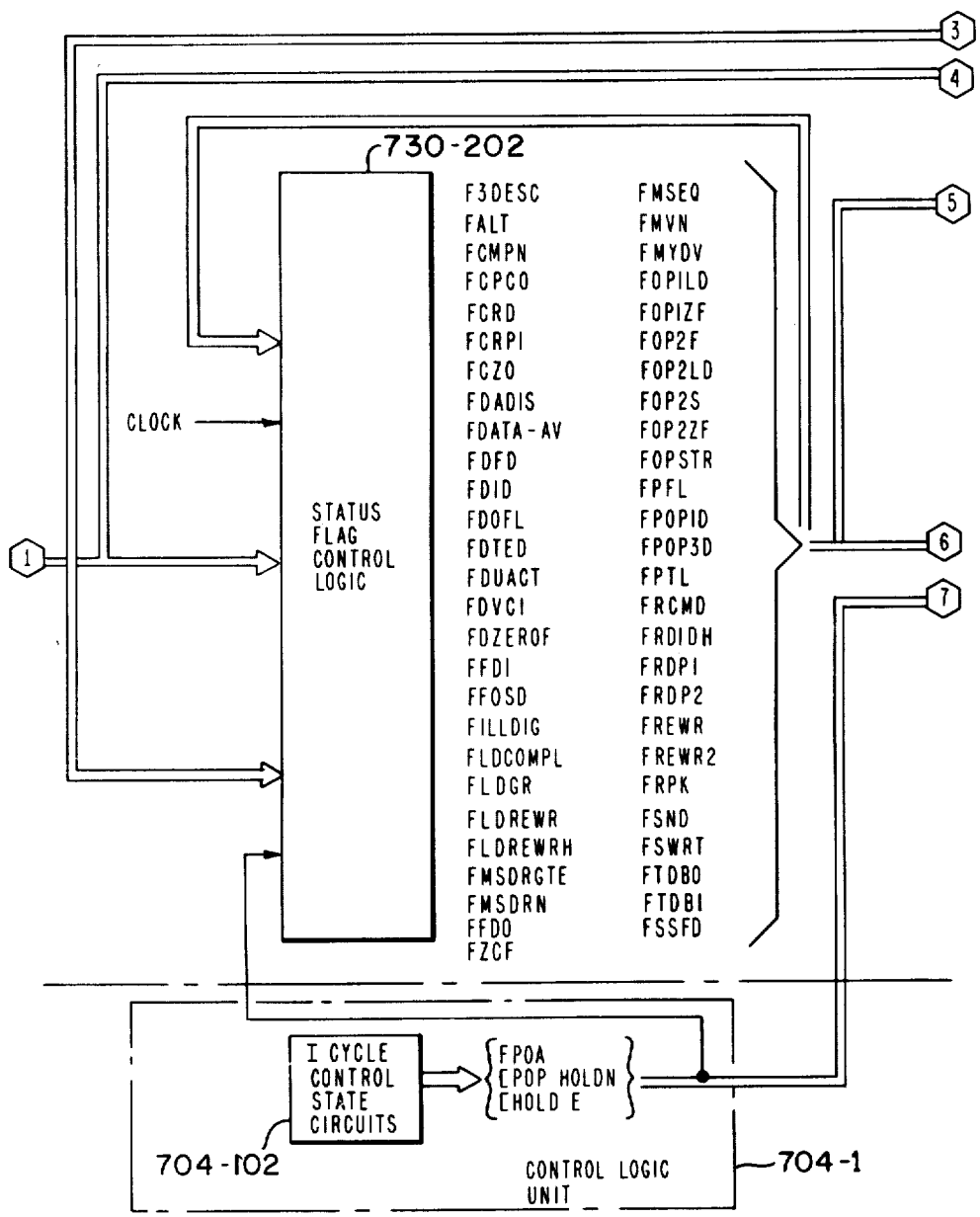
Figure 4:
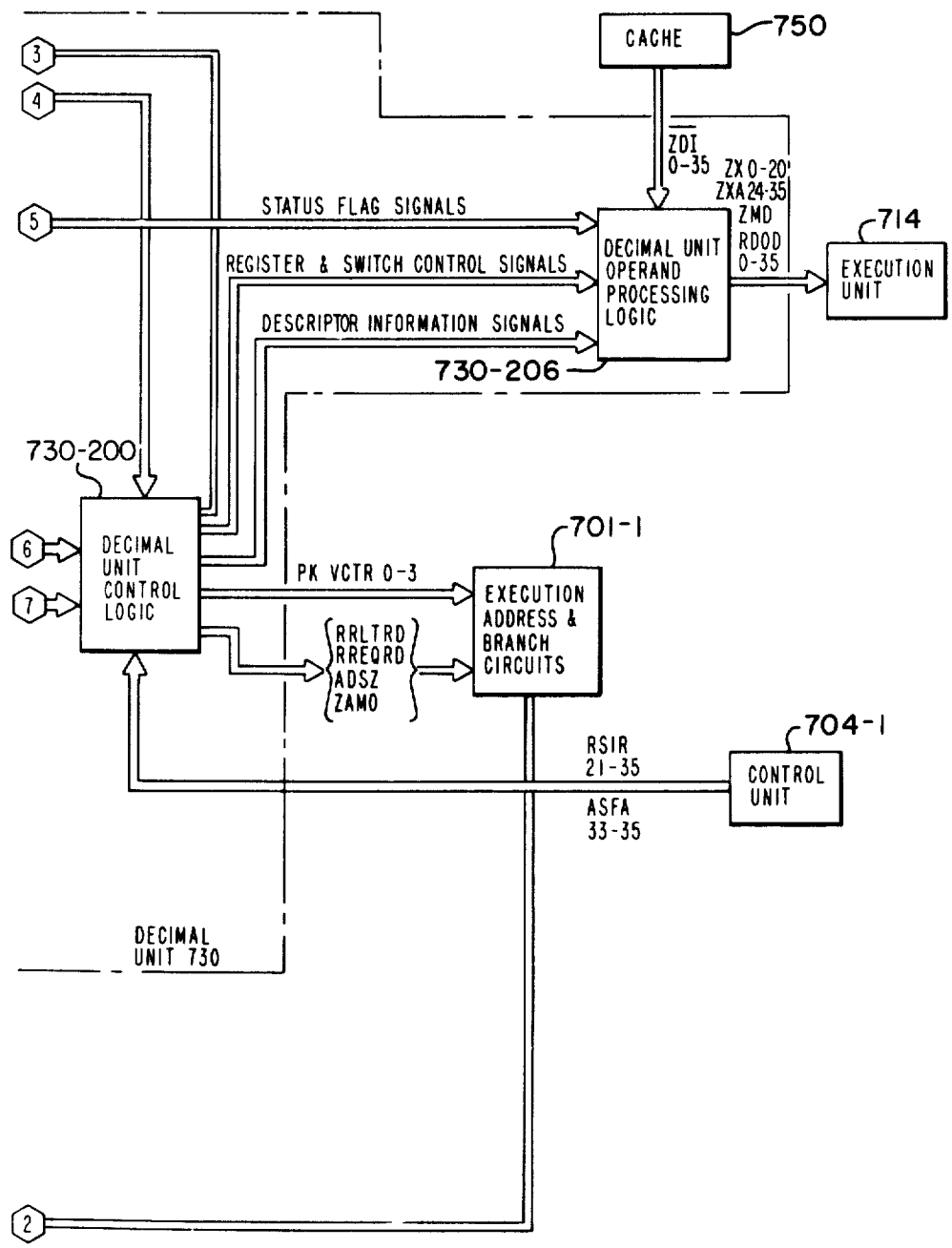

The processing of short operands is speeded up by predicting, as the processing of the instruction is starting, the number of words sent from the decimal unit 730 to the execution unit 714 and the number of cycles between the time the first read command is sent to the cache 750 and the first data word is sent to the execution unit 714. The number of words and cycles of delay are calculated in the decimal unit 730 and sensed by the firmware in the execution control unit 701. The decimal unit 730 output signals, PK-VCTR 0-3, FIG. 4, are applied to the execution address and branch circuits 701-1 and cause the firmware to branch to a particular address in the execution control store 701-4 which results in the firmware executing a subroutine to process the operand. The particular subroutine selected is designed to process the exact number of words of the operand with the exact number of cycles of delay thereby processing the operand with minimum of number of microwords.

The calculation for the number of delay cycles is a function of the type of data, that is, whether the incoming operand is made up of 4-bit or 9-bit characters, the location of the most significant character in the operand coming from cache 750 and the location of the most significant digit in the operand being transferred to the execution unit 714. As an example, assume an 8-decimal digit operand made up of 9-bit characters with a leading sign. Also assume the sign was in the third character position of the first word of the operand. The second word from cache 750 contains 4-decimal characters and the third word from cache 750 contains 4-decimal characters. The decimal unit 730 would not load any decimal digits upon receiving the first word since the first word only contained the sign. Four decimal digits were received from the second word, still not enough to fill the RDOD 730-154 register. Four decimal digits were received from the third word and the RDOD register was loaded with 8-decimal digits.

This load operations took 3 cycles to assemble and transfer the word to the execution unit 714. The PK-VCTR 0-3 signals lines would indicate a one word transfer with a 2 cycle delay to the firmware. The firmware by using the information indicating the number of words transferred and the number of cycles of delay performs the control of transferring data words from one register to another on a specific cycle rather than to halt or loop waiting for the data word.

The delays are a function of the data type, 4-bit or 9-bit decimal characters as indicated by the condition of the output of the ZTNSA switch 730-36 and the ZTNSB switch 730-34, ZTNSAO or ZTNSBO signals. The ACPNB adder 730-50 gives as an output the digit position of the most significant digit of the word received from cache 750. The ACPDF adder 730-52 gives the difference in positioning between the first character position for the high order digit in the first word from cache 750 and the digit position of the most significant digit as it is transferred to the execution unit 714. The output of the ZCPA switch 730-44 signal ZCPAO identifies the word from cache 750 as being from an odd or even word address.

The Boolean equations for the number of words and cycle delay calculations are readily interpreted into functional hardware by one of ordinary skill in the art and are as follows:

PK-VCTR $\phi = \phi$

PK-VCTR $1 = \text{TDB}\phi$

PK-VCTR $2 = \text{TDB1}$

PK-VCTR $3 = \text{ARWC6}$ $$\text{TDB}\phi = [(\overline{\text{ZTNSA}\phi} \cdot \text{FDUACT} \cdot \overline{\text{FRDP1}} + \overline{\text{ZTNSB}\phi} \cdot \text{FRDP1}) \\ (\text{ACPDF}\phi \cdot \overline{\text{ZCPA}\phi} + \text{ACPDF}\phi \cdot \text{ZCPA}\phi \cdot \overline{\text{ACPDF1}})]$$

$$\text{TDB1} = [(\text{ZTNSA}\phi \cdot \text{FDUACT} \cdot \overline{\text{FRDP1}} + \text{ZTNSB}\phi \cdot \text{FRDP1}) (\text{ACPDF}\phi) \\ + (\overline{\text{ZTNSA}\phi} \cdot \text{FDUACT} \cdot \overline{\text{FRDP1}} + \overline{\text{ZTNSB}\phi} \cdot \text{FRDP1}) \\ [(\text{ACPDFZ} \cdot \overline{\text{ZCPA}\phi}) + (\overline{\text{ACPDF}\phi} \cdot \text{ZCPA}\phi} \\ (\overline{\text{ACPNB}\phi} \cdot \text{ACPNB1} \cdot \overline{\text{ACPNB2}} \cdot \overline{\text{ACPNB3}} + \\ \overline{\text{ACPDF1}} \cdot \overline{\text{ACPNB}\phi} \cdot \overline{\text{ACPNB1}}) + \text{ACPDF}\phi \cdot \text{ZCPA}\phi \cdot \overline{\text{ACPDF1}})]]$$

The PK-VCTR 1 signal forced to binary ONE indicates a 2 cycle delay. The PK-VCTR 2 signal forced to binary ONE indicates a 1 cycle delay. The PK-VCTR 3 signal forced to binary ZERO indicates that 1 data word will be transferred to the execution unit 714 from the decimal unit. The PK-VCTR 3 signal forced to binary ONE indicates that 2 data words will be transferred to the execution unit 714.

For the PK-VCTR 1 calculation the $\overline{\text{ZTNSA}\phi}\cdot\text{FDUACT}\cdot\overline{\text{FRDP1}}$ Boolean expression indicates a 9-bit operand 1 word from cache 750. The $\overline{\text{ZTNSB}\phi}\cdot\text{FRDP1}$ indicates a 9-bit operand 2 word from cache 750. The ACPDF$\phi$·ACPA$\phi$ expression indicates a left shift through the shifter 730-156 of the word from an even cache 750 address. The ACPDFφ·ZCPAφ·ZCPDF1 expression indicates a left shift of from 1-3 decimal digits of a word from an odd cache 750 address.

For the PK-VCTR 2 calculation ZTNSA0·FDUAC-T·FRDP1·ACPDFφ indicates a 4-bit operand 1 word from cache 750 requiring a left shift through the shifter 730-156. ZTNSB0·FRDP1·ACPDFφ indicates a 4-bit operand 2 word requiring a left shift. ZTNSAφ·FDUACT·FRDP1+ZTNSBφ·FRDP1 indicates a 9-bit operand 1 word and a 9-bit operand 2 word.

ACPDFZ·ZCPAφ+ZCPDFφ·ZCPAφ indicates either a zero shift or a right shift of the word from the even cache address. ACPNBφ·ACPNB1·ACPNB2·ACPNB3 indicates that the high order decimal digit is in position 4 of the 4-bit character word or position zero of the 9-bit character word from odd cache address. ACPDF1·ACPNBφ·ACPNB1 indicates that the high order decimal digit received from cache 750 is in locations 1-3 and the shift count is less than 4 digits. ACPDFφ·ZCPAφ·ACPDF1 indicates a left shift of greater than 3 digit positions from the odd cache address word. Note that the ACPDFZ signals at binary ONE indicates that the adder 730-52 is set a binary ZERO. For the PK-VCTR 3 calculation, ARWC6 indicates a one word transfer from the decimal unit 730 and the execution unit 714 when at binary ZERO and a two word transfer when at binary ONE.

DECIMAL UNIT 730—FIG. 3—REWRITE OPERATION

Operand 3 may start and end in character positions within the most significant word and the least significant word. It may be necessary to retain the information stored in the most and least significant words of operand 3 that are not part of operand 3. In this case, the firmware initiates a DUCMD 306 "Load Rewrite Data" command in the decimal unit 730 to load the most significant word into the REWR2 register of register bank 730-177 through the ZDI 0-35 bus from cache 750, the RDID register 730-158 and the RDID buffer 730-176. The firmware initiates a second DUCMD 306 to load the least significant word in the REWR3 register of the REWR 0-3 register bank 730-177. When the firmware initiates a DUCMD 303 "Store Operand Through Decimal Unit" command the most significant word appears on the ZID 0-35 signal bus. Assuming 4-bit decimal characters for the operand the RCP2 register of register bank 730-42 stores the starting character position of the operand 3. Since this is a descriptor 3 operation the RCP2 position of switch 730-44 is selected and the ZCPA 0-3 output signal is applied to a ZRUMP switch 730-148. Position 1 of the ZRUMP switch is activated and the ZRUMP 0-2 output signal is applied to an REWUM shifter 730-149. The REWUM 0-7 output signals are applied to control [1ZSMR logic 730-142 and control [2ZSMR 0-7 output signals select the digit positions of the ZSMR switch that will be selected. For example, for processing the most significant word of the 4-bit digit operand, digit positions in position 0 of the ZSMR switch 730-180 would be selected for the operand digit data. The sign position in position 1 of the ZSMR switch 730-180 would be selected if the operand had a leading sign and the digit position to the left of the operand would be selected in position 3 of the ZSMR switch for the rewrite data. The REWUM 0-7 signal output of the shifter 730-149 is a zero for those digit positions requiring write data. The ZSMR 0-35 output bus is switched through position 0 of the ZDOD switch 730-154 to the RDOD register 730-154.

If the operand contains 9-bit decimal digits then the [1ZSMR 0, 2, 4 and 6 logic signals and [2ZSMR 0, 2, 4 and 6 logic signals are applied to the unpack ZDOD logic 730-184. The [1ZDOD 0-3 and [2ZDOD 0-3 output signals enable the rewrite and leading sign digit positions of switch position 3 and the operand decimal digit positions of either position 1 or position 2 of the ZDOD switch 730-152.

During the load operation for a 2 descriptor operation the most significant word of operand 2 which could contain rewrite information is written into the REWR0 register of the register bank 730-177 and all subsequent words are written into the REWR1 register replacing the previous word. This results in the most significant word of operand 2 stored in the REWR0 register and the least significant word of operand 2 stored in the REWR1 register. The loading of these registers into the RDOD register 730-154 is as described supra.

The REWR register bank 730-177 is enabled by the control signal [$REWR. The boolean expression is [$REWR=(FDID+FLDREWRH).

Control signal [WRREWR1 is applied to terminal 1 and status flag FLDREWRH is applied to terminal 2 of the register select input terminals to select one of four registers REWR 0-3. The boolean expression control signal [WRREWR1 is:

[WRREWR1=FOP2LD·FOP2F+FLDREWRH·FREWR

The output of registers REWR 0-3 is selected through the ZEWR switch 730-178. Signal [1ZEWR is applied to output select terminal 1 and status flag FREWR is applied to the output select terminal 2 of ZEWR switch 730-178. The boolean expression for control signal [1ZEWR is:

[1ZEWR=(FREWR·FREWR2·FFOSD+FOP2-S·FFOSD·FREWR).

DECIMAL UNIT 730—FIG. 3—ROUNDING CONSTANT

Two DUCMD 309 "Put the Rounding Constant into RDOD" commands are initiated by the firmware. For short operands the rounding constant is sent to the execution unit 714 in response to the first DUCMD 309 if the constant is to be inserted in the least significant word. The rounding constant is sent to the execution unit in response to the second DUCMD 309 if the constant is to be inserted in the most significant word. For either case, a word of all zeros is sent to the execution unit for the other DUCMD 309 command. The other rounding constant, binary 5, is added to the position to the right of the scale factor pointer (decimal point). The rounding constant is stored in bit positions 4-7 of switch position 3 of the ZPK switch 730-160.

The ATMP adder 730-30 subtracts a ONE from the operand 3 scale factor stored in the RSF2 register of register bank 730-4 and is applied to the ATMP adder 730-20 through the ZASFB switch 730-28. If the ATMP6 output signal is a ZERO then the rounding constant is applied to the least significant word in response to the DUCMD 309 command. If the ATMP6 output signal is a ONE then the rounding constant is applied to the most significant word in response to the second DUCMD 309 command.

The ATMP 7-9 output signals are inverted by inverter 730-147. The $\overline{\text{ATMP}}$ 7-9 output signals are selected by the ZDSC switch 732 and provide the binary shift count to the shifter 730-156.

The ZPKR switch 730-164 is enabled in response to the first DUCMD 309 command if the rounding character is added to the least significant word and enabled in response to the second DUCMD 309 command if the rounding character is added to the most significant word. In either case the binary 5 output from position 3 of the ZPK 730-160 switch is transferred to the execution unit 714 through the ZPKR switch 730-164, the ZDS shifter 730-156, position 0 of the ZID switch 730-150, position 0 of ZDOD switch 730-152 and the RDOD register 730-154.

In the long operand store operation the decimal unit 730 responds to the first DUCMD 309 command with a pointer to the word in scratchpad to which the rounding constant is added and responds to the second DUCMD 309 command with the rounding constant. The ATMP 0-6 output signals which indicate the word to which the rounding constant is added are selected through position 3 of the ZLZC switch 730-76, position 3 of the ZID switch 730-156, position 0 of the ZDOD switch 730, the RDOD register 730-154 to the execution unit 714. The rounding constant, binary 5, is transferred to the execution unit 714 during the second DUCMD 309 operation as in the short operand above.

SIGN EXTRACTION

As each operand is received by the decimal unit 730 during the load operation the sign character is examined if it is not an overpunched sign character. The decimal unit 730 verifies that it is a legal sign character.

An RCPS 0-2 register 730-126 stores the character location within the word of the sign character. A ZCPS switch 730-124 selects the position of the sign character. The ZCPS switch position 0 identifies the leading sign position for 9 bit character operands. Switch position 1 identifies the leading sign position for 4-bit character operands. Switch position 2 identifies the trailing sign position for 9-bit character operands. Switch position 3 identifies the trailing sign position for 4-bit operands.

The RCPS 0-1 output signals select the position of a ZCH switch 730-170 that could contain the sign character. No attempt is made to select the trailing or leading word of the operand in the ZCH switch 730-170. An operand word received from cache 750 over the $\overline{\text{ZDI}}$ 0-35 signal bus is stored in the $\overline{\text{RDID}}$ register 730-158 and is applied to the ZCH switch 730-170. The ZCH 1-8 output signal is applied to a ZCHL switch 730-172 and to sign extraction logic 730-174. Position 1 of the ZCHL switch is selected for 9-bit operands and 4-bit operands having an odd character pointer.

The sign extraction logic 730-174 selects either the sign character from the trailing word or from the leading word. If the sign character is coded as an illegal character then a SET ILLEGAL logic signal forces a fault indication for the software. If the sign character is coded as a correct sign then the SET SIGN logic signal sets an indication for the software. The ZCH 1-8 output signals to the sign extraction logic indicate 8-bit EBCDIC sign characters. The ZCH 1-8 output signals to the ZCHL switch indicate 4-bit sign characters in the lower half of the 9-bit character (bit position 4-8) position for 9-bit character operands. For 4-bit operand words, even pointers indicate the left 4-bits (bit positions 1-4) and odd pointers indicate the right 4-bits (bit positions 5-8).

Control signals [1ZCPS and [2ZCPS are applied to the terminals 1 and 2 select inputs of ZCPS switch 730-124. The boolean expressions are:

[1ZCPS=(ZTNSA0·FDUACT·$\overline{\text{FRDP1}}$+ZTNSB-0·FRDP1)

[2ZCPS=(ZTNSA1·$\overline{\text{ZTNSA2}}$·FDUACT·$\overline{\text{FRDP1}}$+ZTNSB1·ZTNSB2·FRDP1)

The RCPS register is enabled by a [$RCPS control signal whole boolean expression is:

[$RCPS=(FDUACT·$\overline{\text{FRDP1}}$)+SFOP2LD)

OVERPUNCH DIGIT CORRECTION—FIG. 3

Operands made up of words having 9-bit characters may have separate signs in either a leading or trailing character position or the operand may have a sign included in the decimal digit code in a single character position. This requires that a correction be made to the decimal digit to include the overpunched sign. Assume that operand 1 requires an overpunched sign correction. An ROP1 logic signal is sent from the control store 704-2 to the decode logic 730-38. If the ZTNSA 0-2 output signal from the RTNS2 register of register bank 730-32 and the ZTNSA switch 730-36 is coded to a binary 000 or 011 indicating 9-bit characters with leading sign or trailing sign, a D1EQOVP logic signal output of decode logic 730-38 is forced high. The D1EQOVP logic signal selects the 1 position of a ZSSC switch 730-108 for a trailing sign operand. The 0 position of the ZSSC switch is selected for the leading sign. The RLMP 4-6 signals are coded to point to the character position of the leading sign and the RTMP 4-6 signals are coded to point to the character position of the trailing sign.

The ZSSC 0-2 shift count signals are applied to a shifter 730-145 to shift a DBITT logic signal the number of bits specified by the ZSSC 0-2 count. The DBITT logic signal is forced to a ZERO for the overpunched sign operations during the cycle in which the most significant word or the least significant word is read from cache 750 for the leading sign or trailing sign correction respectively. The shifter 730-145 output signals $\overline{\text{ZCRDGM}}$ 0-7 are applied to the ZID switch control logic 730-188 to select position 2 of the ZID switch for the character position that is indicated by the one signal of the $\overline{\text{ZCRDGM}}$ 0-7 signals that is at a ZERO which points to the overpunched sign position.

The RSGN register 730-134 is loaded with the corrected overpunched sign character for operand 1 under firmware control. The REXP register 730-138 is loaded with the corrected overpunched sign character for operand 2 under firmware control. A $\overline{\text{ZCRDG}}$ switch 730-136 selects the $\overline{\text{RSGN}}$ 5-8 output signals for the operand 1 overpunched sign correction character. The ZCRDG 0-3 signals are inverted by an inverter 730-186 and are applied to position 2 of the ZID switch 730-150. When the word to which the corrected overpunched sign is added is received from cache 750 and is switched through the decimal unit 730 to be stored in the RDOD register 730-154. The character in the sign position is replaced by the ZCRDG 0-3 corrected overpunched sign character.

The boolean expression for the DBITT signal is:

$$DBITT = \overline{(FOP1LD \cdot D1EQOVP \cdot (\overline{ZTNSA1 \cdot FFD0} + \overline{ZTNSA(1) \cdot DMPEQ}) + FOP2 \cdot LD \cdot D2EQOVP \cdot (\overline{ZTNSB1 \cdot FFD0} + \overline{ZTNSA(1) \cdot DMPEQ}))}$$

where DMPEQ is at logical ONE when the contents of the RLMP register 730-102 equals the contents of the RTMP register 730-100.

The above equation indicates that the $\overline{DBITT}$ signal is set to logical ZERO when operand 1 or operand 2 requires an overpunched sign correction during the load operation. $\overline{ZTNSA1 \cdot FFD0}$ indicates a leading overpunched sign and $\overline{ZTNSA1 \cdot DMPEQ}$ indicates a trailing overpunched sign.

$$D1EQOVP = \overline{(\overline{DBITX} \cdot ROP1 \cdot \overline{ZTNSA0})}$$

$$D2EQOVP = \overline{(\overline{DBITZ} \cdot ROP1 \cdot \overline{ZTNSB0})}$$

During the store operation the sign character is placed in the RSGN register 730-134 and inserted in the operand word through position 1 of the ZSMR switch 730-180 as previously described.

DECIMAL UNIT 730—FIG. 3—LOAD STC MASK INTO RDOD

The firmware initiates a DUCMD 203 Load STC Mask into RDOD command during the Store Character in Accumulator and Quotient Register Instructions (STCA and STCQ). The decimal unit 730 receives the RCHU 30-35 output signals from the character unit 720 which are applied to position 1 of the ZID switch 730-150 through the buffer 730-168. Each of the RCHU 30-35 output signals at a ONE results in the corresponding 6 bits of position 1 of the ZID switch 730-150 being forced to a ONE. These groups of 6 bits are stored in the RDOD register 730-154 through the ZDOD switch 730-152.

FIG. 4 shows the relationship between the decimal unit 730 hardware and the firmware in the execution control store 701-2. The execution address and branch circuits 701-1 send the control store address locations ZECSA 0-12 to the execution control store 701-2. The microword at that address location is read out and bit positions RSCR 88, 89, 94-97 input a decimal unit 730 decode logic 730-204 which consists of conventional decode logic circuitry. Table 1 shows the RSCR 88, 89, 94-97 bit configurations for the respective DUCMD 200-206, 300-315 commands.

The DUCMD 200-206 300-315 commands input a status flag control logic 730-202. This unit is made up of conventional flops set and reset in a conventional manner.

The I cycle control state circuits 704-102 described in the aforementioned application Ser. No. 853,944 generates the FPOA [POP HOLDN and the [HOLDE signals to time the decimal unit 730 to the pipeline operations of the control unit 704. These signals also input the status flag control logic 730-202 whose output inputs a decimal unit control logic 730-200 as well as inputting the status flag control logic 730-202 and the decimal unit control logic 730-200. Also applied to the decimal unit control logic 730-200 are the DUCMD outputs of the decimal unit decode logic 730-204 and the descriptor information received from control unit 704-1 over signal lines RSIR 21-35 and ASFA 33-36 in the registers shown in FIG. 3.

Operands stored in cache 750 are transferred to the operand processing unit 730-206 a word at a time over signal lines $\overline{ZDI}$ 0-35. The operand processing unit 730-206 is conditioned by the descriptor information, the status flag signals and the register and switch control signals, receiving the operand word from cache 750 to strip non-operand and non-decimal digit characters from the word, converting the word into 4-bit decimal digits, aligning the four 4-bit decimal digits into words of up to eight 4-bit decimal digits and transferring the completed word to the execution unit 714 over signal lines RDOD 0-35. Outputting the logic 730-200 unit are the PK-VCTR 0-3 signals and the RRLTRD, RREQRD, ADSZ and ZAMO conditional branch signals which generate branch addresses in the execution address and branch circuits 701-1.

A clock signal times the relationships between the logic units of FIG. 4.

FIG. 4 shows the flow of logic through the system. Where the portions of the logic blocks of FIG. 4 relate to the inventions, they are shown in further detail in FIG. 3.

FIG. 5 shows two typical instructions processed through the decimal unit 730. The AD2D instruction—add using two decimal operands, adds the operand from the address location and in the format defined by descriptor 1 to the operand from the address location and in the format defined by descriptor 2 and places the resulting operand in the format and address location defined by descriptor 2.

The AD3D instructions—add using 3 decimal operands adds the operand from the address location and in the format defined by descriptor 1 to the operand from the address location and in the format defined by descriptor 2 and places the resulting operand in the format and address locations defined by descriptor 3. The instruction word is made up of 36 bit positions 00-35.

The instruction format includes a P bit defining EBCDIC data when a ZERO, and ASC11 data when a ONE.

Fields MF1, MF2 and MF3 describe the address modifications to be performed on descriptor 1, 2 and 3 respectively.

The T bit enables the truncation fault.

The RD bit enables the rounding operation.

The OP CODE specifies the operation to be performed. In FIG. 5 the OP CODE 202-1 specifies the AD2D instruction and OP CODE 222-1 specifies the AD3D instruction.

I is the interrupt inhibit bit.

For the descriptor formats, Y1, Y2 and Y3 are the main memory word locations of the most significant character of the operand specified by descriptors 1, 2 and 3 respectively.

The O/E bit identifies the main memory word address as being either an odd address or an even address.

CN1, CN2 and CN3 are codes that define the position of the most significant character within the main memory word of the operand specified by descriptors 1, 2 and 3 respectively. Codes depend on the data type as shown below:

|                   | Codes | Character Numbers |
|-------------------|-------|-------------------|
| 9 bit characters  | 000   | 0                 |
|                   | 010   | 1                 |
|                   | 100   | 2                 |
|                   | 110   | 3                 |
| 4 bit characters  | 000   | 0                 |
|                   | 001   | 1                 |

| Codes | Character Numbers |
|---|---|
| 010 | 2 |
| 011 | 3 |
| 100 | 4 |
| 101 | 5 |
| 110 | 6 |
| 111 | 7 |

TN1, TN2 and TN3 are codes that define the numeric data type for descriptors 1, 2 and 3 respectively. A ZERO specifies 9-bit data and a ONE specifies 4-bit data.

The S1, S2 and S3 fields identify the sign and decimal type of descriptor 1, 2 and 3 respectively.

| Unpacked Data TN = 0 OVP allowed | | Packed Data TN = 1 or OVP not allowed | |
|---|---|---|---|
| s | | s | |
| 00 | LS, OVP, scaled | 00 | Floating point, LS |
| 01 | LS, scaled | 01 | LS scaled |
| 10 | TS, scaled | 10 | TS scaled |
| 11 | TS, OVP, scaled | 11 | No signs, scaled |

LS = Leading
TS = Trailing Sign
OVP = Overpunched Sign

SF1, SF2 and SF3 specify the scale factors of descriptors 1, 2 and 3 respectively. The decimal point is located after the least significant digit. A positive scale factor moves the decimal point that many positions to the right. A negative scale factor moves the decimal point that many positions to the left.

N1, N2 and N3 are the number of characters in the operand defined by descriptors 1, 2 and 3 respectively. N1, N2 and N3 may be 4-bit codes which specify registers that contains the length of the respective operand. However, for describing the invention N1, N2 and N3 are the number of characters in the operand.

DECIMAL UNIT 730—FIG. 3—VECTOR BRANCH DATA

Referring to FIG. 3, the decimal unit control logic 730-20 generates control signals [1PKVCTR, [2PKVCTR and [4PKVCTR in response to decimal unit 730 DUCMD command signals as described supra. The vector branch logic 730-15 has applied to it signals indicative of the characteristics of the operand. The output signals of decode logic 730-38 and 730-40 which are described infra define the operand as a floating point or overpunched sign and as a scaled operand if made up of 4-bit or 9-bit decimal characters. The ZTNSA1 and ZTNSB1 signals indicate an operand with a trailing sign if at logical ONE and an operand with a leading sign if a logical ZERO. The ALNS 3-5 and the ALNDA 0-3 and the ALNDB 0-3 signals identify the operand as having an adjusted length of greater than 63 decimal digits or a length of less than or equal to 63 decimal digits. The detailed logic is shown in FIG. 8.

The vector branch logic 730-15 output signals PK-VCTR 0-3 are applied to the execution address and branch circuits 701-1 in response to the [1PKVCTR, [2PKVCTR and [4PKVCTR control signals to indicate to the execution control store 701-2, FIG. 1, the next microword to be processed by the system.

Referring to FIG. 8, a PK-VCTR switch 15-72 a-d generates vector branch signals PK-VCTR 0-3 in response to microword signals which are applied to the decimal unit 730. The microword signals generate DUCMD command signals, which when combined with status flag signals generate control signals [1PKVCTR, [2PKVCTR and [4PKVCTR. These control signals are applied to the 1, 2 and 4 input select terminals of switch 15-72 and select 1 of 8 input signals from each of 4 sections of the switch 15-72 a-d.

During the processing of non-decimal numeric instructions the decimal unit 730 is inoperative thereby activating input terminal 0 of switch 15-72 a-d.

The type length vector signals are applied to input terminal 1 of switch 15-72 a-d. The $\overline{\text{DSHORT}}$ signal is applied to input terminal 1 of switch 15-72 a. If the ALNS adder 730-24 indicates the adjusted length of the operand as greater than or equal to binary 16 then one or more of the input signals ALNS 3-5 to AND/NAND gates 15-32, 15-34 and 15-36 respectively is at logical ONE. One or more of the output signals at logical ZERO is applied to the inputs of a AND/NAND gate 15-38. The output signal ALNSGTE 16 is applied to the input of an AND/NAND gate 15-50. If this is not a decimal multiply/divide instruction then the output signal $\overline{\text{DLNSCLDGTE 16}}$ is forced to logical ZERO. This signal, applied to the input of an AND/NAND gate 15-74 forces the $\overline{\text{DLONG}}$ output signal to logical ZERO. Signals ALNDA1, ALNDA2, ALNDB1 and ALNDB2 are applied to the inputs of AND/NAND gates 15-40, 15-42, 15-44 and 15-46 respectively. Logical ONE is applied to the other input terminals. The output signals of AND/NAND gates 15-40 and 15-42 are applied to the inputs of an AND/NAND gate 15-52 and the output signals of AND/NAND gates 15-44 and 15-46 are applied to the inputs of an AND/NAND gate 15-54. The output signals $\overline{\text{ALNDAGTE 16}}$ and $\overline{\text{ALNDBGTE 16}}$ at logical ONE indicate the length of operands 1 and 2 are less than 16 decimal digits. If the operands are not floating point operands and the adjusted length including scale factor adjustment are less than 16 decimal digits then signal $\overline{\text{DLONG}}$, the output of AND/NAND gate 15-74, at logical ONE indicates that both operands are processed as short operands. The $\overline{\text{DLONG}}$ signal is applied to the input of an AND/NAND gate 15-56. The output signal DSHORT, at logical ONE, indicates that the operand being processed is a long operand. Signal $\overline{\text{D12EQOVP}}$ is applied to the other input of AND/NAND gate 15-56 and when at logical ONE indicates that neither operand 1 nor operand 2 has an overpunched sign character which is the requirement for a short operand.

The DSHORT signal at logical ONE indicating a short operand is applied to the input of a AND/NAND gate 15-58. Signal $\overline{\text{ZTNSA0}}$ at logical ONE indicating a 9-bit per character operand is applied to the other input of NAND gate 15-58. The output signal $\overline{\text{DSHORT 9}}$ at logical ZERO is applied to an input of an AND/NAND gate 15-62. The output signal DLNGORST 9 at logical ONE is applied to the input terminal 1 of switch 15-72 b indicating a short 9-bit per character operand. Logical ZERO is applied to input terminal 1 of switches 15-72 c and d.

Signals TDB0 and TDB1 are applied to input terminals 2 and 3 of switch 15-72 b and 15-72 c respectively. The boolean expressions are described supra and indicate the number of cycles of delay between the cycle on which the read request is made of cache 750 and a complete word is received by the execution unit 714. The ARWC adder 730-60 signal ARWC 6 is applied to input terminals 2 and 3 of switch 15-72 d and indicates a one word operand if at logical ZERO and a two word operand if at logical ONE.

Input terminals 4 and 6 of switch 15-72 a-d are selected for the descriptor 1 vector and store vector operations, respectively. Signal ROP-1 from control store 704-2 at logical ONE indicating an overpunched sign operand is applied to an input of an AND/NAND gate 15-2. The $\overline{\text{ZTNSA0}}$ signal indicating a 9-bit per character operand when at logical ONE, is applied to the other input of AND/NAND gate 15-2. Either input at logical ZERO forces the signal $\overline{\text{D1NEW 9}}$ which is applied to an input of an AND/NAND gate 15-14, to logical ONE. Signals $\overline{\text{ZTNSA1}}$ and $\overline{\text{ZTNSA2}}$, at logical ONE, are applied to the other inputs of AND/NAND gate 15-14. Output signal $\overline{\text{D1EQFLP}}$ at logical ZERO, indicating a floating point operand, is applied to the input of an AND/NAND gate 15-64. The output signal D1FLPORTSO at logical ONE is forced to logical ONE indicating a floating point operand.

If signals ROP-1 and $\overline{\text{ZTNSA0}}$ are at logical ONE, the D1NEW9 signal output of AND/NAND gate 15-2 is at logical ONE. If signal $\overline{\text{DBITX}}$ is at logical ONE then the output signal $\overline{\text{D1EQOVP}}$ of an AND/NAND gate 15-22 is at logical ZERO. This forces the output, signal D12EQOVP, of an AND/NAND gate 15-30 to logical ONE. If signal ZTNSA1 is at logical ONE indicating a trailing sign then the output signal $\overline{\text{D1EQTSO}}$ of a NAND gate 15-26 at logical ZERO forces the D1FLPORTSO signal output of AND/NAND gate 15-64 to logical ONE. Signal D1FLPORTSO at logical ONE is applied to input terminals 4 and 6 of switch 15-72 b indicating a floating point or overpunched trailing sign operand.

Signal D1EQOVP, the output of AND/NAND gate 15-22 is applied to input terminals 4 and 6 of switch 15-72 a indicating an overpunched sign operand.

Signal $\overline{\text{DBITX}}$ is at logical ONE if signals ZTNSA1 and ZTNSA2 at logical ONE are applied to an AND/NAND gate 15-4 indicating an operand with no sign or an overpunched trailing sign or signals $\overline{\text{ZTNSA0}}$, $\overline{\text{ZTNSA1}}$ and $\overline{\text{ZTNSA2}}$ are applied to an AND/NAND gate 15-6 indicating a 9-bit per character floating point or overpunched leading sign operand. Output signal $\overline{\text{D1EQFLP 9}}$ of an AND/NAND gate 15-6 at logical ZERO forces signal $\overline{\text{DBITX}}$, the output of AND/NAND gate 15-16 to logical ONE.

Logical ZEROs are selected from terminals 4 and 6 of switches 15-72 c and d. The firmware generates a result equals zero and an overflow check during the store vector operation. The descriptor 2 vector selects input terminal 5 of switch 15-72 a-d. Signal D2EQOVP is applied to terminal 5 of switch 15-72 a and when at logical ONE indicates an operand with an overpunched sign. The D2EQOVP signal is generated in a similar manner as the D1EQOVP signal which indicates an operand 1 with an overpunched sign.

Signal D2FLPORTSO generated in a similar manner as signal D1FLPORTSO through AND/NAND gates 15-28 and 15-66 and is applied to terminal 5 of switch 17-72 b indicating a floating point operand or an operand with an overpunched trailing sign.

Switch 15-72 c, d input terminals 5 are at logical ZERO.

The long input vector selects input terminal 7 of switch 15-72 a-d. Signals $\overline{\text{D1EQFLP}}$ and $\overline{\text{D2EQFLP}}$ are applied to the inputs of an AND/NAND gate 15-48. The output signal $\overline{\text{D12EQFLP}}$ is applied to the inputs of AND/NAND gates 15-60 and 15-70 and when at logical ZERO, indicating a floating point operand, forces signals D12FLPOREL and D12FLPOROVP to logical ONE. The input terminal 7 of switch 15-72 a and 15-72 b at logical ONE indicates to the firmware to execute the descriptor 1 and descriptor 2 vectors.

If signal $\overline{\text{D12EQFLP}}$ is at logical ONE indicating scaled operands, then signal ALNSLTE63 at logical ZERO indicating a length of less than or equal to 63 decimal digits is applied to the input of AND/NAND gates 15-60 and 15-68. The output signals D12FLPOREL at logical ONE indicates both operands having a length of less than or equal to 63 decimal digits. Signal D12EQOVP is applied to the other input of AND/NAND gate 15-68. The output signal D12OVPL63 at logical ZERO is applied to the input of AND/NAND gate 15-70. The output signal D12FLPOROVP at logical ONE indicates that both operands are scaled with an overpunched sign and the lengths are less than or equal to 63 decimal characters.

Signal ALNSLTE63 at logical ZERO is generated as the output of an AND/NAND gate 15-8. The input signal ALNS3 at logical ONE indicates a length of greater than 63 decimal digits. $\overline{\text{FMYDV}}$ is at logical ONE since this is not a multiply/divide operation. $\overline{\text{D12EQFLP}}$ is at logical ONE since neither operand is a floating point operand.

While in accordance with the provisions and statute, there has been illustrated and described the best form of the invention known, certain changes may be made to the system described without departing from the spirit and scope of the invention as set forth in the appended claims and that in some cases, certain features of the invention may be used to advantage without a corresponding use of other features.

Figure 9:
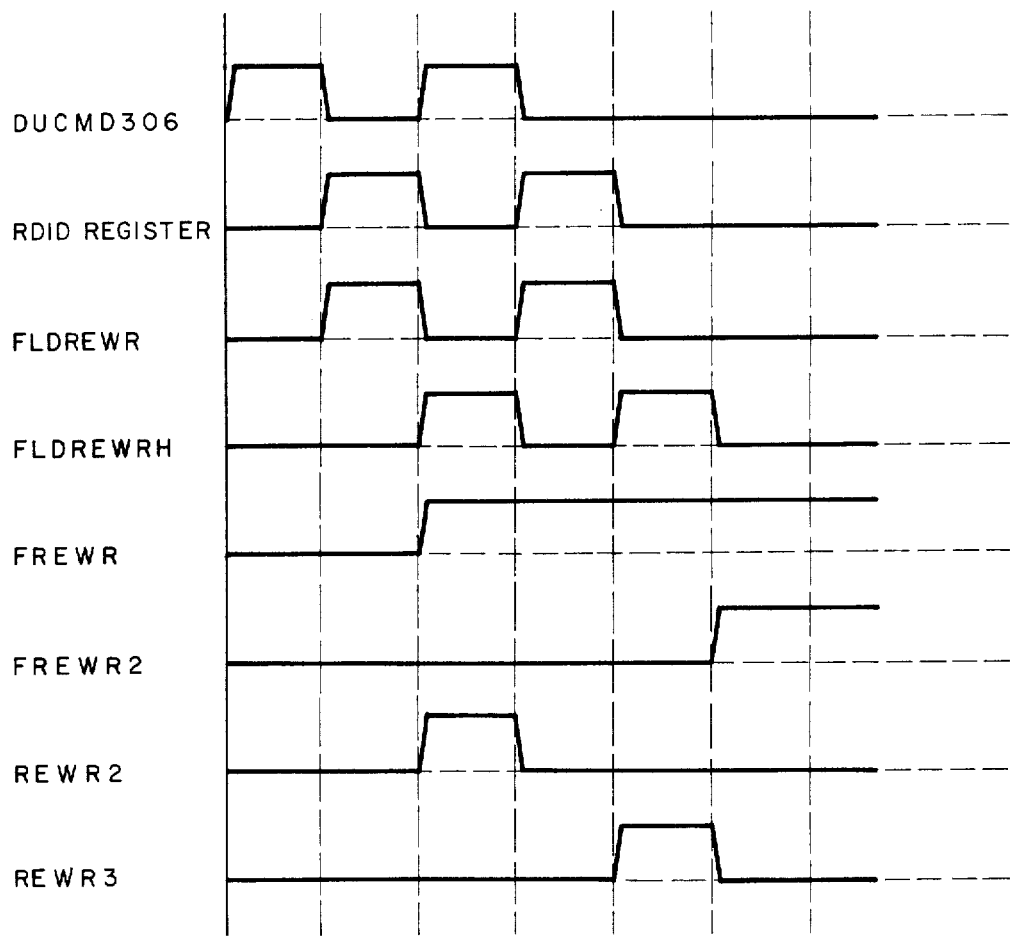
FIG. 9 is a timing diagram for the prefetch of most and least significant word of the three descriptor decimal numeric operation.

Referring to FIG. 9, a first DUCMD 306 command, Load Rewrite Data, is received by the decimal unit 730 indicating that the most significant word (MSW) of the operand, whose address location is defined by descriptor 3, is read from cache 750. The MSW is received by the decimal unit 730 over the ZDI 0-35 signal bus and stored in the RDID register 730-158.

The FLDREWR status flag, is set by the DUCMD 306 command signal. The FLDREWR status flag sets the FLDREWRH status flag which conditions the REWR2 register 730-177 to store the MSW received from the RDID register 730-158.

A second DUCMD 306 command is received by the decimal unit 730 indicating that the least significant word (LSW) of the operand, whose address location is defined by descriptor 3, is read from cache 750. The LSW is stored in the RDID register 730-158. The FLDREWRH status flag conditions the FREWR status flag to set. Both FLDREWRH and FREWR at logical one conditions the LSW to transfer from the RDID register 730-158 to the REWR3 register.

The FREWR2 status flag conditions the decimal unit 730 to provide the rewrite data stored in the REWR3 register during the store operation.

What is claimed is:

1. In a microprogrammed data processing unit wherein, in a three descriptor instruction, a first and a second operand identify locations in memory storing a first and a second operand utilized in said three descriptor instruction, wherein an operand resulting from execution of said instruction can be stored in a resulting memory location identified by a third descriptor of said three descriptor instruction, wherein a group of resulting operand words in said resulting memory location can include non-operand data in the boundary words, apparatus for preserving said non-operand data comprising:
- first storage means for storing a first word of said resulting memory location wherein most significant operand data is to be stored, said first word stored during execution of said instruction;
- second storage means for storing a second word of said resulting memory location wherein least significant data is to be stored, said second word stored during execution of said instruction;
- third storage means for temporarily storing words of said resulting operand; and
- combining means coupled to said first storage means and said third storage means for combining non-resulting operand data in said first storage means with most significant data of said resulting operand when said most significant data of said resulting operand is in said third storage means; said combining means combining non-resulting operand data in said second storage means with least significant data of said resulting operand when said least significant data is in said third storage means.

2. The apparatus of claim 1 wherein said combining means includes a switch for selectively activating output signals of one of said first and said second storage means storing non-operand data.

3. The apparatus of claim 2 wherein said words are divided into character groups.

4. In a microprogrammed data processing unit, wherein a first descriptor identifies a location in memory storing a first operand utilized in an instruction, wherein a second descriptor identifies a location in memory for storing an operand resulting from execution of said instruction, and wherein a group of words identified by said second descriptor can include non-operand data, a method for preserving said non-operand data comprising the steps of:
- during execution of said instruction, storing a first word of said second descriptor word group;
- during execution of said instruction, storing a last word of said second descriptor word group;
- obtaining said resultant operand;
- combining non-operand data of said first word with a most significant data word of said resultant operand; and
- combining non-operand data of said last word with a least significant data word of said resultant operand.

5. In a data processing system wherein a resultant operand resulting from execution of an instruction is stored in a memory subsystem address in a group of data words, wherein boundary words of said data words can include non-operand data previously stored in data words in said address, apparatus for preserving said non-operand data comprising:
- first storage means for storing said boundary data words of said subsystem address including non-operand data during execution of said instruction;
- second storage means coupled to said first storage means for combining said stored non-operand boundary word data with said resultant operand boundary word data, wherein combined boundary words have resulting operand data in bit positions not occuppied by non-operand data to be preserved.

6. The apparatus of claim 5 wherein said first storage means includes means for storing a word containing most significant data of said previously stored data words, and means for storing a word containing least significant data of said previously stored data words.

* * * * *